(12) United States Patent
Martell

(10) Patent No.: US 9,830,622 B1
(45) Date of Patent: *Nov. 28, 2017

(54) SYSTEMS AND METHODS TO PROCESS DONATIONS

(71) Applicant: Boku, Inc., San Francisco, CA (US)

(72) Inventor: Javier Francisco Martell, San Anselmo, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,473

(22) Filed: Jul. 25, 2017

Related U.S. Application Data

(63) Continuation-in-part of application No. 14/931,742, filed on Nov. 3, 2015, which is a continuation of
(Continued)

(51) Int. Cl.
*G06Q 30/02* (2012.01)
*H04W 4/14* (2009.01)
(Continued)

(52) U.S. Cl.
CPC ..... *G06Q 30/0279* (2013.01); *G06Q 20/3223* (2013.01); *G06Q 30/0613* (2013.01);
(Continued)

(58) Field of Classification Search
CPC . H04W 4/14; G06Q 30/0279; G06Q 20/3223; G06Q 30/0613; H04L 12/1453
See application file for complete search history.

(56) References Cited

U.S. PATENT DOCUMENTS

| 5,283,829 A | 2/1994 | Anderson |
| 5,466,919 A | 11/1995 | Hovakimian |

(Continued)

FOREIGN PATENT DOCUMENTS

| CN | 1591502 A | 3/2005 |
| EP | 1379098 A1 | 6/2003 |

(Continued)

OTHER PUBLICATIONS

"European Patent Application No. 09711520.8", Extended Search Report dated Apr. 27, 2011.
(Continued)

*Primary Examiner* — Steve D Agosta
(74) *Attorney, Agent, or Firm* — Stephen M. De Klerk

(57) ABSTRACT

Systems and methods are provided to facilitate donations via mobile communications. In one aspect, a system includes a data storage facility and an interchange having a common format processor and a plurality of converters to interface with a plurality of different controllers of mobile communications. The converters are configured to communicate with the controllers in different formats and with the common format processor in a common format. For a payment to a merchant, the common format processor provides a user interface configured to present charity donation options in response to a phone number being specified in the user interface to identify a fund source. The common format processor uses one of the converters to communicate with a mobile phone at the phone number to confirm the payment to the merchant and a donation to a separate charity organization specified via the user interface.

16 Claims, 29 Drawing Sheets

Related U.S. Application Data application No. 13/460,200, filed on Apr. 30, 2012, now Pat. No. 9,191,217.

(60) Provisional application No. 61/480,319, filed on Apr. 28, 2011.

(51) Int. Cl.
  *G06Q 30/06* (2012.01)
  *H04M 15/00* (2006.01)
  *G06Q 20/32* (2012.01)
  *H04L 12/14* (2006.01)

(52) U.S. Cl.
  CPC ........ *H04L 12/1453* (2013.01); *H04M 15/51* (2013.01); *H04M 15/68* (2013.01); *H04M 15/8242* (2013.01); *H04M 15/844* (2013.01); *H04M 15/866* (2013.01); *H04W 4/14* (2013.01); *H04L 12/1457* (2013.01); *H04L 12/1464* (2013.01); *H04L 12/1467* (2013.01); *H04M 2215/0192* (2013.01)

(56) References Cited

U.S. PATENT DOCUMENTS

| | | |
|---|---|---|
| 5,663,547 A | 9/1997 | Ziarno |
| 5,708,422 A | 1/1998 | Blonder et al. |
| 5,825,883 A | 10/1998 | Archibald et al. |
| 5,826,241 A | 10/1998 | Stein et al. |
| 5,845,260 A | 12/1998 | Nakano et al. |
| 5,905,873 A | 5/1999 | Hartmann et al. |
| 5,914,472 A | 6/1999 | Foladare et al. |
| 5,945,653 A | 8/1999 | Walker et al. |
| 5,953,710 A | 9/1999 | Fleming |
| 6,179,206 B1 | 1/2001 | Matsumori et al. |
| 6,227,447 B1 | 5/2001 | Campisano |
| 6,282,276 B1 | 8/2001 | Felger |
| 6,302,326 B1 | 10/2001 | Symonds et al. |
| 6,473,808 B1 | 10/2002 | Yeivin et al. |
| 6,612,488 B2 | 9/2003 | Suzuki |
| 6,704,409 B1 | 3/2004 | Dilip et al. |
| 6,718,178 B1 | 4/2004 | Sladek et al. |
| 6,732,919 B2 | 5/2004 | Macklin et al. |
| 6,736,322 B2 | 5/2004 | Gobburu et al. |
| 6,788,771 B2 | 9/2004 | Manto |
| 6,807,410 B1 | 10/2004 | Pailles et al. |
| 6,928,558 B1 | 8/2005 | Allahwerdi et al. |
| 6,965,872 B1 | 11/2005 | Grdina |
| 6,996,409 B2 | 2/2006 | Gopinath et al. |
| 6,999,943 B1 | 2/2006 | Johnson et al. |
| 7,013,125 B2 | 3/2006 | Henrikson et al. |
| 7,080,049 B2 | 7/2006 | Truitt et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,413,119 B2 | 8/2008 | Kubo et al. |
| 7,434,723 B1 | 10/2008 | White et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,546,266 B2 | 6/2009 | Beirne et al. |
| 7,558,777 B1 | 7/2009 | Santos |
| 7,660,772 B2 | 2/2010 | Verkama |
| 7,734,543 B2 | 6/2010 | Braco |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 | 12/2010 | Carlson |
| 7,870,044 B2 | 1/2011 | Robertson |
| 7,870,077 B2 | 1/2011 | Woo et al. |
| 7,890,433 B2 | 2/2011 | Singhal |
| 8,024,781 B2 | 9/2011 | Saunders et al. |
| 8,073,774 B2 | 12/2011 | Pousti |
| 8,116,730 B2 | 2/2012 | Smith |
| 8,245,044 B2 | 8/2012 | Kang |
| 8,249,964 B2 | 8/2012 | DePena |
| 8,280,825 B2 | 10/2012 | Friedman |
| 8,280,906 B1 | 10/2012 | Lillibridge et al. |
| 8,554,670 B1 | 10/2013 | Blank et al. |
| 8,660,941 B2 | 2/2014 | Willey et al. |
| 2001/0003093 A1 | 6/2001 | Lundin |
| 2001/0031456 A1* | 10/2001 | Cynaumon ............. G09B 7/02 434/350 |
| 2001/0037264 A1 | 11/2001 | Husemann |
| 2001/0051920 A1 | 12/2001 | Joao et al. |
| 2002/0004751 A1 | 1/2002 | Seki et al. |
| 2002/0013727 A1 | 1/2002 | Lee |
| 2002/0016769 A1 | 2/2002 | Barbara et al. |
| 2002/0017561 A1 | 2/2002 | Tomoike |
| 2002/0025797 A1 | 2/2002 | Joao et al. |
| 2002/0035539 A1 | 3/2002 | O'Connell |
| 2002/0046189 A1 | 4/2002 | Morita et al. |
| 2002/0059146 A1 | 5/2002 | Keech |
| 2002/0069149 A1* | 6/2002 | Maxwell ................ G06Q 40/02 705/36 R |
| 2002/0072925 A1 | 6/2002 | Krim |
| 2002/0087471 A1 | 7/2002 | Ganesan et al. |
| 2002/0091538 A1 | 7/2002 | Schwartz et al. |
| 2002/0111904 A1 | 8/2002 | Gruber et al. |
| 2002/0111907 A1 | 8/2002 | Ling |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0023505 A1 | 1/2003 | Eglen et al. |
| 2003/0050854 A1 | 3/2003 | Showghi et al. |
| 2003/0065525 A1 | 4/2003 | Giacchetti |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0149781 A1 | 8/2003 | Yared et al. |
| 2003/0191711 A1 | 10/2003 | Jamison et al. |
| 2003/0212601 A1 | 11/2003 | Silva et al. |
| 2003/0220970 A1 | 11/2003 | Komsi |
| 2004/0005911 A1 | 1/2004 | Guirauton et al. |
| 2004/0019564 A1 | 1/2004 | Goldthwaite et al. |
| 2004/0044582 A1 | 3/2004 | Chowdhary |
| 2004/0064406 A1 | 4/2004 | Yates et al. |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |
| 2004/0254868 A1 | 12/2004 | Kirkland et al. |
| 2005/0055296 A1 | 3/2005 | Hattersley et al. |
| 2005/0055309 A1 | 3/2005 | Williams |
| 2005/0075933 A1 | 4/2005 | Crone .................... G06Q 30/02 705/15 |
| 2005/0086164 A1 | 4/2005 | Kim et al. |
| 2005/0090229 A1 | 4/2005 | Tatsuki et al. |
| 2005/0144020 A1 | 6/2005 | Muzaffar et al. |
| 2005/0177442 A1 | 8/2005 | Sullivan et al. |
| 2005/0177517 A1 | 8/2005 | Leung et al. |
| 2005/0197892 A1 | 9/2005 | Bilibin et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0030354 A1 | 2/2006 | Ho et al. |
| 2006/0041505 A1 | 2/2006 | Enyart |
| 2006/0116938 A1 | 6/2006 | Findling et al. |
| 2006/0121880 A1 | 6/2006 | Cowsar et al. |
| 2006/0131390 A1 | 6/2006 | Kim |
| 2006/0206709 A1 | 9/2006 | Labrou et al. |

(56) References Cited

U.S. PATENT DOCUMENTS

| | | |
|---|---|---|
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0258397 A1 | 11/2006 | Kaplan et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0063017 A1 | 3/2007 | Chen et al. |
| 2007/0094080 A1 | 4/2007 | Wiken |
| 2007/0100651 A1 | 5/2007 | Ramer et al. |
| 2007/0118477 A1 | 5/2007 | Graves et al. |
| 2007/0123219 A1 | 5/2007 | Lovell et al. |
| 2007/0123229 A1 | 5/2007 | Pousti |
| 2007/0124490 A1 | 5/2007 | Kalavade et al. |
| 2001/0150339 | 6/2007 | Retter et al. |
| 2007/0130025 A1 | 6/2007 | Nakajima |
| 2007/0130044 A1 | 6/2007 | Rowan |
| 2007/0133768 A1 | 6/2007 | Singh |
| 2007/0156517 A1 | 7/2007 | Kaplan et al. |
| 2007/0168462 A1 | 7/2007 | Grossberg et al. |
| 2007/0175978 A1 | 8/2007 | Stambaugh |
| 2007/0179792 A1 | 8/2007 | Kramer |
| 2007/0198338 A1 | 8/2007 | Heywood |
| 2007/0198354 A1 | 8/2007 | Senghore et al. |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro |
| 2007/0250711 A1 | 10/2007 | Storey |
| 2007/0255653 A1 | 11/2007 | Tumminaro et al. |
| 2007/0255662 A1 | 11/2007 | Tumminaro et al. |
| 2007/0260556 A1 | 11/2007 | Pousti |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2007/0287413 A1 | 12/2007 | Kleitsch et al. |
| 2008/0009263 A1 | 1/2008 | Pousti |
| 2008/0010192 A1 | 1/2008 | Rackley, III et al. |
| 2008/0033832 A1 | 2/2008 | Ho |
| 2008/0040139 A1 | 2/2008 | Pousti et al. |
| 2008/0040265 A1 | 2/2008 | Rackley, III et al. |
| 2008/0040733 A1 | 2/2008 | Pousti et al. |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0058057 A1 | 3/2008 | Lau et al. |
| 2008/0065490 A1 | 3/2008 | Novick et al. |
| 2008/0071619 A1 | 3/2008 | Charlton et al. |
| 2008/0072406 A1 | 3/2008 | Sinclair |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120190 A1 | 5/2008 | Joao et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0160970 A1 | 7/2008 | Srinivas Reddy et al. |
| 2008/0167017 A1 | 7/2008 | Wentker et al. |
| 2008/0167961 A1 | 7/2008 | Wentker et al. |
| 2008/0172331 A1 | 7/2008 | Graves et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0249928 A1 | 10/2008 | Hill et al. |
| 2008/0262929 A1 | 10/2008 | Behr |
| 2008/0270300 A1 | 10/2008 | Jones et al. |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2008/0307317 A1 | 12/2008 | Yohai-Giochais |
| 2009/0006184 A1 | 1/2009 | Leach et al. |
| 2009/0006217 A1 | 1/2009 | Smith |
| 2009/0006276 A1 | 1/2009 | Woolston |
| 2009/0024614 A1 | 1/2009 | Pousti |
| 2009/0029687 A1 | 1/2009 | Ramer et al. |
| 2009/0030838 A1 | 1/2009 | Jacob et al. |
| 2009/0044216 A1 | 2/2009 | McNicoll |
| 2009/0054031 A1 | 2/2009 | Smith et al. |
| 2009/0055292 A1 | 2/2009 | Chong et al. |
| 2009/0063178 A1 | 3/2009 | Pousti |
| 2009/0063312 A1 | 3/2009 | Hurst |
| 2009/0070583 A1 | 3/2009 | Von Mueller et al. |
| 2009/0077640 A1 | 3/2009 | Wang |
| 2009/0081989 A1 | 3/2009 | Wuhrer |
| 2009/0104888 A1 | 4/2009 | Cox |
| 2009/0106115 A1 | 4/2009 | James et al. |
| 2009/0106138 A1 | 4/2009 | Smith et al. |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupalli et al. |
| 2009/0281904 A1 | 11/2009 | Pharris |
| 2009/0313131 A1 | 12/2009 | Giordano |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur |
| 2010/0070757 A1 | 3/2010 | Martinez |
| 2010/0094732 A1 | 4/2010 | Smith |
| 2010/0100462 A1 | 4/2010 | Lyda et al. |
| 2010/0106620 A1 | 4/2010 | Marcus |
| 2010/0114775 A1 | 5/2010 | Griffin |
| 2010/0125514 A1 | 5/2010 | Blackhurst et al. |
| 2010/0125737 A1 | 5/2010 | Kang |
| 2010/0130162 A1 | 5/2010 | Yang |
| 2010/0130165 A1 | 5/2010 | Snyder et al. |
| 2010/0138344 A1 | 6/2010 | Wong et al. |
| 2010/0145802 A1 | 6/2010 | Nowacek et al. |
| 2010/0153249 A1 | 6/2010 | Yuan et al. |
| 2010/0174629 A1 | 7/2010 | Taylor et al. |
| 2010/0179907 A1 | 7/2010 | Atkinson |

(56) References Cited

U.S. PATENT DOCUMENTS

| | | |
|---|---|---|
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223110 A1 | 9/2010 | Slavin et al. |
| 2010/0223183 A1 | 9/2010 | Smith |
| 2010/0228580 A1 | 9/2010 | Zoldi et al. |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0306832 A1 | 12/2010 | Mu et al. |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035240 A1 | 2/2011 | Joao et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0106618 A1 | 5/2011 | Ben-Moshe |
| 2011/0125610 A1 | 5/2011 | Goodsall et al. |
| 2011/0131106 A1 | 6/2011 | Eberstadt et al. |
| 2011/0143710 A1 | 6/2011 | Hirson |
| 2011/0143711 A1 | 6/2011 | Hirson |
| 2011/0196926 A1 | 8/2011 | Crawford |
| 2011/0213671 A1 | 9/2011 | Hirson et al. |
| 2011/0237232 A1 | 9/2011 | Hirson et al. |
| 2011/0287748 A1 | 11/2011 | Angel et al. |
| 2011/0295750 A1 | 12/2011 | Rammal |
| 2011/0320291 A1 | 12/2011 | Coon et al. |
| 2012/0036018 A1 | 2/2012 | Feliciano et al. |
| 2012/0143768 A1 | 6/2012 | Hammad et al. |
| 2012/0158580 A1 | 6/2012 | Eram et al. |
| 2012/0171990 A1 | 7/2012 | Williams et al. |
| 2012/0239479 A1 | 9/2012 | Amaro et al. |
| 2012/0323737 A1 | 12/2012 | Pousti et al. |

FOREIGN PATENT DOCUMENTS

| | | |
|---|---|---|
| GB | 2379525 | 3/2003 |
| JP | 2007109014 | 4/2007 |
| JP | 2007179383 | 7/2007 |
| KR | 20000036574 | 7/2000 |
| KR | 20030030684 | 4/2003 |
| KR | 1020060035294 | 10/2004 |
| KR | 1020060009404 | 1/2006 |
| KR | 1020060022304 | 3/2006 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | 2007004792 | 1/2007 |
| WO | 2007084593 | 7/2007 |
| WO | 2007102648 | 9/2007 |
| WO | 2007127521 | 11/2007 |
| WO | 2008/033960 A2 | 3/2008 |
| WO | 2008/061151 | 5/2008 |
| WO | 2009/036511 | 3/2009 |
| WO | 2009044396 | 4/2009 |

OTHER PUBLICATIONS

"Extended European Search Report dated Jun. 11, 2015", European Patent Application No. 11737516.2, (8 pages).
"International Application No. PCT/US2009/033823", International Search Report and Written Opinion, dated Sep. 24, 2009.
"International Application No. PCT/US2009/039723", International Search Report and Written Opinion, dated Oct. 30, 2009.
"International Application No. PCT/US2010/020189", International Search Report and Written Opinion, dated Dec. 10, 2010.
"International Application No. PCT/US2010/021054", International Search Report and Written Opinion, dated Jul. 29, 2010.
"International Application No. PCT/US2010/024525", International Search Report and Written Opinion, dated May 17, 2010.
"International Application No. PCT/US2010/024535", International Search Report and Written Opinion, dated May 25, 2010.
"International Application No. PCT/US2010/030338", International Search Report & Written Opinion, dated Jun. 3, 2010.
"International Application No. PCT/US2010/032668", International Search Report and Written Opinion, dated Jul. 1, 2010.
"International Application No. PCT/US2010/036940", International Search Report and Written Opinion, dated Jul. 21, 2010.
"International Application No. PCT/US2010/037816", International Search Report and Written Opinion, dated Aug. 5, 2010.
"International Application No. PCT/US2010/042703", International Search Report and Written Opinion, dated Sep. 13, 2010.
"International Application No. PCT/US2010/046266", International Search Report and Written Opinion, dated Oct. 20, 2010.
"International Application No. PCT/US2010/050616", International Search Report and Written Opinion, dated Apr. 26, 2011.
"International Application No. PCT/US2010/057472", International Search Report and Written Opinion, dated Jan. 18, 2011.
"International Application No. PCT/US2010/059295", International Search Report and Written Opinion, dated Feb. 1, 2011.
"International Application No. PCT/US2010/059466", International Search Report and Written Opinion, dated Feb. 1, 2011.
"International Application No. PCT/US2011/022419", International Search Report and Written Opinion, dated Mar. 29, 2011.
"International Application No. PCT/US2011/022426", International Search Report and Written Opinion, dated Mar. 28, 2011.
"International Application No. PCT/US2011/029760", International Search Report and Written Opinion dated Oct. 28, 2011.
"International Application No. PCT/US2011/051094", International Search Report and Written Opinion dated Dec. 23, 2011.
"International Application No. PCT/US2011/30039", International Search Report and Written Opinion, dated May 23, 2011.
"International Application No. PCT/US2011/30038", International Search Report and Written Opinion, dated May 25, 2011.
"International Application No. PCT/US12/25195, International Filing Date Feb. 15, 2012", International Search Report and Written Opinion, dated Apr. 26, 2012.
"International Patent Application No. PCT/US11/51094 filed on Sep. 9, 2011", International Preliminary Report on Patentability dated Nov. 2, 2012, 17.
"International Preliminary Report on Patentability", International Application No. PCT/US12/25195, filed Feb. 15, 2012.
OneBip S.R.L , "OneBip—to Pay Online with Your Mobile Phone", Youtube online video at http://www.youtube.com/watch?v=RiEsMcc0tJY, May 23, 2007.
amazon.com, Inc., , "Get Gold Box Deals Every Day with Amazon Text Alerts", located at http://www.amazon.com/gp/anywhere/sms/goldbox, available at least by Jun. 10, 2009.
Andrade, Eduardo B. et al., "Self-Disclosure on the Web: The Impact of Privacy Policy, Reward, and Company Reputation", Advances in Consumer Research (vol. 29), 2002, (pp. 350-353).
Aradiom Inc., , "The Real Solution—Aradiorn SolidPass", located at http://www.aradiom.com/SolidPass/2fa-OTP¬ security-token.htm, available at least by Apr. 24, 2009.

(56) References Cited

OTHER PUBLICATIONS

Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod , "MobilCash:Worlds First in Mobile Payments", YouTube online video located at http://youtube.com/wacth?v=j6Xv35qSmbg,, Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Ching, Andrew T. et al., "Payment card rewards programs and consumer payment choice", Journal of Banking & Finance, vol. 34, Issue 8, http://dx.doi.org/10.1016/j.jbankfin.2010.03.015. (http://www.sciencedirect.com/science/article/pii/S0378426610001196) , ISSN 0378-4266, Aug. 2010, pp. 1773-1787.
Chua, Lye H. , "How Customers Applied Java CAPS?", Sun Microsystems, Inc. presentation, Nov. 6, 2007.
Federal Trade Commission, , "Children's Online Privacy Protection Act (COPPA)", 15 U.S.C. §§ 6501-6506, Oct. 21, 1998.
Garry, Michael , "Ending the paper chase", Progressive Grocer, May 1994.
Green Zap, , "GreenZap Introduces New "Buy Now" Buttons, Enabling Merchants to Accept Payments as No Cost", Business Wire, PQ Dialog#445190533, Aug. 4, 2006, (4 pages).
greenzap.com Merchant Tools, , "Internet Archive Wayback Machine", 2006, (2 pages).
Hassinen, Marko et al., "An Open, PKI-Based Mobile Payment System", Emerging Trends in Information and Communication Security, Lecture Notes in Computer Science, vol. 3995/2006, pp. 86-89, Jun. 1, 2006.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Lu, Gang , "Premium SMS Billing Vs. WAP Billing", URL:http://technode.com/2006/03/31preimum-sms-billing-vs-wap-billing/, Mar. 31, 2006, (7 pages).
Mobilians Co. Ltd., , company website located at http://www.mobilians.co.kr/english/, available at least by Jan. 12, 2009.
National Consumers League, "Mobile commerce: what's all the buzz?", http://www.nclnet.org/personal-finane/60-mobile-commerce/314-mobile-commerce-what . . . , Mar. 3, 2007.
Nicole, Kirsten , "Pay me Lets You Send and Receive Money Through Facebook", http://mashable.com/2007/06/17pay-me-facebook-app, Jun. 17, 2007.
Paypal, Inc, , "Get What You Want, When You Want It", , located at https://www.paypal.com/cgi-bin/webscr?cmd=xpt/ Marketing/mobile/MobileBuyStuff-outside, available at least by Mar. 5, 2009.
Paypal, Inc. "Texting with PayPal—Easy as Lifting a Finger", located at https://www.paypal.com/cgi-bin/webscr?cmd=xpt/Marketing/mobile/MobileAdvancedFeatures-outside, available at least by Mar. 5, 2009.
Squidoo, LLC, , "ntroducing MobillCash: Make a Secure Sale Even When an Online Customer Has No Cash, Credit Cards or I.D.", located at http://www.squidoo.com/mobillcash-pay-by-mobile-phone, available at least by Aug. 29, 2008.
Sun Microsystems Inc., , "The Road to Mobile Banking", white paper, Jun. 2008.
Tindal, Suzanne , "St. George Counts Down to Two-Factor Authentication", ZDNet Australia, Feb. 19, 2008.
Trusted Mobile Payment Framework, , "Scheme Rules", version 2.0, Aug. 6, 2008.
Verizon, , "Ring Tones & Ringback Tones—Terms and Conditions", http://support.verizonwireless.com/terms/products/ringtones_ringbacktones.html, May 6, 2009.
Visualtron Software Corporation , "2-Factor Authentication—What is MobileKey?", located at http://www.visualtron. com/products_mobilekey.htm, available at least by 2008.
Wikimedia Foundation, Inc., "Authentication", located at en.wikipedia.org/wiki/Authentication, Mar. 17, 2009.
Wikimedia Foundation, Inc., , "Credit Card", located at en/wikipedia.org/wiki/Credit_card, Dec. 5, 2008.
Wikimedia Foundation, Inc., , "Two-Factor Authentication", located at en.wikipedia.org/wiki/Two-factor_authentication, Apr. 24, 2009.
Zabawskyj, Bohdan , "In the Media: The Mobile Money Opportunity", ,Billing World and OSS Today, located at http://www.redknee.com/news_events/in_the_media/43/?PHPSESSID=1e0ca1ab057bf9dc2c88104877ca8010, Sep. 2007.
Zong, Inc., , "Virtual Goods/Currency and Mobile Payments: The Business Model for Social Apps", The Zong Blog at http://blog-zong.com/2008/10/25/virtual-goods-currency-and-mobile-payments-the business-model-for-social-apps/, Oct. 28, 2008.
Zong, Inc. "Zong Mobile Payment Demo on a Facebook App", You Tube online video at http://www.youtube.com/watch?v=aLjRcAFrGil, Jan. 5, 2009.
Zong, Inc., "Zong—Mobile Payments for Your Web App", You tube online video at http://www.youtube.com/watch?v=O2C3SQraAvQ, Sep. 5, 2008.
Zong, Inc., , "Zang Mobile Payments in Smallworlds", You Tube online video at htttp://www.youtube.com/watch?v=Y6CEw3tSgBc, Feb. 10, 2009.

* cited by examiner

SYSTEMS AND METHODS TO PROCESS DONATIONS

CROSS-REFERENCE TO RELATED APPLICATIONS

This is a continuation-in-part application of U.S. patent application Ser. No. 14/931,742, filed on Nov. 3, 2015, which is a continuation application of U.S. patent application Ser. No. 13/460,200, filed on Apr. 30, 2012 and issued as U.S. Pat. No. 9,191,217 on Nov. 17, 2015, which claims priority from U.S. Provisional Patent Application No. 61/480,319, filed on Apr. 28, 2011, all of which are hereby incorporated herein by reference.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate donations via mobile communications. Some embodiments are summarized in this section.

In one aspect, a system includes a data storage facility configured to store charity preferences of users of phone numbers and an interchange coupled with the data storage facility. The interchange includes a common format processor and a plurality of converters to interface with a plurality of different controllers of mobile communications. The converters are configured to communicate with the controllers in different formats; and the converters are configured to communicate with the common format processor in a common format.

In one embodiment, the common format processor is configured to provide a user interface to a user of a phone number for a payment to a merchant, the user interface configured to present charity donation options according to a charity preference of the user in response to the phone number being specified in the user interface. In response to a request received in the user interface identifying a charity organization, the common format processor uses one of the converters to communicate with a mobile phone at the phone number to confirm the payment to the merchant and a donation to the charity organization. In one embodiment, the common format processor is further configured to use the one of the plurality of converters to transmit premium messages to the mobile phone at the phone number to collect funds for the payment and the donation.

In another aspect, a method performed by a computing device includes: providing a user interface to a user for a payment to a merchant, in response to the user visiting a web site of the merchant to make a purchase, where the user interface is configured to receive a phone number of the user to identify a source of funds for the payment and configured to receive an optional identification of a charity organization; receiving a request via the user interface, where the request includes the phone number and the identification of the charity organization; in response to the request, communicating with a mobile phone at the phone number for a confirmation of the request; in response to the confirmation, billing a fund source associated with the phone number to collect funds for the payment to the merchant and a donation to the charity organization; and notifying the merchant of a status of the billing of the funding source for the payment.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to associate account information with phone numbers to facilitate electronic payments via mobile devices, such as cellular phones. The interchange is configured to communicate with the mobile phones through the different controllers to provide security and convenience for online transactions.

An embodiment is described for donations to charitable organizations. It should however be understood that the invention should not be limited to donations to charitable organizations, but that the invention can find application for donations to other originations, persons or entities, including but not limited to donations to politicians or political organizations.

Figure 1:
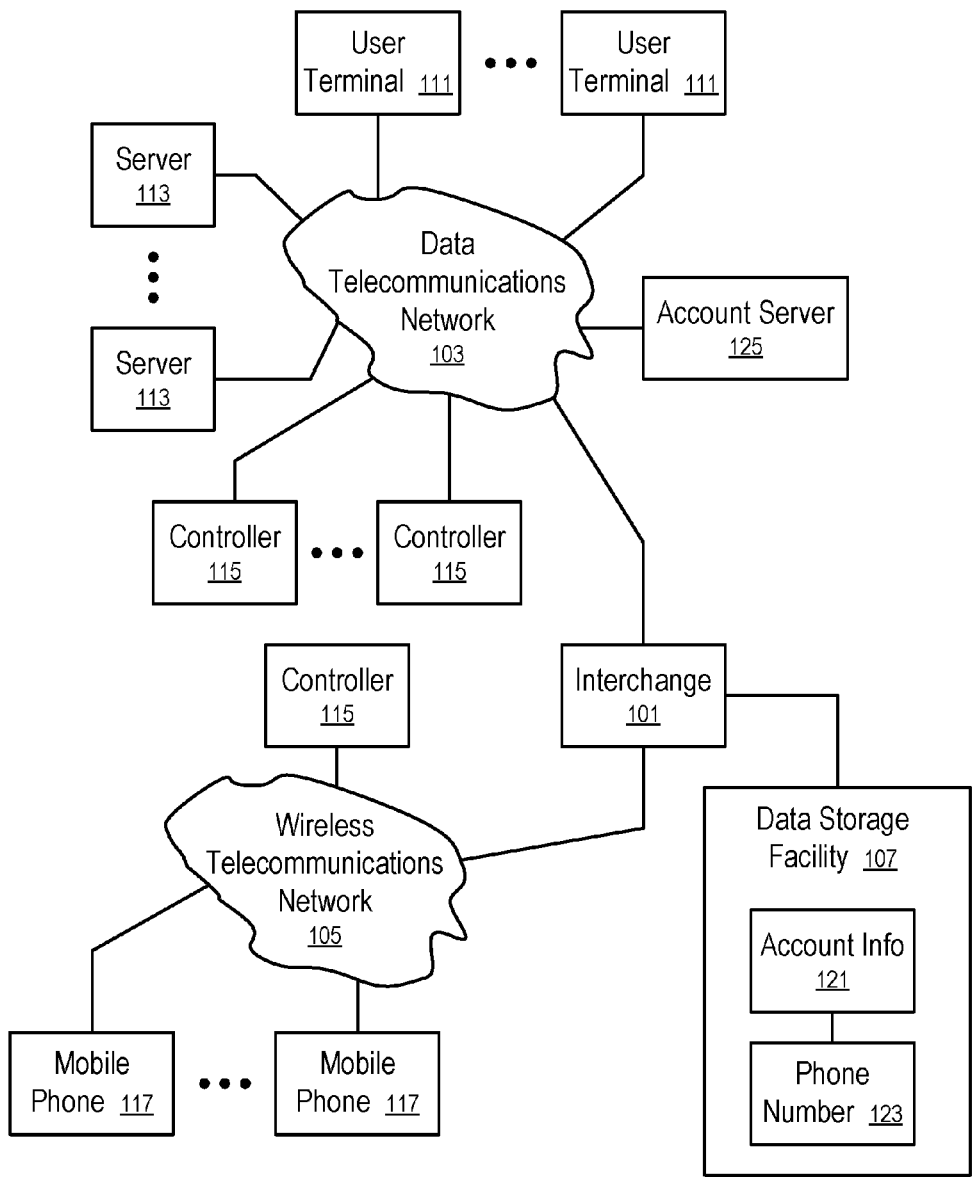
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user account information (121) and the corresponding phone numbers (123) of the mobile phones (117). The interchange (101) is coupled with the data storage facility (107) to communicate with the mobile phones (117) at the corresponding phone numbers (123) to confirm operations that are performed using the account information (121). Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user).

For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding account information (121), such as bank accounts, credit card numbers, charge card numbers, etc.

In FIG. 1, the user terminals (111) may use a unified interface to send requests to the interchange (101). For example, a website of the interchange (101) may be used to receive the account information (121) from the web browsers running in the user terminals (111). The user terminals (111) are typically different from the mobile phones (117). However, in some embodiments, users may use the mobile phone (117) to access the web and submit the account information (121). Alternatively, the users may use the mobile phone (117) to submit the account information (121) to the interchange (101) via text messaging, email, instant messaging, etc.

The use of the mobile phones (117) in the confirmation of activities that involve the account information (121) increases the security of the transaction, since the mobile phones (117) are typically secured in the possession of the users.

Further, in one embodiment, the interchange (101) may use the phone bills of the mobile phones (117) to pay for purchases, in order to use the account information (121) to pay for the phone bills, and/or to deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phones (117) via their phone numbers (123) stored in the data storage facility (107), the users may use the user terminals (111) to access online servers (113) of various merchants or service providers to make purchases. From the user terminals (111), the users can use the accounts identified by the account information (121) to make the payment for the purchases, without revealing their account information (121) to the operators of the servers (113).

In one embodiment, the mobile phones (117) are used by the corresponding users to make payments and/or manage funds, such as for making purchases in various websites hosted on the servers (113) of merchants and service providers and/or for transferring funds to or from an account identified by the account information (121), such as phone bills of land-line telephone services, credit card accounts, debit card accounts, bank accounts, etc., or an account hosted on the data storage facility (107) or telecommunication accounts of the mobile phones (117) with telecommunication carriers. The mobile phones (117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone number (123)).

For example, the user terminal (111) may provide the phone numbers (123) to the servers (113) to allow the servers (113) to charge the account identified by the account information (121) associated with the phone number (123). The interchange (101) sends a message to the mobile phone (117) via the phone number (123) to confirm the payment request. Once the payment is confirmed or approved via the corresponding mobile phone (117), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) may not even provide the phone number (123) to the server (113) to process the payment. The server (113) may redirect a payment request to the interchange (101), which then prompts the user terminal (111) to provide the phone number (123) to the website of the interchange (101) to continue the payment process.

For example, the server (113) may redirect the payment request to the website of the interchange (101) with a reference indicating the purchase made via the user terminal (111). The interchange (101) can use the reference to subsequently complete the payment with the server (113) for the purchase, after receiving the phone number (123) directly from the user terminal (111) to confirm the payment via the mobile phone (117).

In some embodiments, instead of directly providing the phone number (123) to identify the account information (121), the user may provide other information to identify the phone number (123), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (117) via a secure connection.

Alternatively, the user may supply the account information (121) to the interchange (101) at the time the payment request is submitted from the user terminal (111) to the interchange (101). Alternatively, the user may supply the account information (121) to the interchange (101) at the time the user responds to the confirmation message for the payment request.

In some embodiments, the user may supply the account information (121) after a transaction using funds collected via the telecommunication carrier of the mobile phone (117) at the phone number (123). For example, after the transaction, the interchange (101) may send an invitation message, such as a text message to the mobile phone (117) at the phone number (123), to the user to invite the user to register with the interchange (101) and provide the account information (121). The user may register with the interchange (101) via the mobile phone (117) (e.g., by a replying text message), or via a web page of the interchange (101) (e.g., using a link and/or a unique code provided in the invitation message).

After the user registers with the interchange (101) (e.g., via the mobile phone (117) and by providing the account information (121)), the user may create a customized personal identification number (PIN) or receive a PIN for enhanced security. Using the PIN, the user may use the account information (121) to complete an online transaction without having to confirm and/or approve a transaction using the mobile phone (117). In some embodiments, the PIN may be used to reduce unwanted messages to the mobile phone (117). For example, once the phone number (123) and the account information (121) are associated with a PIN, the interchange (101) may require the user of the user terminal (111) to provide the correct PIN to initiate the payment process. Thus, a spammer having only the phone number (123) (or a different user mistakenly using the phone number (123)) may not successfully use the user terminal (111) to request the interchange (101) to send confirmation messages to the mobile phone (117) protected by the PIN. In some embodiments, the interchange (101) may offer further incentives to the user for registering with the interchange (101), such as reduced fees, discounts, coupons, free products and services, etc.

In one embodiment, once the account information (121) is associated with the phone number (123) in the data storage facility (107), the user does not have to resubmit the account information (121) in subsequent payment requests.

By delegating the payment task to the interchange (101) and securing the account information (121) in the data storage facility (107), the system as shown in FIG. 1 can increase the security of using the account information (121) in an online environment.

In some embodiments, the interchange (101) can also fulfill the payment requests using the funds collected via the phone bill of the phone numbers (123). The interchange (101) can collect the funds via sending premium messages to the mobile phones (117) at the phone numbers (123), after receiving confirmation from the mobile phone (117).

For example, after the confirmation or approval message is received from the mobile phone (117), the interchange (101) performs operations to collect funds via the phone bill of the phone number (123). The interchange (101) may calculate the required premium messages to bill to the mobile phone (117). For example, mobile terminated premium SMS messages may have a predetermined set of prices for premium messages. The interchange (101) determines a combination of the premium messages that has a price closest to the amount required by the transaction, and sends this combination of premium messages to the mobile phone (117). For example, mobile originated premium SMS messages may also have a predetermined set of prices for premium messages. The interchange (101) can calculate the set of messages required for the transaction and transmit a text message to the mobile phone (117) of the user to instruct the user to send the required number of premium messages to provide the funds.

Figure 2:
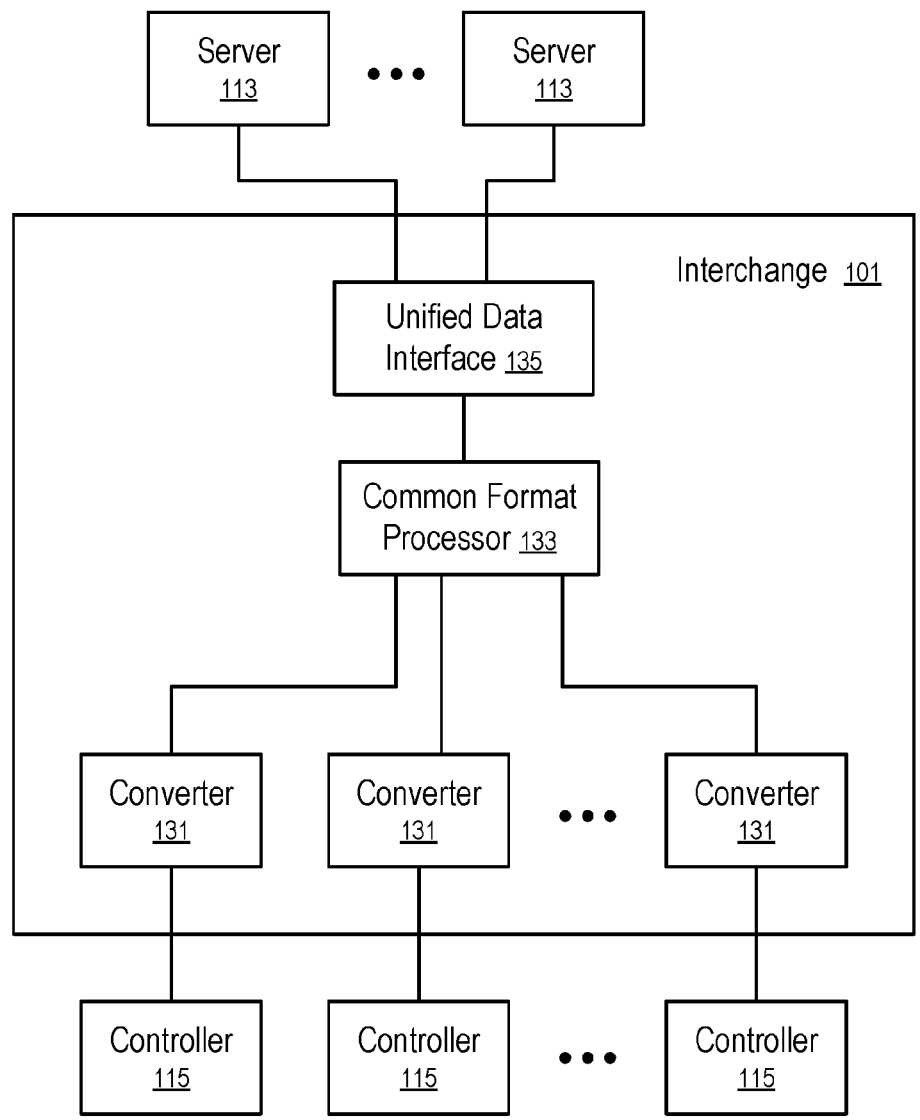
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
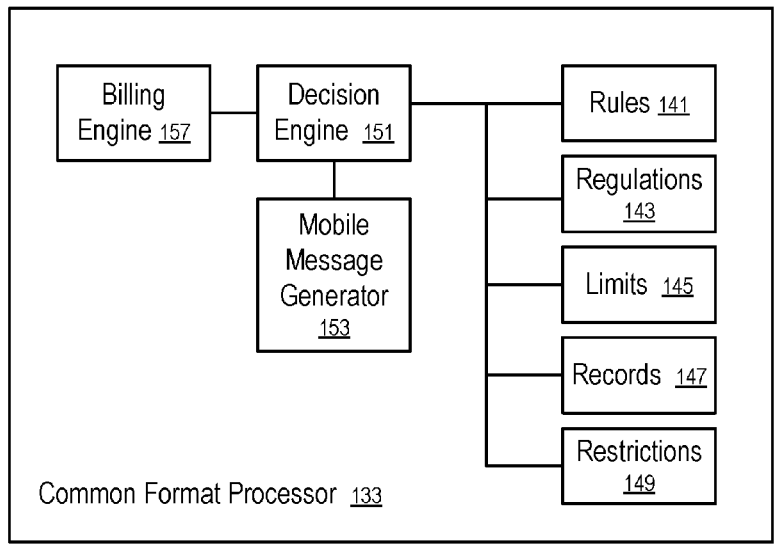
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (117) about the transaction (e.g., a request to collect funds via the phone bill of the user for a payment request, or for deposit into an account identified by the account information (121)). The converter (131) then interfaces with the corresponding controller (115) to transmit the messages to the mobile phones (117).

Figure 4:
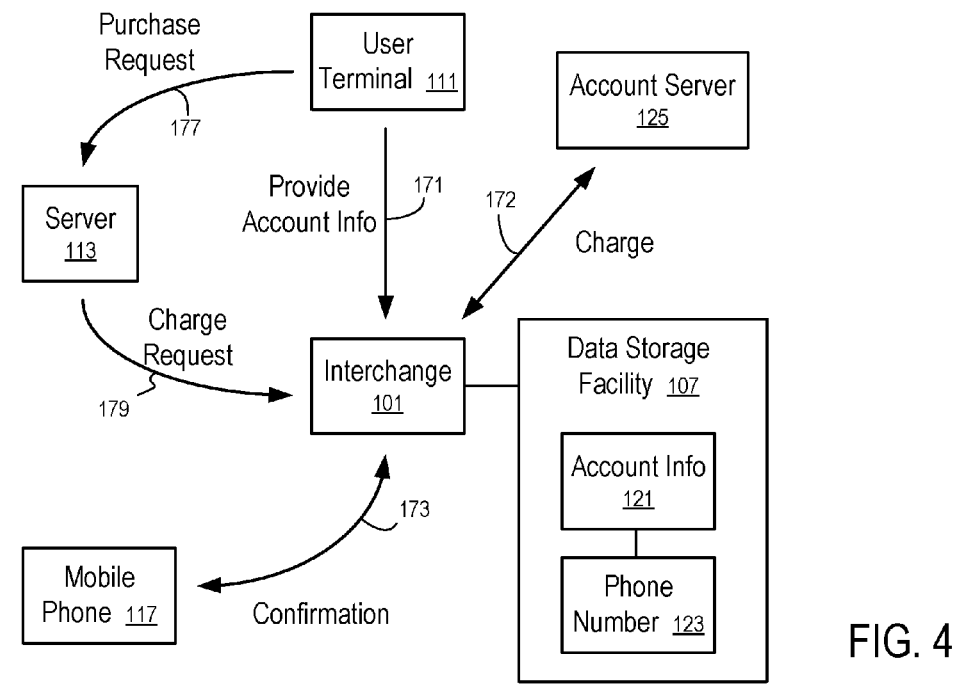
FIG. 4 shows a method to facilitate an online transaction using an interchange according to one embodiment.

FIG. 4 shows a method to facilitate an online transaction using an interchange according to one embodiment. In FIG. 4, the user terminal (111) provides (171) account information (121) to the interchange (101) for association with the phone number (123). For example, the user may use a device running a web browser as the user terminal (111) to submit the account information (121) via a secure web connection. The user terminal (111) is typically different from the mobile phone (117). However, in some embodiments, the mobile phone (117) may also be used as the user terminal (111) to submit the account information (121) (e.g., via a wireless application protocol (WAP) application, or via a message sent via short message service (SMS) or multimedia message service (MMS), or via an email message or an instant message).

After the user provides the account information (121) to the interchange (101) for storage in the data storage facility (107), the user can send (177) a charge request to the server (113) of a merchant from the user terminal (111). The server (113) of the merchant can send or redirect (179) the charge request to the interchange (101). In response to the charge request, the interchange (101) sends (173) a confirmation message to the mobile phone (117). If the user sends (173) an approval, or an appropriate reply, to the confirmation message from the mobile phone (117), the interchange (101) communicates with the account server (125) to charge an account of the user identified by the account information (121), without revealing the account information (121) to the server (113). The interchange (101) pays the merchant on behalf of the user using the funds collected via charging the account of the user. For example, the interchange (101) may use its own bank account to pay the merchant operating the server (113). Thus, the financial information of the user is not revealed to the merchant.

Upon the completion of the payment process, the interchange (101) can notify the user via the mobile phone (117) and/or the user terminal (111).

In some embodiments, the server (113) of the merchant redirects the charge request to allow the user terminal (111) to communicate with the interchange (101) to continue the payment process; and the user terminal (111) may provide (171) the account information (121) directly to the interchange (101) after the charge request is redirected.

In alternative embodiments, the user may provide the account information (121) from the mobile phone (117) together with the approval of the charge request.

In one embodiment, the interchange (101) communicates with the mobile phone (117) for the confirmation of the charge request via SMS messages. Alternatively, the confirmation and approval messages can be sent (173) via emails, instant messages, voice message, live calls from operators, etc.

In some embodiments, the user of the mobile phone (117) may choose to fulfill the charge request via the phone bill, instead of charging the account identified by the account information (121). Thus, after the confirmation, the interchange (101) sends the premium messages to the mobile phone (117) to collect funds via the phone bill of the mobile phone (117). In other embodiments, the interchange (101) may send an instruction with the confirmation message to the mobile phone (117) to instruct the user to send mobile originated premium messages to the interchange (101) to collect the funds via the phone bill of the mobile phone (117).

Figure 5:
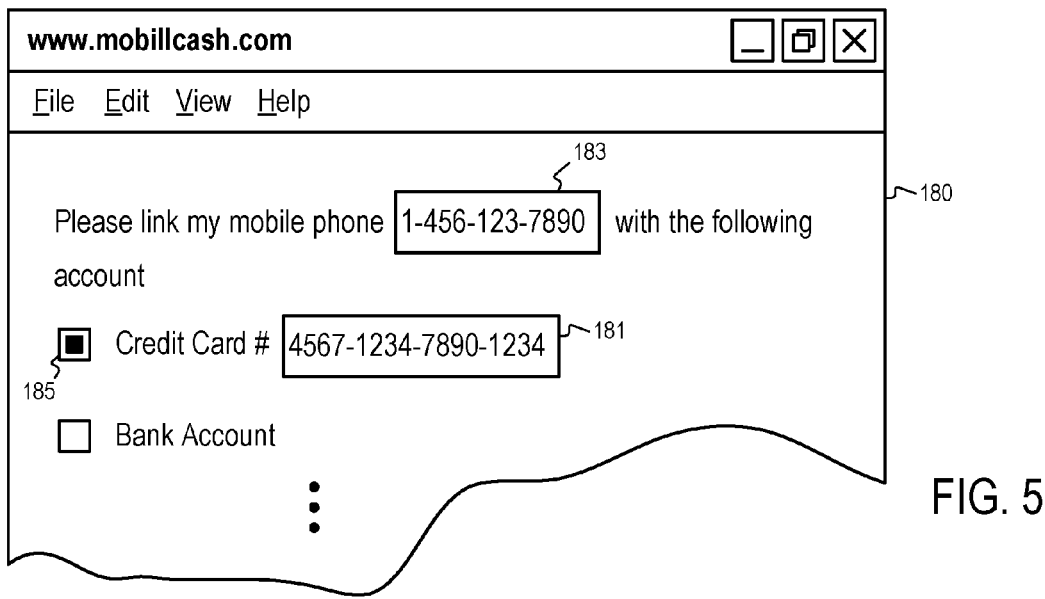
FIG. 5 illustrates a user interface to associate an account with a telephone number according to one embodiment.

FIG. 5 illustrates a user interface to associate an account with a telephone number according to one embodiment. In FIG. 5, the user interface (180) includes a text field (183) that allows the user to specify the phone number (123) with which the account information (121) provided in the text field (181) is to be associated.

In FIG. 5, the user interface (180) further includes an option list, which allows the user to select various types of accounts, such as credit card accounts, bank accounts, charge card accounts, etc. In the example illustrated in FIG. 5, the checkbox (185) is selected to specify a credit card account.

In some embodiments, the user interface (180) may further present a text field (not shown in FIG. 5) to allow the user to specify an alias for the account information (121) supplied in the text input field (181). For enhanced security, the alias can be used for subsequent communications with the user without revealing the account information (121).

In FIG. 5, the user interface (180) may be presented via a web browser (or a custom application) to submit account information (121) in the text input field (181) from a user terminal (111) to the interchange (101). Alternatively, the account number can be submitted from the mobile phone (117) via a message sent via SMS, WAP, voice mail, or via an interactive voice response (IVR) system.

Figure 6:
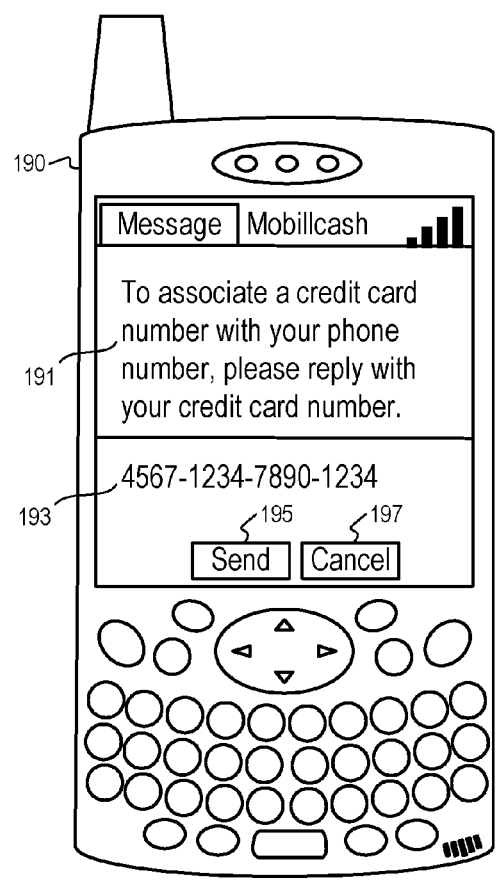
FIG. 6 illustrates another user interface to associate an account with a telephone number according to one embodiment.

FIG. 6 illustrates another user interface to associate an account with a telephone number according to one embodiment. In FIG. 6, the user interface (190) is presented on the mobile phone (117) of the user. The user interface (190) presents a message (191) from the interchange (101) to the mobile phone (117) at the phone number (123). The message (191) prompts the user to submit the account information (121) by providing a reply message (193). The user may select the "send" button (195) to provide the account information (121) for association with the phone number (123) or select the "cancel" button (197) to ignore the prompt.

In one embodiment, the messages (191 and 193) are transmitted to the mobile phone (117) via a short message service (SMS). Alternatively, the messages can be transmitted to the mobile phone (117) via other protocols, such as multimedia message service (MMS), email, instant messaging, WAP, voice mail, voice messages via an interactive voice response (IVR) system, etc.

Figure 7:
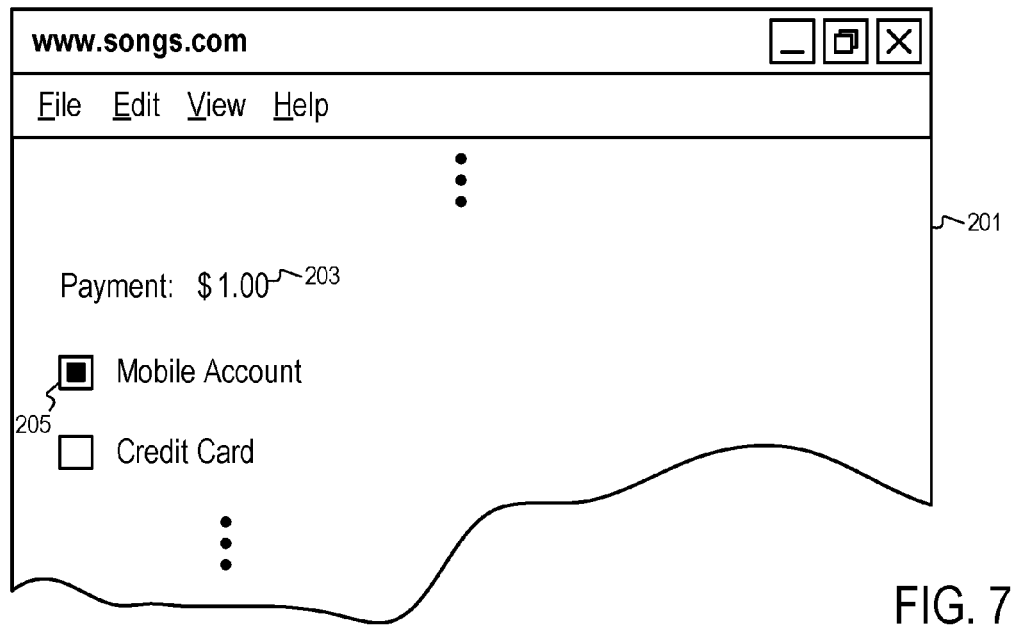
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the website of the interchange (101) to complete the payment.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
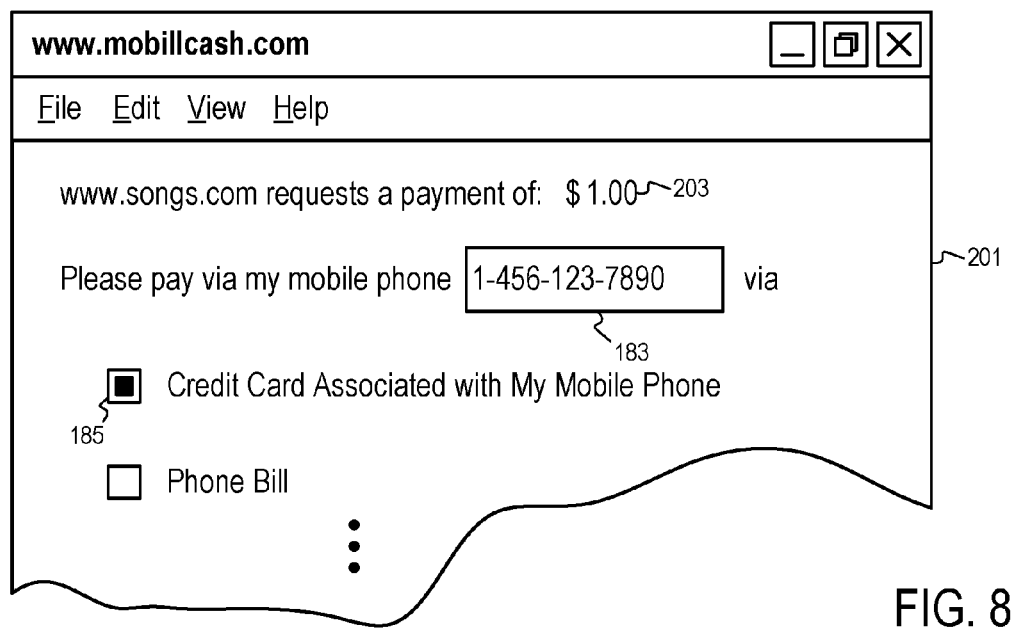
FIG. 8 illustrates a user interface to initiate a payment request according to one embodiment.

FIG. 8 illustrates a user interface to initiate a payment request according to one embodiment, after the payment request is redirected to the website of the interchange (101). In FIG. 8, the user interface (201) includes the identity of the merchant and the amount (203) of the requested payment. The user interface (201) includes a text field (183) to allow the user to provide the phone number (123) to identify the account information (121) via its association with the phone number (123) in the data storage facility (107).

Further, user authentication may be used to reduce false messages to the phone number (123). For example, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (123) to initiate the payment transaction. In some embodiments, the user interface (201) requires the user to provide no information other than the phone number (123) in the text field (183) to initiate the transaction.

In FIG. 8, the user interface (201) allows the user to select one option from a plurality of payment options, including paying via the phone bill, and paying via one or more of the accounts identified by the account information (121) associated with the phone number (123) in the data storage facility (107).

In some embodiments, the user interface (201) may present the payment options after authenticating the user (e.g., via a personal identification number or password) for enhanced security.

In some embodiments, the user interface (201) identifies the different accounts represented by the account information (121) by showing aliases of the accounts. The aliases may be previously specified by the user, or be dynamically generated by the interchange (101) based on the types of the accounts and/or portions of the account information (121) (e.g., the first or last few digits of the account number, etc.)

In one embodiment, once the user submits the payment request via the user interface (201), the interchange (101) transmits a confirmation message to the mobile phone (117) according to the phone number (123) provided in the text field (183). In one embodiment, the interchange (101) transmits the confirmation to the mobile phone (117) after the user is authenticated via the user interface (201) to reduce the possibility of unauthorized/unwelcome messages to the mobile phone (117), which may occur when the user intentionally or unintentionally provides an unrelated phone number in the entry box (183).

Figure 9:
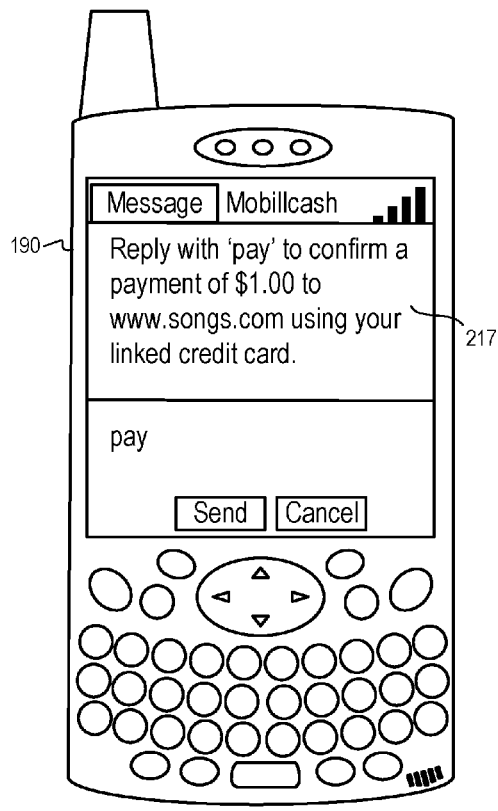
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 9.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the account, and/or a code (not shown) randomly generated and presented in the user interface used to initiate the payment transaction (e.g., user interface (201)).

In some embodiments, the code requested in the text message (217) may be a personal identification number (PIN) associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 8). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

After the correct reply is received, the interchange (101) communicates with the account server (125) to electronically charge the user using the account information (121) and pays the payee using the funds collected via communicating with the account server (125). The interchange (101) then notifies the user when the payment transaction is complete.

Figure 10:
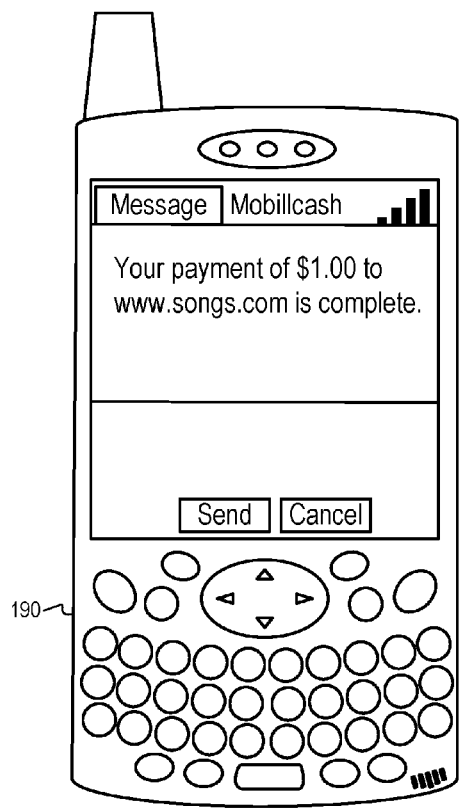
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
FIG. 11 illustrates a way to redirect a payment confirmation according to one embodiment.

FIG. 11 illustrates a way to redirect a payment confirmation according to one embodiment. For example, after the user submits the payment request to the interchange (101) via the user interface (201) shown in FIG. 8, the interchange (101) may present the user interface (201) illustrated in FIG. 11 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the user is required to provide the approval in response to the confirmation message (217), as illustrated in FIG. 9, within a predetermined period of time. If the user fails to provide the approval from the mobile phone (117) within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 12:
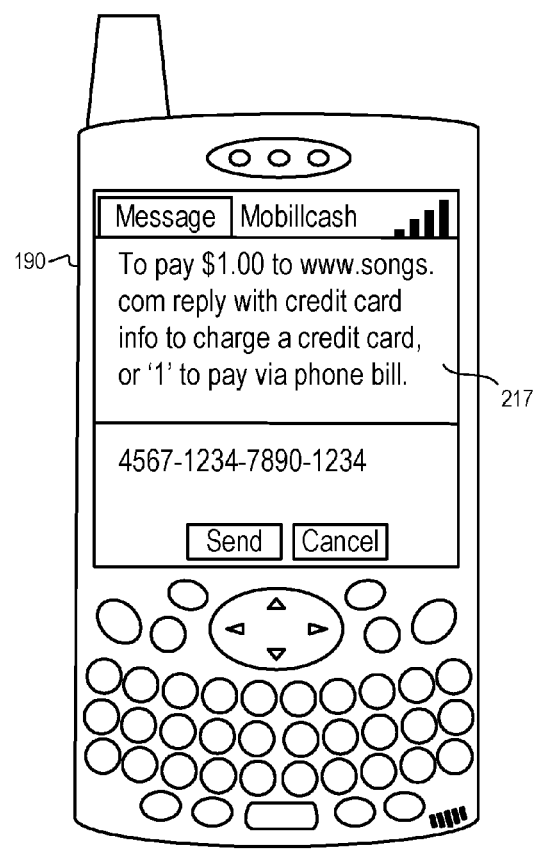
FIG. 12 illustrates a user interface to receive payment options according to one embodiment.

FIG. 12 illustrates a user interface to receive payment options according to one embodiment. In FIG. 12, the interchange (101) sends a message (217) to the mobile phone (117) to provide a number of options to the user. The message (217) identifies the amount (203) of the requested payment and the identity of the payee (e.g., a merchant operating the server (113)) and asks the user to approve the payment request via a reply that contains a selected payment option.

In FIG. 12, the user may reply with the code "1" to approve the payment request and to pay via the phone bill of the mobile phone (117). Alternatively, the user may reply with the credit card information to charge the payment to a credit card, as illustrated in FIG. 12.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.) Thus, each of the accounts can be identified to the user via the account type in the confirmation message, without revealing the details of the account information.

For example, the interchange (101) may combine the name of the financial institutions and the type of accounts to generate aliases for the account information.

In some embodiment, the user may define the aliases for the account information by supplying the aliases with the account information (121) for association with the phone number (123).

Figure 13:
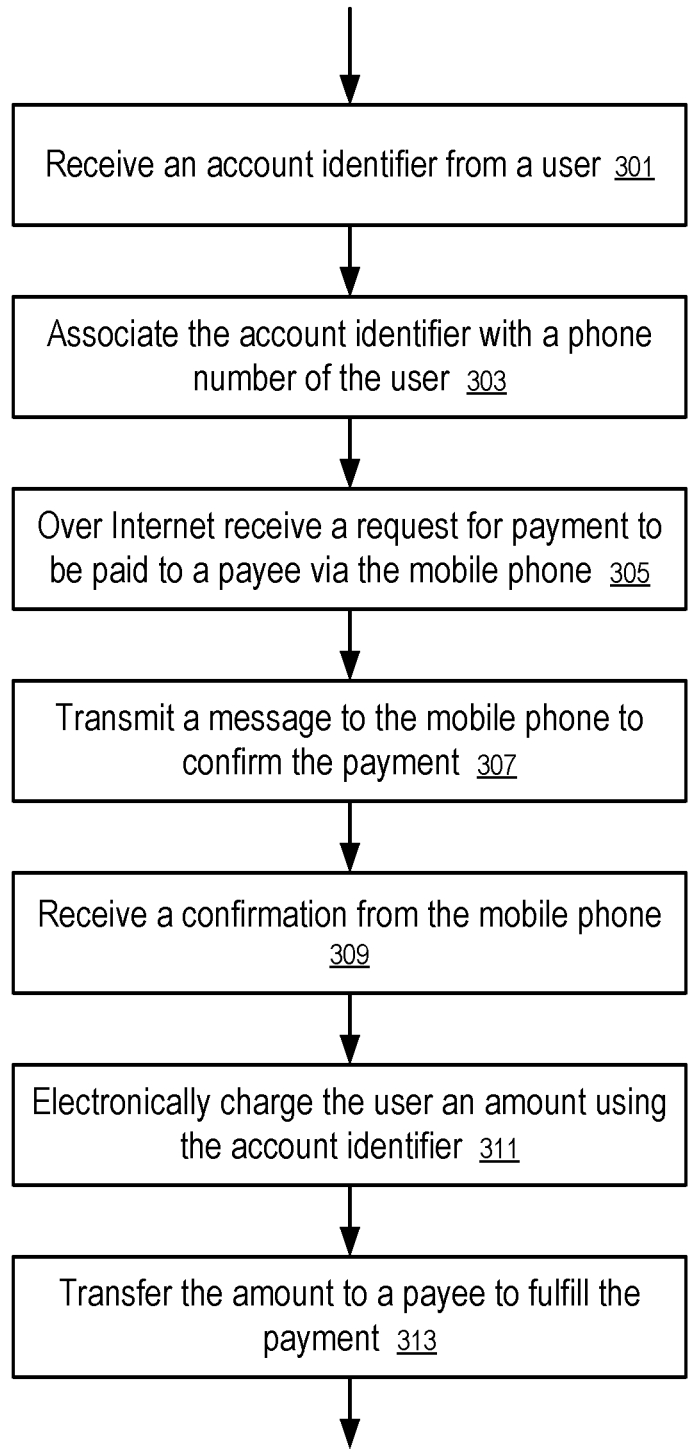
FIG. 13 shows a method to process an online payment according to one embodiment.

FIG. 13 shows a method to process an online payment according to one embodiment. In FIG. 13, the interchange (101) receives (301) an account identifier (e.g., 121) from a user and associates (303) the account identifier with a phone number (123) of the user in the data storage facility (107). Over the Internet the interchange (101) subsequently receives (305) a request for payment to be paid to a payee via the mobile phone (117) identified by the phone number (123). In response to the request, the interchange (101) transmits (307) a message (217) to the mobile phone (117) to confirm the payment.

After receiving (309) a confirmation or approval from the mobile phone (117) for the payment, the interchange (101) electronically charges (311) the user an amount using the account identifier (e.g., via communicating with the account server (125) using the account identifier). The interchange (101) then transfers (313) the amount to a payee to fulfill the payment.

Figure 14:
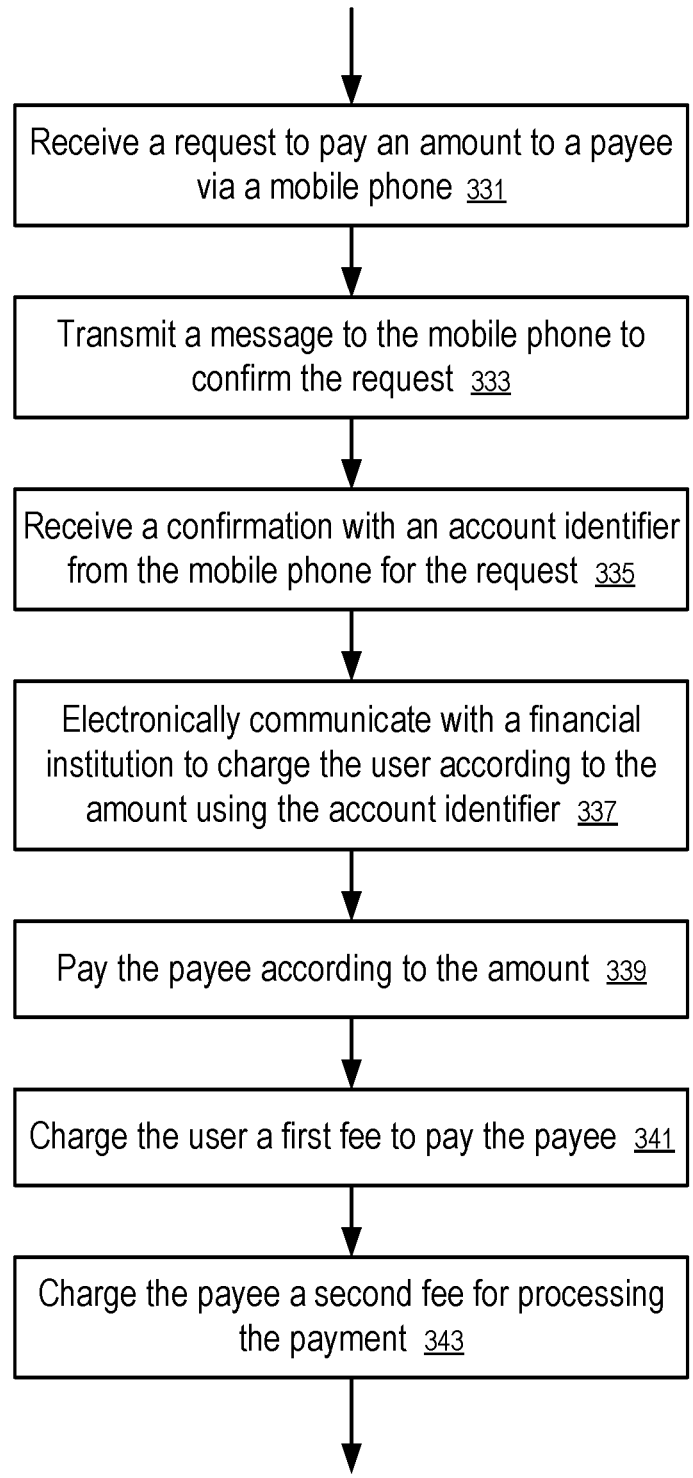
FIG. 14 shows another method to facilitate a payment transaction according to one embodiment.

FIG. 14 shows another method to facilitate a payment transaction according to one embodiment. In FIG. 14, the interchange (101) receives (331) a request to pay an amount to a payee via a mobile phone (117). The interchange (101) transmits (333) a message (217) to the mobile phone (117) to confirm the request via the converter (131) corresponding to the controller (115) of the mobile phone (117).

After the interchange (101) receives (335) a confirmation with an account identifier (e.g., 121) from the mobile phone (117) for the request, the interchange (101) electronically communicates (337) with a financial institution to charge the user the specified amount using the account identifier. The interchange (101) pays (339) the payee according to the amount, optionally charges (341) the user a first fee to pay the payee, and optionally charges (343) the payee a second fee for processing the payment.

In one embodiment, the users are given an incentive to provide the account information (121) for electronic payments via the account servers (125). For example, the interchange (101) may charge a lower fee for fulfilling payment requests via the account server (125) than for fulfilling payments requests via the phone bill. For example, the interchange (101) may offer rebates, discounts, etc. to the users who provide the account information (121). In some embodiments, the interchange (101) can complete a payment process via the account server (125) with fewer restrictions than via the phone bill.

In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., fees charged by the telecommunication carrier for collecting the funds via the mobile phone bill associated with the telephone number and/or the fees charged by the interchange (101) for processing the payments). Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, a personal identification number (PIN) is used in the confirmation of a transaction. The PIN may be stored in the user account hosted on the data storage facility (107) of the interchange (101), and be associated with the phone number (123) and/or the account information (121). For example, a user requesting a transaction using the funds associated with the phone number (123) may be required by the interchange (101) to present the correct PIN associated with the phone number (123).

In some embodiments, the PIN may be the same as a PIN used by a third party to control access to products and/or services for the user having the phone number (123). For example, the PIN for accessing the voice mail of the phone number (123) can be used by the interchange (101) to verify the identity of the user who attempts to use the funds associated with the phone number (123). For example, the interchange (101) may receive a PIN from the user and communicate with a telecommunication carrier of the phone number (123) to verify whether the received PIN is a correct PIN for accessing the voice mail of the phone number (123).

In some embodiments, a correct PIN is stored on the mobile phone (117) to control access to the services of the interchange (101). For example, an application running on the mobile phone (117) may prompt the user to provide a PIN and check the PIN received from the user against the correct PIN stored on the mobile phone (117) to determine whether the user is authorized to use the mobile phone (117) to access the services of the interchange (101). In some embodiments, the PIN is specific for the control of access to the services of the interchange (101). Without the PIN, the user may use other functions of the mobile phone (117), such as making phone calls, sending emails or text messages, etc. When it is determined that the user is authorized to use services of the interchange (101) via the mobile phone (117), the application allows the user to send a confirmation message to the interchange (101) to confirm a transaction, or to display a code received from the interchange (101) for the confirmation of the transaction via presenting the code in a web page of the interchange (101).

In some embodiments, the interchange (101) requires the user to provide the PIN associated with the phone number (123) via the mobile phone (117) at the phone number (123) to confirm a transaction. The user may provide the PIN to the mobile phone (117) which transmits the received PIN to the interchange (101) for verification. The user may provide the PIN in response to a message from the interchange (101) to the mobile phone (117) at the phone number (123), or in response to the interchange (101) presenting a request on the user terminal (111) to request the user to send to the interchange (101) a confirmation message from the mobile phone (117) at the phone number (123). Alternatively, the user may provide the correct PIN in the user terminal (111) to obtain a confirmation code, which is to be transmitted from the mobile phone (117) at the phone number (123) to confirm the transaction.

In some embodiments, the user may provide the correct combination of the PIN and the phone number (123) to the user terminal (111) to request a transaction, without the need to further confirm the request via the mobile phone (117).

In one embodiment, to further improve security, the communications from the mobile phone (117) at the phone number (123) further include an identification number stored on the mobile phone (117) (e.g., in an integrated circuit (IC) chip). For example, a software program (e.g., a Java application) can be used to read a hardware identification number from the IC chip of the mobile phone (117) and transmit a confirmation message including the hardware identification to indicate that the message is indeed from a mobile phone (117) registered with the user.

In one embodiment, the International Mobile Equipment Identity (IMEI) of the mobile phone (117) is used as the hardware identification number. Alternatively, a hardware identification number may be assigned to and stored into the mobile phone (117) when the mobile phone (117) is initially configured for the services of the interchange (101) (e.g., when the application is installed on the mobile phone (117)).

In one embodiment, when the mobile phone (117) at the phone number (123) is registered for the services of the interchange (101), a software application is installed and/or configured on the mobile phone (117). The software application can be implemented using Java programming language in one embodiment. Other programming languages can also be used. Further, in some embodiments, the application can be implemented via hardware circuits, such as Application-Specific Integrated Circuit (ASIC) or Field-Programmable Gate Array (FPGA), or a combination of special purpose hardware circuits and instructions.

Figure 15:
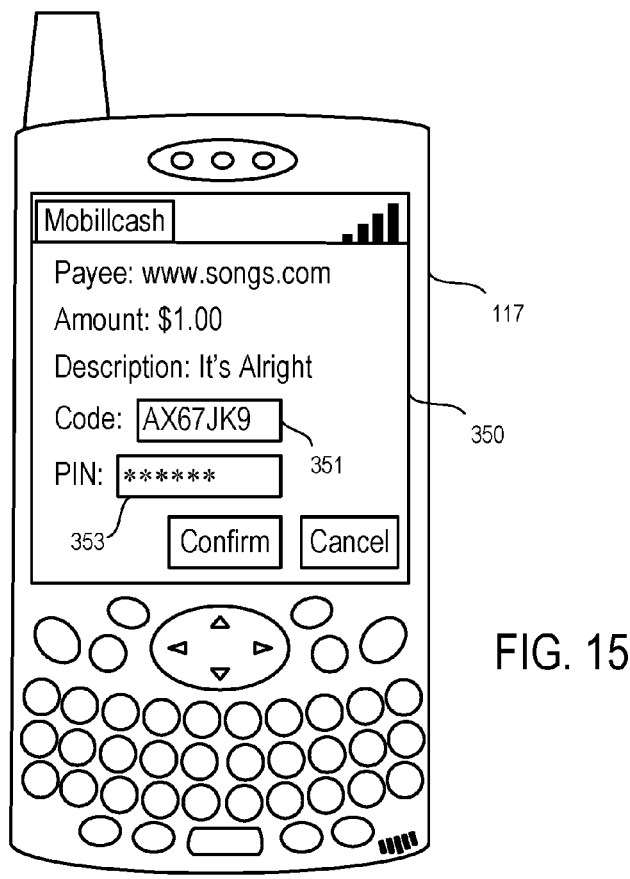
FIG. 15 illustrates a user interface to confirm a transaction according to one embodiment.

In one embodiment, the application is configured on the mobile phone (117) to present a user interface (350) to confirm a transaction according to one embodiment, as illustrated in FIG. 15. In FIG. 15, the application communicates with the interchange (101) to present information that identifies aspects of the transaction, such as the payee, the amount involved in the transaction, a description of the product or service in the transaction, etc.

In FIG. 15, the user interface (350) includes an entry box (353) to receive a PIN from the user. When the PIN received in the user interface (350) is invalid, the user interface (350) may reject the input and prevent the user from sending the confirmation message via the user interface (350).

Alternatively, the user interface (350) may accept the user input without checking the input for validity and transmit the confirmation with the received PIN to the interchange (101). The interchange (101) then checks the received PIN for validity. If the interchange (101) determines that the received PIN is valid for the phone number (123) of the mobile phone (117), the interchange (101) accepts the confirmation and performs the requested transaction. If the interchange (101) determines that the received PIN is invalid, the user interface (350) may prompt the user to re-enter the PIN.

In some embodiments, the user interface (350) and/or the interchange (101) may prevent the user from using the user interface (350) after the user fails to provide the correct PIN after a predetermined number of attempts.

In FIG. 15, the user interface (350) further includes an entry box for the user to enter a code (351) that represents the transaction. For example, when the user uses the user terminal (111) to submit a transaction request (e.g., via a web browser), the interchange (101) provides the code (351) as an identifier of the transaction.

In one embodiment, after the user enters the code (351) in the entry box, the application running the user interface (350) communicates with the interchange (101) to obtain the information about the transaction, such as the payee, the amount of the transaction, a description, etc. Thus, providing the code (351) in the entry box allows the user to see in the user interface (350) the information specific to the transaction for the confirmation of the correct transaction.

In one embodiment, the code (351) is a one-time code, which expires after the code is submitted to the interchange (101). To improve security, the interchange (101) may cause the one-time code (351) to expire after a predetermined period of time from when the one-time code (351) is provided by the interchange (101) to the user. When the one-time code (351) or the PIN is incorrect, the interchange (101) rejects the confirmation. After an incorrect combination of the PIN and the one-time code (351) is received, the interchange (101) may cause the one-time code (351) to expire; and the user is prompted to resubmit the transaction request to obtain a new one-time code.

In some embodiments, the interchange (101) may allow the user interface (350) to resubmit the input for the PIN a number of times if the one-time code (351) is valid. For example, the user interface (350) may be presented in response to a message from the interchange (101) requesting the confirmation of the transaction. The one-time code (351) is required in the entry box to ensure that the user has knowledge about the transaction submitted via the user terminal (111). The PIN is required in the entry box (353) to ensure that the user is authorized. In some embodiments, the one-time code (351) is optional.

In some embodiments, the interchange (101) provides the one-time code (351) to the user via the user interface (350). The application may send the one-time code (351) back to the interchange (101) to identify the transaction being confirmed by the user.

Alternatively, the interchange (101) may require the user to provide the one-time code (351) back to the interchange (101) via the user terminal (111) that submits the corresponding transaction request. After the one-time code (351) shown in the user interface (350) on the mobile device (117) is transmitted from the user terminal (111) to the web server of the interchange (101), the transaction is confirmed with the interchange (101).

In one embodiment, the PIN is used to protect access to the one-time code (351). The user interface (350) is configured to display the one-time code (351) after the user enters the correct PIN in the entry box (353). If the user fails to enter the correct PIN in the entry box (353), the user interface (350) does not display the one-time code (351) which is required in the user terminal (111) to confirm the transaction.

In one embodiment, the code (351) is a one-time password, which is generated on the mobile phone (117). The one-time password is provided to the interchange (101) to confirm the transaction (e.g., via the mobile phone (117) communicating with the interchange (101), or via the user terminal (111) communicating with the interchange (101)).

In one embodiment, the one-time password is generated on the mobile phone (117) after the request for the transaction is submitted to the interchange (101) via the user terminal (111). The one-time password is not received in the mobile phone (117) from the interchange (101) as a result of the transaction request. In one embodiment, the one-time password is generated based at least in part on a seed that is configured in the mobile phone prior to the transaction.

In one embodiment, the one-time password is generated on the mobile phone (117) after the PIN is verified in the entry box (353). If the PIN entered in the entry box (353) is invalid, the mobile phone (117) does not generate the one-time password.

In one embodiment, the user is instructed to use the one-time password to authenticate with the interchange (101), using the user terminal (111) that submits the request for the transaction. Alternatively, the mobile phone (117) may transmit the one-time password to confirm the transaction. In some embodiments, the mobile application generates the one-time password and transmits the one-time password to the interchange (101) to confirm the transaction, without displaying the one-time password to the user, after the user enters the correct PIN.

In one embodiment, the correct PIN is stored on the mobile phone (117) (e.g., in an encrypted format). Thus, the user interface (350) can verify the PIN entered in the entry box (353) without communicating with the interchange (101).

Alternatively, the correct PIN may be stored on the data storage facility (107) of the interchange (101). The application running on the mobile phone (117) communicates the PIN received in the entry box (353) to the interchange (101) (e.g., in an encrypted format) for verification.

Alternatively, a third party may store the correct PIN (e.g., for controlling access to the voice mail of the phone number (123)). After the interchange (101) obtains the PIN received in the entry box (353), the interchange (101) communicates with the third party to verify the PIN.

Figure 16:
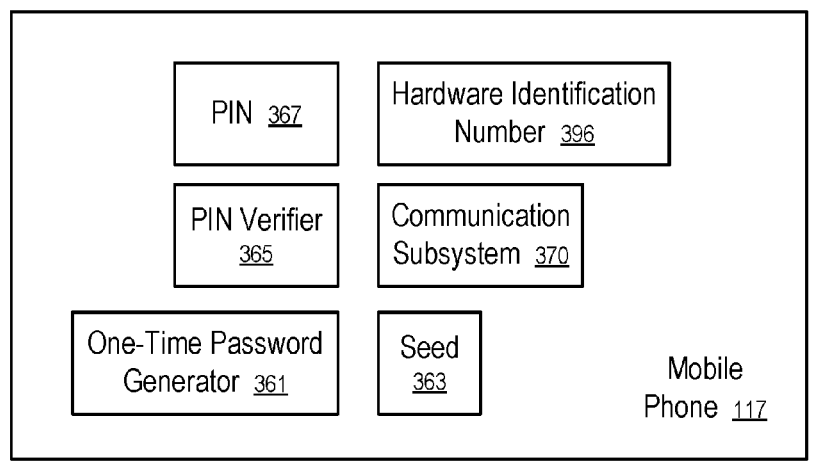
FIG. 16 illustrates a mobile phone configured to confirm transactions according to one embodiment.

FIG. 16 illustrates a mobile phone configured to confirm transactions according to one embodiment. In FIG. 16, the mobile phone (117) includes a hardware identification number (396) which identifies the mobile phone (117). In one embodiment, the hardware identification number (396) is configured and stored on the mobile phone (117) prior to the mobile phone (117) being distributed to end users. For example, the hardware identification number (396) may include International Mobile Equipment Identity (IMEI) and/or Media Access Control address (MAC address).

In some embodiments, the hardware identification number (396) includes a number that is assigned to the mobile phone (117) when the mobile phone (117) is registered with the interchange (101) for the services provided by the interchange (101). For example, the interchange may use an application to write the assigned number into an integrated circuit (IC) chip in the mobile phone to identify the mobile phone (117). In some embodiments, the assigned number is written into a removable memory module to represent the registered mobile phone (117).

In FIG. 16, the mobile phone (117) includes a seed (363) for the one-time password generator (361). The one-time password generator (361) is configured to generate a series of passwords for authenticating with the interchange (101), based on the seed (363) and/or the current time. Thus, the one-time password generated on the mobile phone (117) is in synchronization with the corresponding one-time password generated or used on the interchange (101). Alternatively, the one-time password generator (361) may not rely upon the current date and time for synchronization; and the interchange (101) is configured to tolerate skipping of up to a predetermined number of one-time passwords to accept a one-time password from the mobile phone (117).

In one embodiment, the PIN verifier (365) is configured to check the PIN received in the entry box (353) against the PIN (367) stored on the mobile phone (117). After the PIN verifier (365) determines that there is a match between the PIN (367) stored on the mobile phone (117) and the PIN received in the entry box (353), the communication subsystem (37) transmits a one-time password obtained from the one-time password generator (361) and the hardware identification number (396) to the interchange (101) to confirm the transaction. In one embodiment, the one-time password is used to encrypt the confirmation transmitted from the mobile phone (117) to the interchange (101) to confirm the transaction.

The mobile phone (117) may transmit the confirmation message to the interchange (101) via short message service (SMS), email, a WAP request, or a web request. Other communication protocols can also be used.

Figure 17:
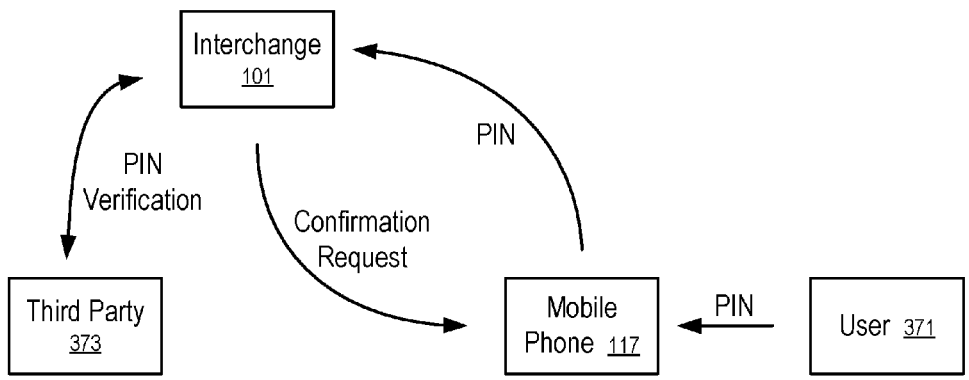
FIGS. 17-19 illustrate methods to confirm transactions according to one embodiment.
Figure 18:
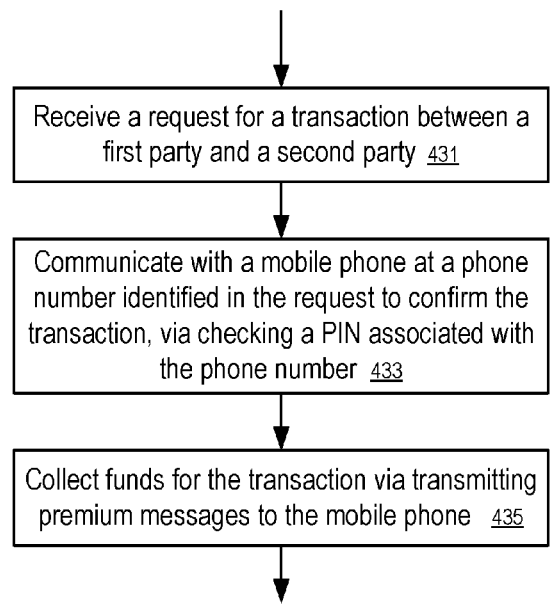
Figure 19:
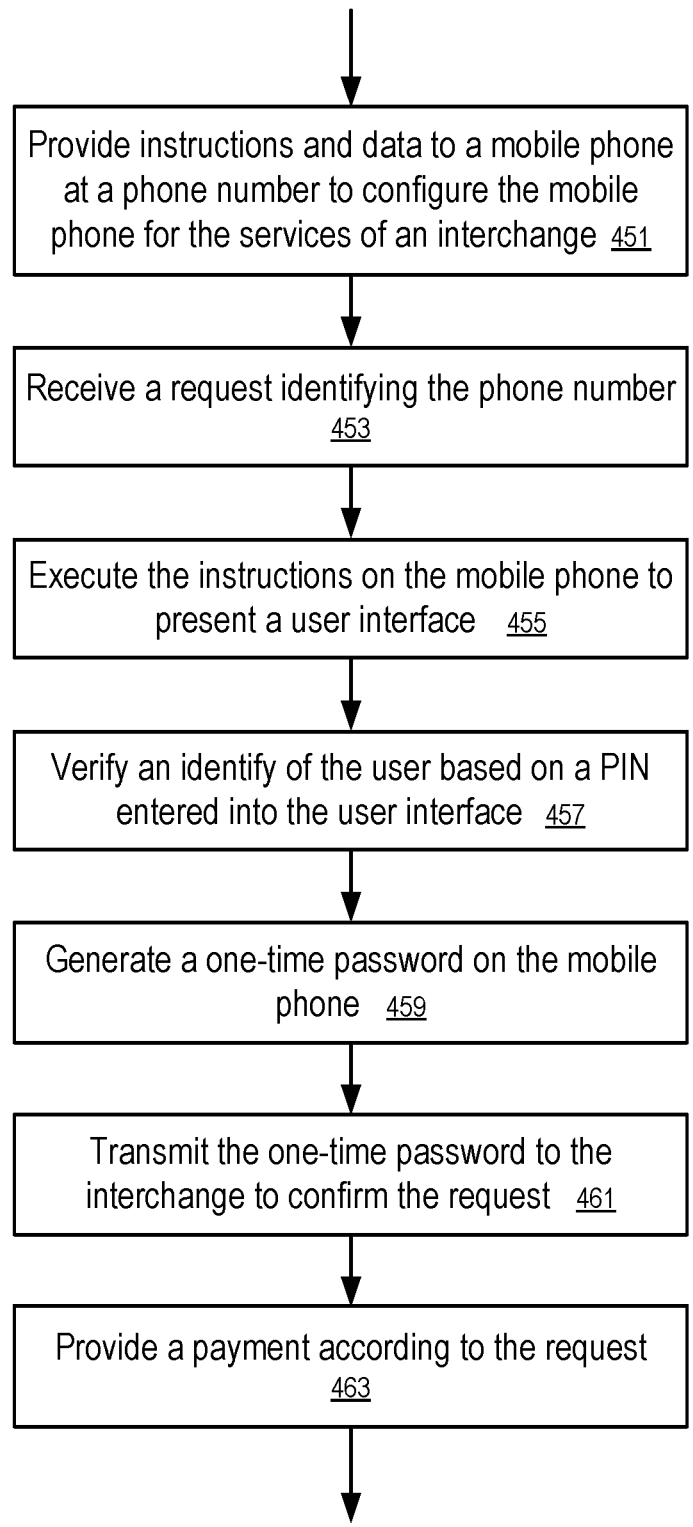

FIGS. 17-19 illustrate methods to confirm transactions according to one embodiment.

In FIG. 17, neither the interchange (101) nor the mobile phone (117) stores the correct PIN associated with the phone number of the mobile phone (117). A third party (373) stores the correct PIN associated with the phone number (123) of the mobile phone (117). To confirm a transaction, the interchange (101) transmits a message to the mobile phone (117) at the phone number (123) to request a confirmation message from the mobile phone (117). The mobile phone (117) presents a user interface (e.g., 350) to receive an input for the PIN from the user (371) and transmits the received PIN to the interchange (101), which further communicates with the third party (373) to verify whether the received PIN matches the correct PIN. Thus, the user may use the same PIN for multiple services associated with the phone number (123), such as accessing voice mail at the phone number (123) and paying for purchases using funds associated with the phone number (123).

In FIG. 18, after a request for a transaction between a first party and a second party (431) is received in the interchange (101) (e.g., via a web server), the interchange (101) communicates (433) with the mobile phone (117) at a phone number (123) identified in the request to confirm the transaction, via checking a PIN associated with the phone number (123). The transaction is confirmed if a PIN entered into the mobile phone (117) by the user of the mobile phone (117) is correct. After the transaction is confirmed, the interchange (101) collects (435) funds for the transaction via transmitting premium messages to the mobile phone (117).

In FIG. 19, the interchange (101) provides (451) instructions and data to a mobile phone (117) at a phone number (123) to configure the mobile phone (117) for the services of the interchange (101). The instructions may be in Java programming language, or other programming languages. The data may include a seed (363) for the one-time password generator (361) and/or a portion of the hardware identification number (396). For example, the user may use the mobile phone (117) to download the instructions and data from the interchange (101).

After the mobile phone (117) is configured via the instructions and data, the interchange (101) may receive (453) a request identifying the phone number (123) and transmit a message to the user (371) to cause the mobile phone (117) to execute (455) the instructions on the mobile phone (117) to present a user interface (350). After the identify of the user (371) is verified (457) based on a PIN entered into the user interface (350), the mobile phone (117) generates (459) a one-time password on the mobile phone (117) and transmits (461) the one-time password to the interchange (101) to confirm the request. Once the request is confirmed via the confirmation transmitted from the mobile phone (117), the interchange (101) provides (463) a payment according to the request (e.g., using funds associated with the phone number (123)).

In one embodiment, the interchange (101) includes a server computer. The server computer may be used to receive a request for a transaction between a first party and a second party. The request includes the indication of a phone number of the first party and an amount to be paid to the second party.

In response to the request, the server computer communicates with a mobile phone (117) at the phone number (123) to confirm, via a personal identification number of the first party, the transaction. After the transaction is confirmed via the personal identification number of the first party, the server computer transmits one or more premium messages to the mobile phone (117) to collect, via a telecommunication carrier of the mobile phone (117), funds in accordance with the amount to be paid to the second party.

In one embodiment, the interchange (101) provides instructions to the mobile phone (117). When executed, the instructions cause the mobile phone (117) to present a user interface to receive a first personal identification number.

The instructions may further cause the mobile phone (117) to encrypt the first personal identification number for transmission from the mobile phone (117) to the server computer. The server computer is to compare the first personal identification number with a second personal identification number associated with the phone number (123) of the mobile phone (117) to determine whether the transaction is confirmed.

Alternatively, the instructions may further cause the mobile phone (117) to compare the first personal identification number with a second personal identification number stored on the mobile phone (117) to determine whether the first personal identification number is correct. After determining that the first personal identification number is correct, the instructions further cause the mobile phone (117) to transmit a message to the server computer to confirm the transaction.

In one embodiment, the instructions further cause the message to include a hardware identification code of the mobile phone (117). The hardware identification code may be provided to the mobile phone (117) in a read-only memory, before the mobile phone (117) is distributed to an end user. For example, the hardware identification code may include International Mobile Equipment Identity (IMEI).

In some embodiments, the hardware identification code is provided to the mobile phone (117) when the mobile phone (117) is registered with the server computer for services offered by the server computer.

In one embodiment, the instructions further cause the mobile phone (117) to transmit the message to the server computer via short message service (SMS). In some embodiments, the message includes a one-time password generated via the instructions. For example, the one-time password can be generated based on a current time; and the server computer is to determine whether the one-time password is generated by the mobile phone (117). When the one-time password matches a series of passwords configured to be generated by the mobile phone (117), the one-time password is accepted. In one embodiment, the server computer provides to the mobile phone (117) at the phone number (123), a seed for generation of the one-time password, which is used by the instructions to generate the one-time password.

In one embodiment, the server computer provides the first party with a seed for one-time password generation when the first party registers for services of the server computer; and the instructions cause the mobile phone (117) to present a user interface to receive the seed.

In one embodiment, the server computer is to further communicate with a third party to determine whether the first personal identification number received in the user interface is associated with the phone number (123) of the mobile phone (117). For example, the third party may be a telecommunication carrier of the mobile phone (117); and a correct personal identification number is used by the telecommunication carrier to control access to voice mails for the phone number (123).

In one embodiment, the request is received in a web server of the server computer; the server computer communicates with the mobile phone (117) to provide a one-time code to the mobile phone (117), after the personal identification number of the first party is verified via the mobile phone (117); and the server computer is configured to receive the one-time code back in the web server to confirm the transaction.

In one embodiment, the request is received in a web server of the server computer; the server computer provides a one-time code via the web server to the first party; and the server computer is configured to determine whether the transaction is confirmed based on receiving, from the mobile phone (117), both the personal identification number of the first party and the one-time code.

In one embodiment, the interchange (101) is used to facilitate user authentication for signing in accounts on servers (113) that may be operated by entities different from the entity that operates the interchange (101). The interchange (101) can also be used for user authentication at a server (113) when the server (113) is operated by the same entity that operates the interchange (101).

For example, in one embodiment, a user can provide a mobile phone number (123) to identify the user for signing into an account-based service hosted on the server (113). The user can use the mobile phone number (123) to make a request to login; and the interchange (101) communicates with the mobile phone (117) at the mobile phone number (123) to authenticate the identity of the user for the system hosted on the server (113). The user can use the mobile phone (117) to complete the authentication to access an application or service.

The mobile phone number (123) can be tied or bound to existing accounts and/or new accounts of the user, hosted on various servers (113), for authentication purposes. These accounts may have different type definitions and can vary depending on system setup. For example, the user can use the mobile phone number (123) to authenticate/login to a bank account, an online account, a credit card account, a checking account, an email account, etc. In one embodiment, the interchange (101) provides an Internet-based service to authenticate a mobile phone number (123) to an account and verify the identity of the user (e.g., using two-factor authentication or multi-factor authentication).

In one embodiment, the interchange (101) is further used to provide payments to the servers (113) for accessing the accounts or for accessing premium contents or features through the accounts. The interchange (101) may be used to pay for the purchases made via the accounts. Alternatively, the interchange (101) may provide the authentication service without having to use the funds associated with the mobile phone number (123) to make payments on behalf of the user.

Figure 20:
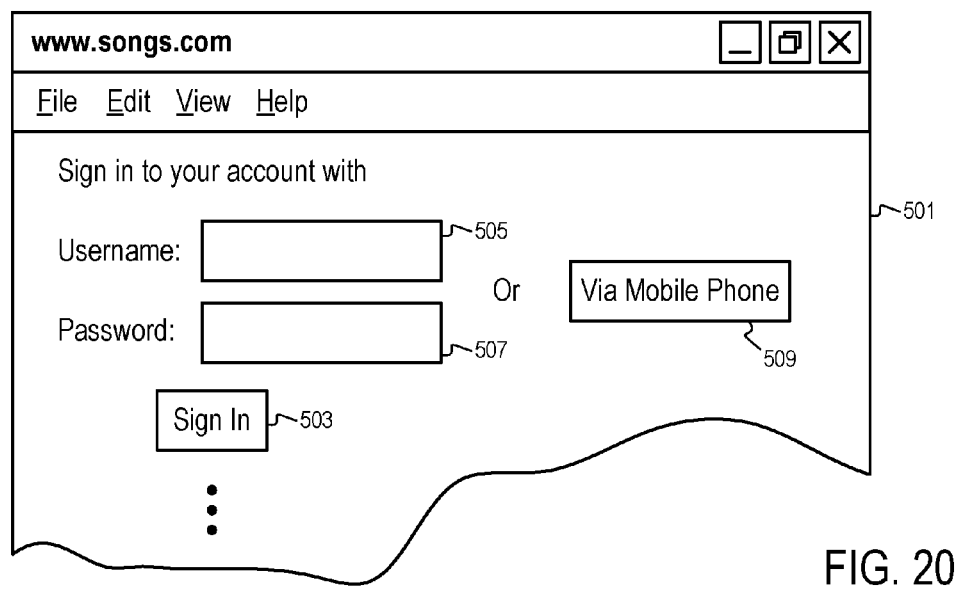
FIG. 20 shows a user interface to sign a user in according to one embodiment.

FIG. 20 shows a user interface to sign a user in according to one embodiment. In FIG. 20, the user interface is presented via a browser window (501) on the user terminal (111). The user interface allows the user to sign in by providing the username (505) and the password (507) and selecting the "sign in" button (503). In addition, the user is also allowed to select the button (509) to sign in via the mobile phone (117) of the user.

In some embodiments, the server (113) may not allow the user to sign in using the username (505) and the password (507) and may require the user to sign in via the mobile phone (117) of the user. Thus, the users of the server (113) do not have to use the username (505) and the password (507) created specifically for the server (113).

Figure 21:
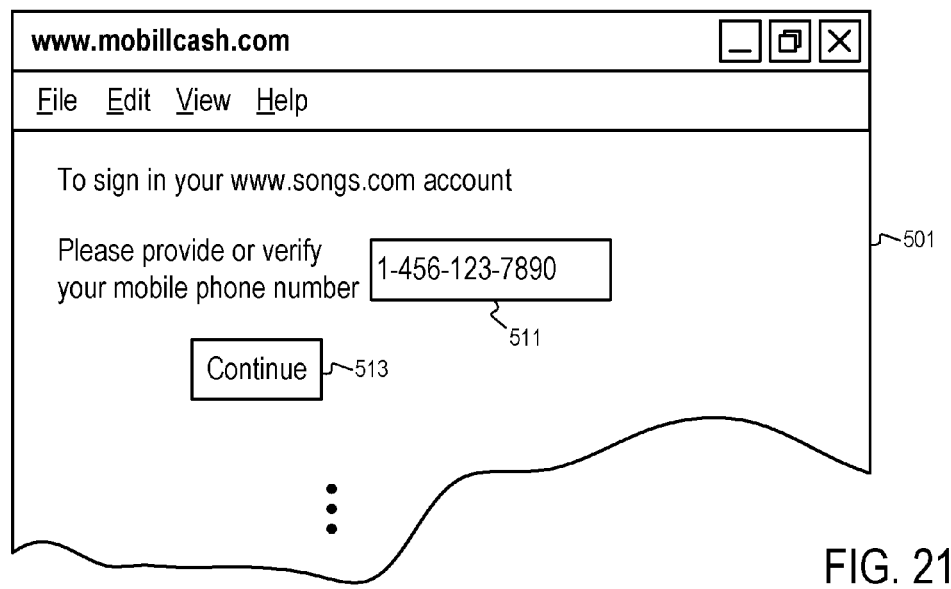
FIG. 21 shows a user interface to obtain a phone number to sign a user in according to one embodiment.

In one embodiment, after the user selects the button (509), the server (113) redirects the user to a website of the interchange (101) for authentication, as illustrated in FIG. 21.

FIG. 21 shows a user interface to obtain a phone number to sign a user in according to one embodiment. In FIG. 21, the website of the interchange (101) promotes the user to provide or verify the phone number (123) in the entry box (511).

In one embodiment, the website of the interchange (101) uses a browser cookie to store the phone number (123). Thus, after the user provides the phone number (123) in the entry box (511) to sign in one account via the interchange (101), the web page as illustrated in FIG. 21 can use the browser cookie to store the phone number (123) and automatically fill in the entry box (511) when the user is again redirected to the website of the interchange (101) (e.g., by the same server (113) to sign in the same account, or a different server to sign in a different account).

In another embodiment, the phone number (123) is provided by the web page after the user first provides the phone number (123) in the entry box (511) during a previous session of visiting the website of the interchange (101). The interchange (101) stores the phone number (123) in connection with an identification of the session such that when the user is redirected back to the website of the interchange (101) in the same session, the interchange (101) can automatically fill the entry box (511) with the phone number (123) previously provided in the session.

In one embodiment, when the user selects the button (513), the interchange (101) communicates with the mobile phone (117) at the phone number (123) to authenticate the user. For example, the interchange (101) can transmit a text message to the mobile phone (117) to request the PIN of the user from the mobile phone (117) at the phone number (123).

In some embodiments, the interchange (101) may require the user to sign in to the website of the interchange (101) (e.g., using a username and a corresponding password), when the phone number (123) is first received in the entry box (511) for a browser session. Such a requirement may be used to reduce or eliminate unintended spamming by the interchange (101), due to the user entering in the text entry box (511) a phone number that does not belong to the user. After the user signs in to the website of the interchange (101), the interchange (101) may pre-fill the entry box (511) based on profile information about the user stored on the data storage facility (107) of the interchange (101).

In some embodiments, the interchange (101) further authenticates the user via communicating with the mobile phone (117) at the phone number (123). For example, the interchange (101) can transmit a text message to the mobile phone (117) to request the PIN of the user from the mobile phone (117) at the phone number (123) to complete signing in to the website of the interchange (101).

In one embodiment, when the user is returning to a valid, previously authenticated browser session for the authentication process of a server (113), the interchange (101) may skip communicating with the mobile phone (117) for the authentication of the user. For example, when the user is retuning to a valid browser session on the website of the interchange (101) for signing into the server (113), the interchange (101) may request the user to present the password for the website of the interchange (101); and if the correct password is received, the mobile phone (117) may rely upon the previous communication with the mobile phone (117) in the valid browser session to complete the authentication for the server (113), without a new communication with the mobile phone (117) to confirm the identity of the user.

Alternatively, when the user is returning to the valid, previously authenticated browser session for the authentication into the server (113), the interchange (101) may skip the authentication via username and password on the website of the interchange (101), but still require the user to confirm identity via the mobile phone (117) at the phone number (123).

In some embodiments, when the user is returning to the valid, previously authenticated browser session for the authentication into the server (113), the interchange (101) may skip the need to further authenticate the user via the website of the interchange (101) and/or via the mobile phone (117).

In some embodiments, after the interchange (101) confirms the identity of the user via the mobile phone (117), the user on the user terminal (111) is signed in to the website of the interchange (101) until the user signs out, or the session is closed or expires.

In other embodiments, the interchange (101) may not require the user to sign in to the website of the interchange (101).

Figure 22:
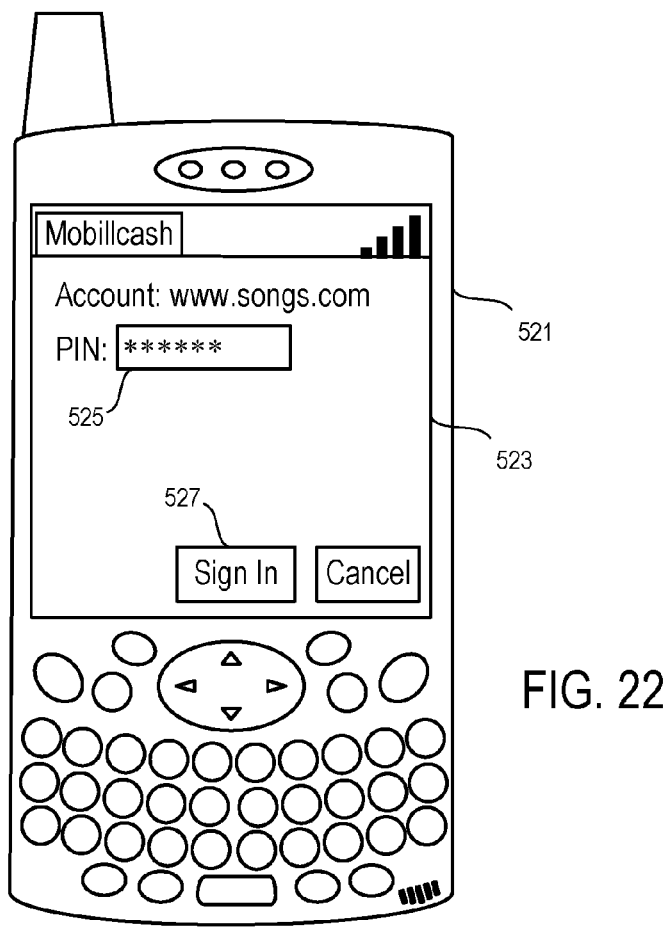
FIG. 22 shows a mobile user interface to confirm the identity of a user according to one embodiment.

FIG. 22 shows a mobile user interface to confirm the identity of a user according to one embodiment. In FIG. 22, the user interface (521) is presented on the mobile phone (117) at the phone number (123) specified by the user to sign in. The message (523) presented in the user interface (521) identifies the server (113) (e.g., www.songs.com) which requested the interchange (101) to authenticate the user. The interface (521) requires the user to provide the PIN (525) to confirm the identity of the user.

In one embodiment, after the user selects the "sign in" button (527) in FIG. 22, the interchange (101) verifies the PIN (525) received via the mobile phone (117). If the correct PIN (525) is received from the mobile phone (117), the interchange (101) provides information to the server (113) to allow the user to sign in an account on the server (113).

In one embodiment, the user account on the server (113) is identified by the phone number (123) and/or the PIN (525). For example, in one embodiment, the phone number (123) is directly used to specify the account on the server (113). For example, a hash of the phone number (123), the PIN (525) and/or the identity of the server (113) can be used to represent the account of the user on the server (113).

In some embodiments, the phone number (123), the PIN (525) and/or the identity of the server (113) are used to look up an identifier of the account of the user on the server (113).

For example, in one embodiment, when a new account is created on the server (113) for the user, the user is redirected to the website of the interchange (101) for authentication or confirmation (e.g., via a user interface similar to that shown in FIG. 21). After the user request to create the new account is confirmed via the mobile phone (117), the user account is associated with the mobile phone (117) and/or the PIN (525).

For example, in one embodiment, when the user is redirected to the website of the interchange (101) for the confirmation, the identifier of the account can be provided from the server (113) to the website of the interchange (101) via the URL that redirected the request. After the interchange (101) receives the PIN (525) from the mobile phone (117), the identifier of the account is stored in the data storage facility (107) as part of the account info (121) associated with the phone number (123) and/or the PIN (525). In one embodiment, the account identifier is communicated from the server (113) to the interchange (101) via the web browser of the user in an encrypted format to prevent tampering and for increased security.

Alternatively, the server (113) may communicate the account identifier to the interchange (101) directly, without going through the user terminal (111). For example, the server (113) may provide a session identifier, or a request identifier, to the interchange (101) when the server (113) redirects the user to the website of the interchange (101). The server (113) separately communicates the account identifier associated with the session identifier, or the request identifier, directly to the interchange (101) (e.g., via an Application Programming Interface, or a web service). The session identifier, or the request identifier, thus allows the interchange (101) to associate the account identifier with the phone number (123) provided by the user.

In some embodiments, an existing account of the user can also be linked to the phone number (123) of the user in a similar way as linking a new account to the phone number (123).

In some embodiments, the server (113) may request the user to provide the correct username (505) and the password (507) in the user interface similar to that illustrated in FIG. 20, before the user is authenticated via the mobile phone (117). After the server (113) authenticates the user via the username (505) and the password (507), the server (113) requests the interchange (101) to further authenticate the user via the mobile phone (117). For example, in one embodiment, the button (509) is not displayed; and when the "sign in" button (503) is selected, the browser is directed or redirected to the website of the interchange (101) for authentication via the mobile phone (117).

In one embodiment, the server (113) may store the phone number (123) in the account of the user; and after the user is authenticated via the username (505) and the password (507), the server (113) may communicate with the interchange (101) in the background to request the interchange (101) to further authenticate the user via the mobile phone (117).

Figure 23:
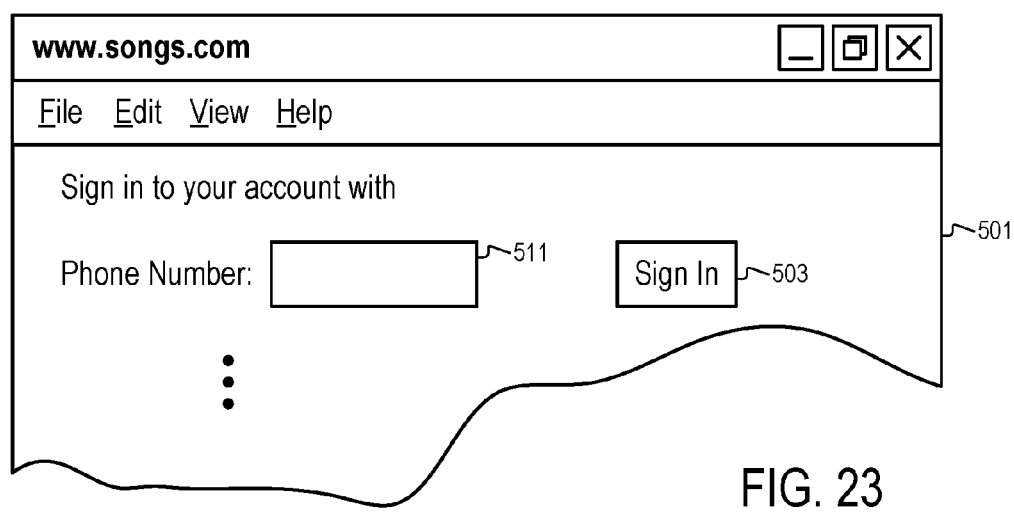
FIG. 23 shows another user interface to sign a user in according to one embodiment.

In some embodiments, the user may provide the phone number (123) to the server (113) to identify the account of the user; and the server (113) communicates with the interchange (101) in the background to request the interchange (101) to authenticate the user via the mobile phone (117), without redirecting the user to the website of the server (113), as illustrated in FIG. 23.

FIG. 23 shows another user interface to sign a user in according to one embodiment. In FIG. 23, the server (113) provides a user interface in the browser window (501). After the user provides the phone number (123) in the entry box (511) in the browser window (501), the user may select the "sign in" button (503) to request access. Before the server (113) allows the user to access the restricted areas of the account associated with the phone number (123) provided in the entry box (511), the server (113) communicates with the interchange (101) for user authentication via the mobile phone (117) at the phone number (123). For example, the user may be required to provide a PIN associated with the phone number (123) to pass the authentication process; the user may be provided with a one-time code via a web page presented in the web browser (501) and be instructed to provide the one-time code back to the interchange (101) via the mobile phone (117) at the phone number (123); and/or the user may be provided with a one-time code via the mobile phone (117) at the phone number (123) and instructed to provide the one-time code back to the website of the server (113) via the web browser (501). In some embodiments, the one-time password generated on the mobile phone (117), as discussed above, can be used in the authentication process.

In some embodiments, after the user selects the "sign in" button (503) in FIG. 23, the user is redirected to the website of the interchange (101) for a user interface as illustrated in FIG. 21.

In some embodiments, the user interface as illustrated in FIG. 21 is presented as a portion of the login page of the server (113).

In one embodiment, the user may initiate the login process via visiting a web page of the interchange (101), on which the user selects/identifies the server (113) the user wants to access and provides the phone number (123) to initiate the mobile phone (117) based on the authentication. After the interchange (101) completes the user authentication via the mobile phone (117) at the phone number (123), the interchange (101) identifies the account of the user at the server (113) and forwards the user to the server (113). The server (113) may or may not further authenticate the user.

In one embodiment, the user can sign in a browser session with a website of the interchange (101), authenticated via the mobile phone (117). From the authenticated session on the website of the interchange (101), the user can be forwarded to various different accounts of the user hosted on different servers (113), with or without being further authenticated by the respective servers (113). The interchange (101) automatically identifies the accounts of the user, based on the phone number (123) and/or the PIN of the user, to forward the user to the respective accounts on the servers (113).

In one embodiment, multiple users may share the same phone number (123) to access different, individual accounts of the users. The interchange (101) is configured to distinguish the user via different PINs of the users and/or different user identifiers. Alternatively, the interchange (101) may use only the phone number (123) to identify the user; and users not sharing the same accounts are required to use different phone numbers for mobile phone based authentication.

Figure 24:
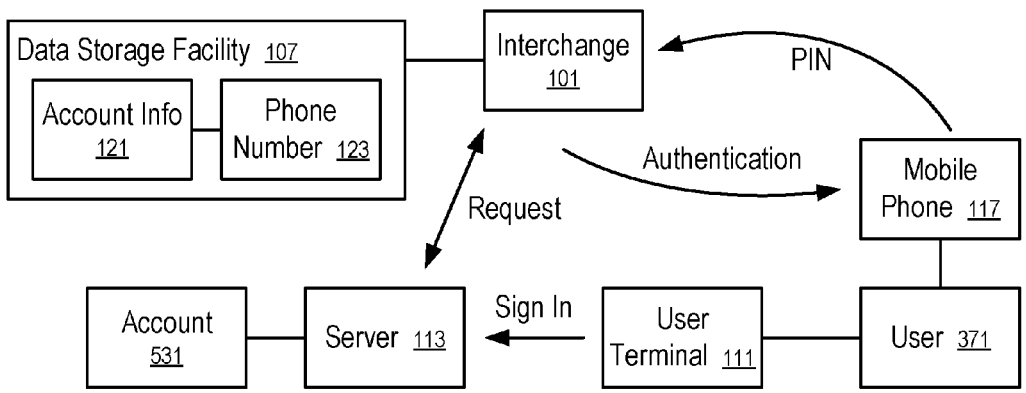
FIG. 24 shows a system to sign a user in according to one embodiment.

FIG. 24 shows a system to sign a user in according to one embodiment. In FIG. 24, the interchange (101) has a data storage facility (107) to store account information (121) associated with the phone number (123). The account information (121) may include a PIN associated with the phone number (123), data for a one-time password generated on the mobile phone (117) at the phone number (123) (e.g., the seed for the generation of one-time passwords), a one-time code presented to the user (e.g., via the web browser (501) or via the mobile phone (117)) that is to be received back from the user, the account identifiers of the user on different servers (113), etc.

In FIG. 24, the user (371) may use the user terminal (111) to sign in the account (531) hosted on the server (113). To authenticate the user (371), the interchange (101) transmits a message to the mobile phone (117) at the phone number (123) to request a PIN from the user (371). When the PIN received via the mobile phone (117) matches with the account information (121) stored on the data storage facility (107), the interchange (101) provides information to the server (113) to allow the user (371) to access the account (531) using the user terminal (111), which is typically a device distinct and separate from the mobile phone (117).

In some embodiments, the PIN received from the mobile phone (117) includes a one-time password received from the mobile phone (117). In some embodiments, the PIN includes a one-time code provided to the user (371) via the user terminal (111). In other embodiments, a one-time code is provided to the user (371) via the authentication message from the interchange (101) to the mobile phone (117); and the user (371) is requested to provide the one-time code back to the interchange (101) via the user terminal (111) (e.g., via the server (113), or directly to the website of the interchange (101)).

In one embodiment, the interchange (101) looks up the identifier of the account (531) from the account information (121), based on the phone number (123) and/or the PIN. The interchange (101) provides the account identifier to the server (113) to allow the user (371) to access the account (531) identified by the account identifier.

In some embodiments, the user (371) has multiple accounts on the server (113) that are associated with the phone number (123). The interchange (101) identifies the accounts to the server (113) to allow the user (371) to access any of the accounts, after the identity of the user (371) is verified via the mobile phone (117).

In one embodiment, the server (113) is configured to identify the account (531) based on the phone number (123); and the interchange (101) may communicate with the server (113) to indicate whether the user (371) failed or succeed in passing the authentication process.

Figure 25:
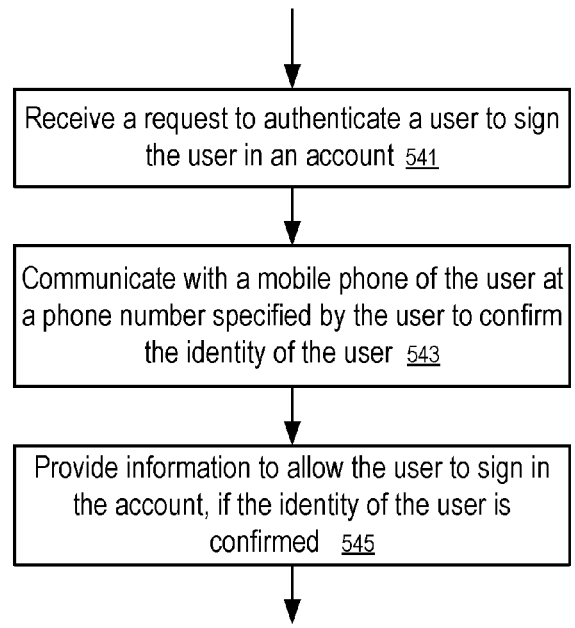
FIG. 25 shows a method to sign a user in according to one embodiment.

FIG. 25 shows a method to sign a user in according to one embodiment. In FIG. 25, the interchange (101) receives (541) a request to authenticate a user (371) to sign the user (371) in an account (531). The interchange (101) communicates (543) with a mobile phone (117) of the user (371) at a phone number (123) specified by the user (371) to confirm the identity of the user (371). The interchange (101) provides (545) information to the server (113) to allow the user (371) to sign in the account (531) on the server (113), if the identity of the user (371) is confirmed via the interchange (101) communicating with the mobile phone (117).

In one embodiment, the request includes a web request from a browser (501) of the user (371), redirected from the host of the account (531) (e.g., server (113)) to the website of the interchange (101).

In one embodiment, the interchange (101) provides a user interface on the browser (501) of the user (371) to receive the phone number (123) specified by the user (371), as illustrated in FIG. 21.

In one embodiment, in communicating with the mobile phone (117), the interchange (101) receiving a personal identification number (PIN) from the mobile phone (117) of the user (371); and the identity of the user (371) is not confirmed by the interchange (101) if the PIN is not associated with the phone number (123) prior to the receiving of the request.

In one embodiment, the interchange (101) redirects the web browser (501) from the website of the interchange (101) to the server (113) hosting the account (531); and the information provided by the interchange (101) to the sever (113) includes an identifier to uniquely represent the user (371) among a plurality of users (or to uniquely identify the account (531) among a plurality of accounts hosted on the server (113)). In one embodiment, the identifier is generated from hashing the mobile phone number (123) and the PIN; in another embodiment, the identifier is pre-associated with the phone number (123) and the host.

In one embodiment, the account (531) is a new account of the user (371) created on the server (113) hosting the account (531); and the information provided from the interchange (101) to the server (113) associates the account identifier with an identifier representing the user (371). Subsequently, when the user (371) is authenticated by the interchange (101) via the mobile phone (117), the interchange (101) indicates to the server (113) that the user (371) represented by the user identifier has passed the authentication process, which allows the server (113) to grant the user (371) access to all accounts hosted on the server (113) and associated with the user identifier.

In one embodiment, the information is provided by the interchange (101) to the server (113) hosting the account (531) without going through the user (371). Alternatively, the information provided by the interchange (101) to the server (113) hosting the account (531) is communicated via redirecting the web browser (501) of the user (371).

In one embodiment, the request includes an identification code to identify a session initiated on the server (113) hosting the account (531) to sign in the user (371); and the information provided from the interchange (101) to the server (113) includes the identification code.

In one embodiment, the user (371) has a plurality of accounts on the server (113); and the information provided from the interchange (101) to the server (113) allows the user (371) to access the plurality of accounts.

In one embodiment, the interchange (101) determines an identifier of the account (531) based on the communicating with the mobile phone (117), and provides the identifier of the account (531) of the user (371) to the server (113) to allow the user (371) to access the account (531).

In one embodiment, the interchange (101) receives (541) the request, including the phone number (123), from the server (113) without going through the user (371). For example, based on the username identified by the user (371), the server (113) may look up the phone number (123) from the account (531) associated with the username to request the interchange (101) to authenticate the user (371) on behalf of the server (113). In some embodiments, the server (113) receives from the user (371) the phone number (123) as the username to access the account (531).

In one embodiment, the account (531) is funded by funds associated with the phone number (123) and paid by the interchange (101) to the server (113) on behalf of the user (371). For example, in one embodiment, the interchange (101) transmits one or more premium messages to the mobile phone (117) to collect the funds.

In one embodiment, the information allows the user (371) to sign in the account, without the user (371) paying the server (113) via the interchange (101).

In one embodiment, the account (531) hosted on the server (113) allows the user (371) to access at least one of: email, instant messaging, social networking, blogging, banking, online shopping, gaming, online communication, and content sharing.

FIGS. 26-29 show methods to approve a payment transaction according to some embodiments.

Figure 26:
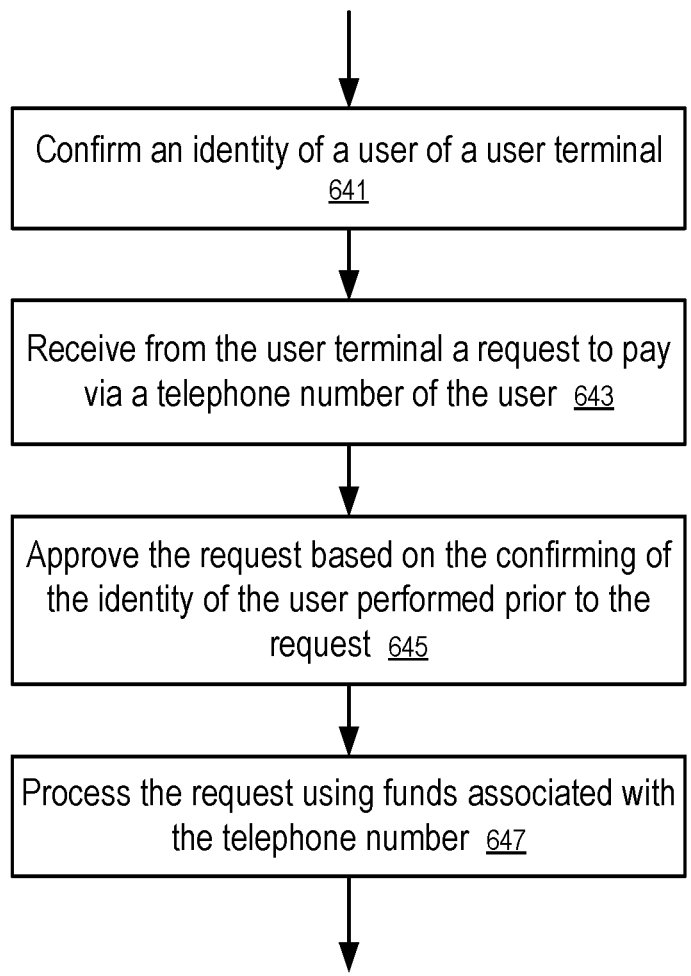
FIGS. 26-29 show methods to approve a payment transaction according to some embodiments.

In FIG. 26, after the interchange (101) confirms (641) an identity of a user of a user terminal (111), the interchange (101) receives (643) from the user terminal (111) a request to pay via a phone number (123) of the user. In one embodiment, the interchange (101) confirms the identify of the user of the user terminal (111) and/or associates the identity of the user of the user terminal (111) with the phone number (123) of the mobile phone (117) prior to the user submitting a request to pay via the phone number (123). Thus, communications with the mobile phone (117) at the phone number (123) for the confirmation and/or approval of the request does not have to take place between the request and the payment operation; and thus the delay between the request and the payment operation can be reduced.

For example, the user terminal (111) may include a web browser; and the user may log into a web server of the interchange (101) using the web browser. The interchange (101) may prompt the user via the web browser running on the user terminal (111) to provide the phone number (123) and a password associated with the phone number (123). After verifying the password, the user is logged into a session tracked by the web browser on the user terminal (111); and the web browser running on the user terminal (111) is associated with the phone number (123).

In one embodiment, the interchange (101) further communicates with the mobile phone (117) at the phone number (123) to complete the verification process. For example, the interchange (101) may send a one-time verification code to the mobile phone (117) at the phone number (123) and request the user to provide the correct one-time verification code back via the user terminal (111) to verify the association between the user terminal (111) and the phone number (123). Alternatively, the interchange (101) may provide the one-time verification code to the user terminal (111) and instruct the user to communicate the code back to the interchange (101) via the mobile phone (117) at the phone number (123). Alternatively, after the user logs in using the user terminal (111), the interchange (101) may send a message to the mobile phone (117) to request a reply from the mobile phone (117) at the phone number (123) within a predetermined period of time to validate the session. In some embodiments, after the user provides the phone number (123) to the interchange (101) using the user terminal (111), the user is instructed to provide the password via the mobile phone (117) to complete the log in process.

In one embodiment, the user terminal (111) tracks the session. For example, the user terminal (111) may use a web browser to track the session via information maintained by the web browser (e.g., cookies). Alternatively, or in combination, the interchange (101) may track the session by maintaining information on the data storage facility (107). For example, after the user completes the log in process, the interchange (101) may identify the user terminal (111) via identifiers such as Internet address, Media Access Control address (MAC address), a different phone number (e.g., when the user terminal is a different mobile phone), or other software or hardware identification number associated with the user terminal (111), such as a digital certificate; and the interchange (101) may associate the phone number (123) with such identifiers until the expiration of a predetermined time period, or after the user signals an end of the session using the user terminal (111) or using the mobile phone (117)

at the phone number (123). In one embodiment, the interchange (101) associates a plurality of identifiers of the user terminal (111) with the phone number (123) for the session. When at least one of the identifiers of the user terminal (111) is changed, the interchange (101) may terminate the session automatically.

In FIG. 26, after the user terminal (111) submits the request to pay via the phone number (123), the interchange (101) approves (645) the request based on the confirming of the identity of the user performed prior to the request and processes (647) the request using funds associated with the phone number (123). For example, the interchange (101) may transmit premium messages, via a corresponding converter (131), to a mobile phone (117) at the phone number (123) to collect the funds, or receive premium messages from a mobile phone (117) at the phone number (123) to collect the funds. For example, the interchange (101) may determine the account information (121) (e.g., an account identifier, such as a credit card number, a bank account number, a debit card number, etc.) stored and associated with the phone number (123) on the data storage facility (107) of the interchange (101) to charge the user using the account information (121).

In one embodiment, in response to the payment request from the user terminal (111), the interchange (101) may send a notification message to the mobile phone (117) at the phone number (123). The user is not required to provide a reply to complete the payment process. However, the user of the mobile phone (117) is provided with the option/opportunity to reply and report a fraudulent use, or to cancel the request (e.g., within a predetermined period of time).

Figure 27:
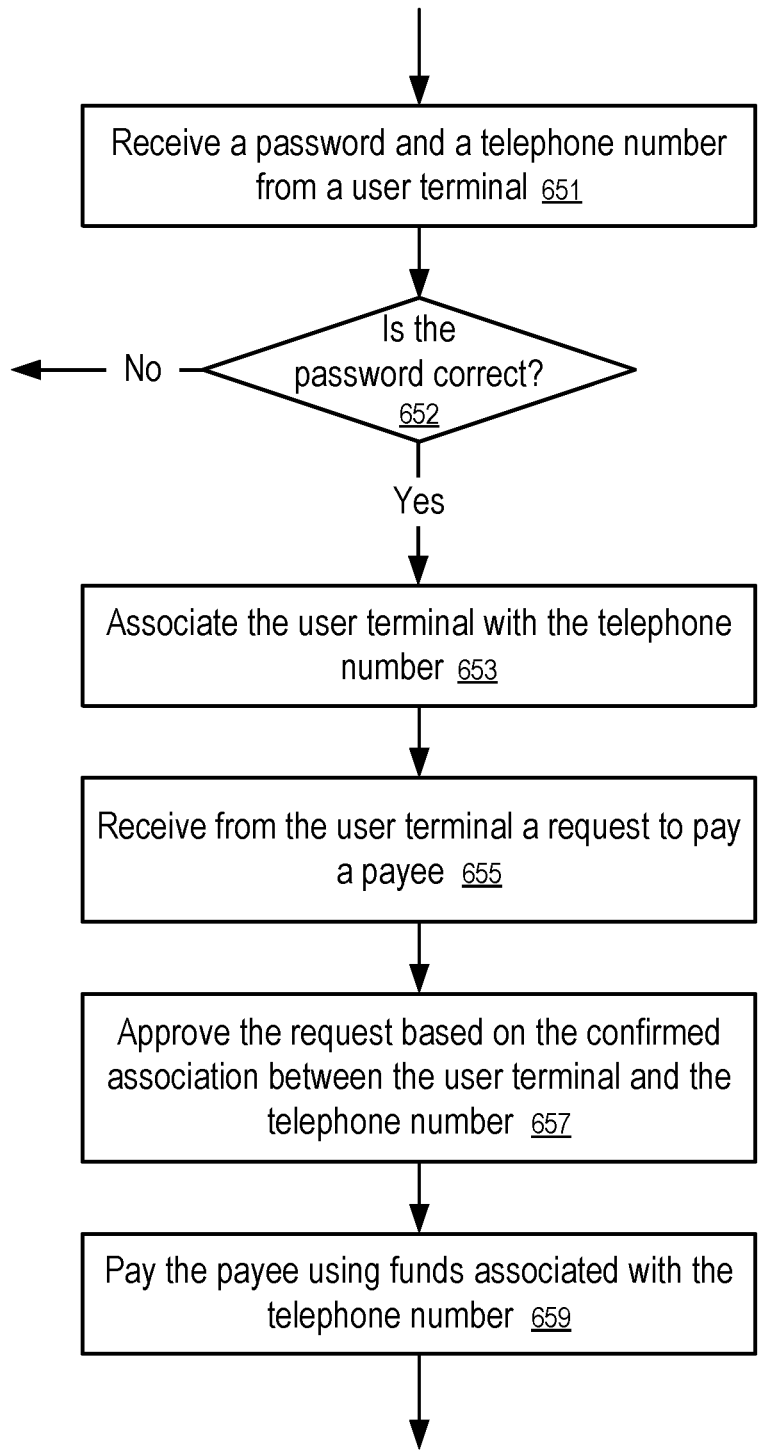

In one embodiment, the data storage facility (107) stores a password associated with the phone number (123) for authentication. In FIG. 27, after the interchange (101) receives (651) a password and a phone number (123) from a user terminal (111), the interchange (101) determines (652) whether the received password is the correct password for the phone number (123). If the received password is the correct password for the phone number (123), the interchange (101) associates (653) the user terminal (111) with the phone number (123) in the data storage facility (107). If, during the time period in which the user terminal (111) is associated with the phone number (123), the interchange (101) receives (655) from the user terminal (111) a request to pay a payee (e.g., via the user interface (201) illustrated in FIG. 8), the interchange (101) may approve (657) the request based on the confirmed association between the user terminal (111) and the phone number (123) and pay the payee using funds associated with the phone number (123), without requiring a confirmation via the mobile phone (117) at the phone number (123). In some embodiments, after the user terminal (111) submits the phone number (123) to the interchange (101), the interchange (101) may request the password from the mobile phone (117) at the phone number (123).

In one embodiment, during the time period in which the user terminal (111) is associated with the phone number (123), the interchange (101) may automatically provide the phone number (123) in the text field (183) in the user interface (201) for submitting a payment request, as illustrated in the FIG. 8, based on the association between the user terminal (111) and the phone number (123). The phone number (123) can be provided by the interchange (101) in the text field (183) as a default input. Alternatively, the interchange (101) may not provide the phone number (123) and may require the user to enter the phone number (123) in the text field (183) for enhanced security. In some embodiments, the interchange (101) may dynamically determine whether or not to present the phone number (123) in the text field (183) based on a transaction pattern associated with the phone number (123). For example, if the current request matches the pattern, the interchange (101) presents the phone number (123) as the default input to simplify user interactions; otherwise, the interchange (101) does not provide the phone number (123) in the text field (183) for enhanced security.

Figure 28:
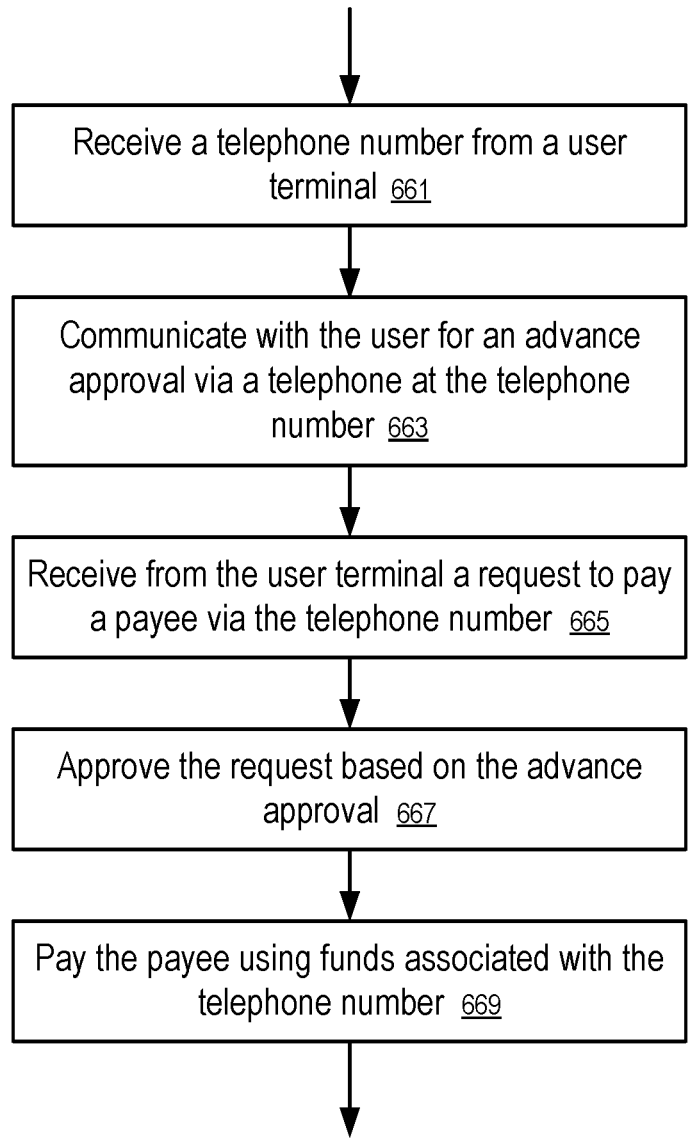

In FIG. 28, after the interchange (101) receives (661) a phone number (123) from a user terminal (111), the interchange (101) communicates (663) with the user for an advance approval for the user terminal (111) via a mobile phone (117) at the phone number (123). For example, the interchange (101) may communicate with the mobile phone (117) at the phone number (123) for the advance approval and/or communicate with the user terminal (111) to confirm a password associated with the phone number (123).

In one embodiment, the advance approval is specific for the user terminal (111); and the interchange (101) stores identifiers of the user terminal (111) with the advance approval. For example, the interchange (101) may communicate with the user terminal (111) and/or the mobile phone (117) to associate the user terminal (111) with the phone number (123) for the advance approval of one or more subsequent payment requests.

In some embodiments, the advance approval is not limited to a particular user terminal (111). For example, the user may directly use the mobile phone (117) at the phone number (123) to communicate the advance approval to the interchange (101) without having to identify the user terminal (111). Alternatively, the user may use a particular user terminal (111) to initiate the communications with the interchange (101) for the advance approval without limiting the advance approval to subsequent payment requests from the same particular user terminal (111).

In one embodiment, the advance approval is associated with the phone number (123) on the data storage facility (107). When a request to pay via the funds associated with the phone number (123) is received, the advance approval associated with the phone number (123) is identified and applied by the interchange (101). The user does not have to explicitly identify the advance approval in making the payment request.

In one embodiment, the interchange (101) may assign an identification code for the advance approval for enhanced security. The user may use the identification code in the payment request to explicitly identify the advance approval.

In one embodiment, the advance approval specifies a time limit for the expiration of the approval, a budget amount for one or more payment requests, a limit on the types of permitted products and/or services, a time window for permissible payment requests, a frequency for permissible payment requests, and one or more limits based on certain characteristics of the payees (e.g., web addresses, countries, categories).

In one embodiment, the advance approval may specify some limits on the permissible user terminals (111). For example, the advance approval may limit the advance approval to user terminals located with certain geographic areas. The interchange (101) may determine the geographic areas of the user terminals (111) based on the IP addresses of the user terminals (111), the access points for wireless local area communications, the base stations for cellular communications, etc.

After the advanced approval is associated with the phone number (123), the interchange (101) may receive (665) from the user terminal (111) a request to pay a payee via the phone number (123). Based on the advance approval the interchange (101) may approve (667) the request and pay (669) the payee using funds associated with the phone number (123), without requiring a confirmation message from the user via communications with the mobile phone (117) at the phone number (123).

In some embodiments, the interchange (101) may use the transaction history (127) to determine whether or not to require a confirmation message from the user via communications with the mobile phone (117) at the phone number (123). The transaction history (127) may include a number of records of prior confirmed/approved payment requests.

For example, based on the records of prior payment requests the interchange (101) may determine a payment pattern for the phone number (123), such as a list of frequently used user terminals (111) for the phone number (123), a range for typical payment amounts, a time of day within which typical payment requests are received for the phone number (123), a list of frequently used payees paid via the phone number (123), a list of categories of services and/or products frequently paid for via the phone number (123), a recent payment request confirmed within a predetermined period of time, etc.

Figure 29:
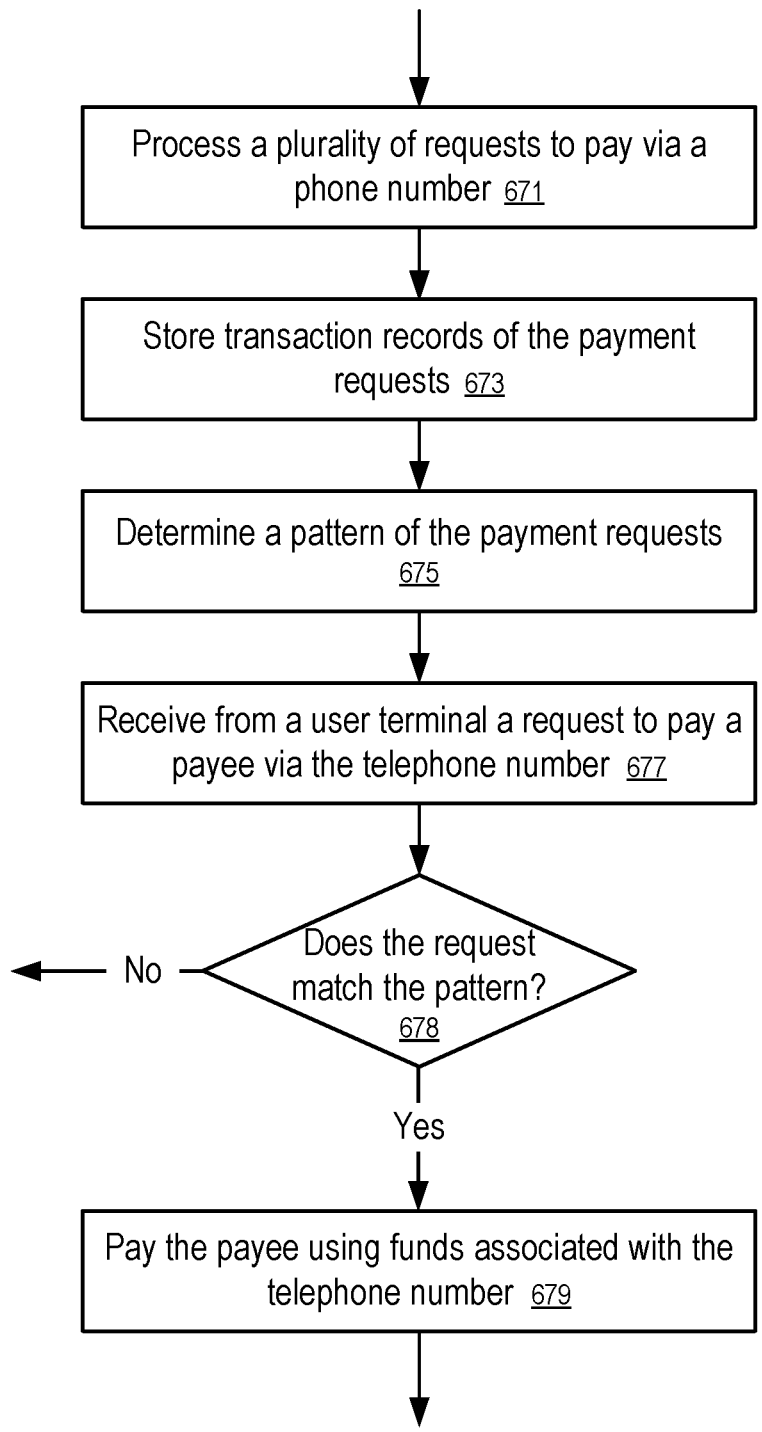

In FIG. 29, the interchange (101) processes (671) a plurality of requests to pay via a phone number (123). The interchange (101) processes (671) the requests via communicating with the mobile phone (117) at the phone number (123). For example, the interchange (101) may send a message to the mobile phone (117) at the phone number (123) and request a reply to the message from the mobile phone (117). For example, the interchange (101) may request a PIN from the mobile phone (117) at the phone number (123) to confirm the requests. For example, the interchange (101) may send one-time codes representing the requests to the mobile phone (117) or receive one-time codes representing the requests from the mobile phone (117).

The interchange (101) stores (673) transaction records of the payment requests and determines (675) a pattern of the payment requests.

Subsequently, when the interchange (101) receives (677) from a user terminal (111) a request to pay a payee via the phone number (123), the interchange (101) determines (678) whether the request matches the pattern. If the request matches the pattern, the interchange (101) pays (679) the payee using funds associated with the phone number (123), without requiring a confirmation communicated via the mobile phone (117) at the phone number (123) to speed up the payment process. The interchange (101) may send a notification to the mobile phone (117) at the phone number (123), without requiring a reply prior to making the payment.

In one embodiment, a personal digital assistant (PDA) is provided in a retail store to allow a merchant to initiate a payment request to the interchange (101), which may also support transactions at other types of retail terminals in other environments, such as automatic teller machines (ATMs) in banks and point of sale (POS) terminals in retail stores.

In one embodiment, the PDA is a mobile device, which can be used not only in a fixed-location retail system, but also in other locations. For example, agents may use the PDAs to take payments for door to door debt collection, street sales, etc. The PDA can be configured to communicate with the interchange (101) via a wireless communication connection (e.g., using a wireless wide area network, a wireless local area network, or cellular telecommunications).

In one embodiment, when a customer is in a retail store, a cashier may enter the phone number (123) of the customer into a retail terminal to request a payment from the interchange (101) for the purchases made by the customer. The customer gets a text message from the interchange (101) to confirm/authorize the payment request. If the customer responds to the text message to confirm/authorize the payment request, the interchange (101) makes a payment to the retailer using funds associated with the phone number (123) (e.g., funds collected via sending premium messages to the mobile phone (117) at the phone number (123), or via charging a credit or debit card associated with the phone number (123) using the account information (121)). Thus, the customer can leave the retail store with the purchased goods, just like after paying for the purchased goods using a credit or debit card at the retail terminal.

In one embodiment, an ATM is configured to accept the phone number (123) entered by a customer to withdraw cash. The ATM transmits the phone number (123) in a request for funds to the interchange (101). In response to the request, the interchange (101) sends a text message to the mobile phone (117) at the phone number (123) to allow the user to confirm or authorize the request. After the customer gets the text message on the mobile phone (117), the customer may reply to the text message to confirm/approve and then withdraw cash from the ATM. The interchange (101) provides to the bank of the ATM the corresponding funds collected from the user.

In one embodiment, to speed up the transaction process at the retail terminal, the customer may send a pre-approval to the interchange (101) to authorize a subsequent transaction, such as a retail transaction or an ATM transaction, prior to reaching the retail terminal. Thus, to check out at the retail terminal, the customer just provides the phone number (123) to the retail terminal and does not have to wait for the confirmation message from the interchange (101) and does not have to reply to the confirmation message to complete the transaction. After the retail terminal obtains the phone number (123) of the customer, the retail terminal can communicate with the interchange (101) to get funds associated with the phone number (123) to close the transaction, based on the pre-approval.

Figure 30:
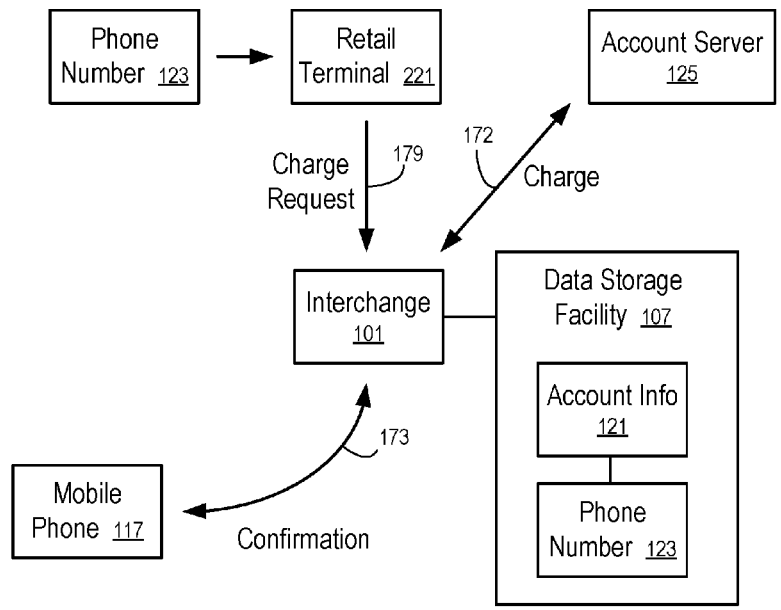
FIGS. 30-33 show systems to facilitate retail transactions according to some embodiments.

FIGS. 30-33 show systems to facilitate retail transactions according to some embodiments. In FIG. 30, the retail terminal (221) is configured to accept the phone number (123) of the customer at a retail location. In some embodiments, the customer may operate the retail terminal (221) and enter the phone number (123) to provide funds for a transaction, such as withdrawing cash based on funds collected by the interchange (101). In some embodiments, a retail agent may operate the retail terminal (221) and enter the phone number (123) to process a payment for a transaction, such as obtaining a payment for an order in a restaurant or for goods or services purchased in a retail store.

In FIG. 30, after the retail terminal (221) obtains the phone number (123) for the transaction, the retail terminal (221) transmits a charge request (179) to the interchange (101) to charge the customer via the phone number (123). The interchange (101) communicates with the mobile phone (117) at the phone number (123) for the confirmation (173) of the charge request.

In one embodiment, the interchange (101) communicates with the mobile phone (117) via text message to obtain the confirmation (173). Alternatively, or in combination, the interchange (101) may communicate with the mobile phone (117) via multimedia messaging service (MMS), instant messaging, email, web requests and responses, WAP applications, etc.

After the customer confirms or approves the charge request (179) via the mobile phone (117), the interchange (101) provides funds to the retail terminal (221) for the transaction.

For example, in FIG. 30, the interchange (101) may identify the account information (121) stored and associated with the phone number (123) in the data storage facility (107). The interchange (101) uses the account information (121) to communicate with an account server (125) to charge (172) the user using the account information (121), which can be a credit card number, a debit card number, a checking account number, etc.

In one embodiment, the interchange (101) obtains the funds from the account of the user using the account information (121) and provides the funds to allow the retail terminal (221) to perform the transaction. For example, the interchange (101) may provide the funds to the retailer operating the retail terminal (221) to allow the retail terminal (221) to process a purchase made at the store of the retailer. For example, the interchange (101) may provide the funds to the bank of an ATM that serves as the retail terminal (221); and thus the user can withdraw cash from the ATM.

In one embodiment, the retail terminal (221) is implemented with traditional functions of retail terminals that are used at fixed locations, such as a cash register. In other embodiments, the retail terminal (221) is implemented on a PDA with wireless communication capabilities, to allow payments to take place at various locations. For example, the PDA may be used for door to door debt collection, street sales, etc.

In some embodiments, the retail terminal (221) is further configured to provide an electronic receipt for the transaction completed at the retail terminal (221). For example, the retail terminal (221) may provide the electronic receipt to the interchange (101) for transmission to the mobile phone (117) at the phone number (123). Alternatively, in some embodiments, the retail terminal (221) may be configured to transmit the electronic receipt to the mobile phone (117) via a telecommunication carrier, without providing the electronic receipt to the interchange (101).

FIG. 30 illustrates an example in which the interchange (101) obtains the funds associated with the phone number (123) using the account information (121) stored and associated with the phone number (123) in the data storage facility (107). Alternatively, the interchange (101) may obtain the funds via the telecommunication carrier of the mobile phone (117) (without having to obtain and store the account information (121) from the user), as illustrated in FIG. 31.

Figure 31:
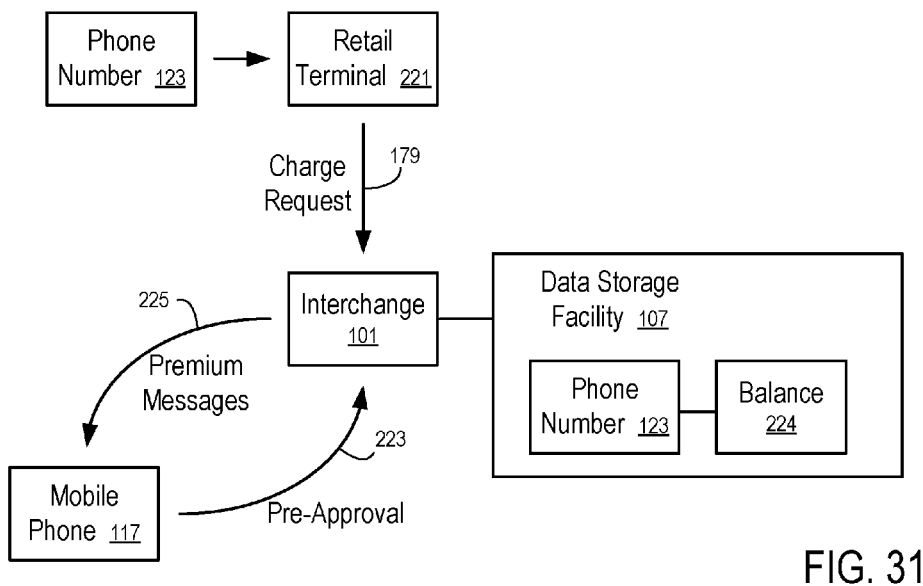

In FIG. 31, the interchange (101) sends premium messages (225) to the mobile phone (117) to obtain the funds as required by the charge request (179) to collect the funds for the transaction performed at the retail terminal (221).

In one embodiment, to reduce the time period the user waits for the retail terminal (221) to submit the charge request (179) and obtain a response from the interchange (101), the user of the mobile phone (117) may send a pre-approval (223) of an estimated amount that would be requested by the retail terminal (221). The mobile phone (117) sends the pre-approval (223) to the interchange (101), prior to the retail terminal (221) receiving the phone number (123), to allow the interchange (101) to send the premium message (225) to the mobile phone (117) to collect the funds according to the estimated amount specified in the pre-approval (223). Thus, when the retail terminal (221) transmits the charge request (179) to the interchange (101), the process of transmitting the one or more premium messages (225) to the mobile phone (117) is completed, or partially completed. This reduces the waiting period at the retail terminal (221).

In FIG. 31, the data storage facility (107) may be used by the interchange (101) to store the balance (224) of the phone number (123) between the funds that have been collected from the mobile phone (117) and funds that have been applied to transactions (e.g., made at the retail terminal (221)). The interchange (101) may use the data storage facility (107) to maintain records of charge requests (179) received from the retail terminal (221), premium messages (225) sent to the mobile phone (117) at the phone number (123), and amount of funds received from the telecommunication carrier of the mobile phone (117).

Figure 32:
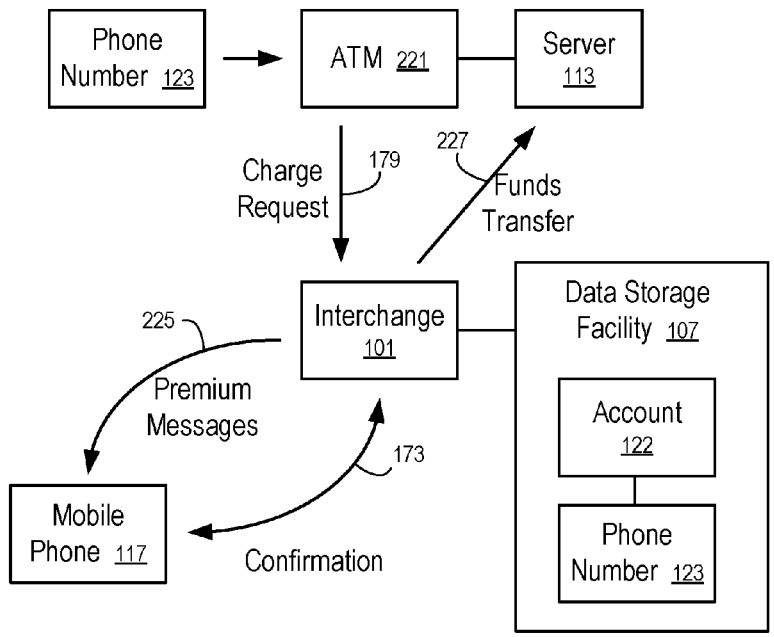

FIG. 32 illustrates an example of using a phone number (123) at an ATM (221) to withdraw cash. In FIG. 32, the ATM (221) is configured to receive a phone number (123) (e.g., via a keypad or a touch screen of the ATM (221)). In response to the phone number (123) being received in the ATM (221) to withdraw an amount of cash, the ATM (221) sends a charge request (179) to the interchange (101) to request a funds transfer (227). In some embodiments, the ATM (221) sends the charge request (179) via the server (113) associated with the ATM (221).

In one embodiment, the interchange (101) communicates with the mobile phone (117) for a confirmation (173) of the charge request (179). If the mobile phone (117) at the phone number (123) confirms the charge request (179), the interchange (101) provides funds to the server (113) associated with the ATM (221) via a funds transfer (227). The funds transfer (227) provides the amount of funds for the cash withdrawal and for any transaction fees the server (113) associated with the ATM (221) may charge.

In one embodiment, the user of the mobile phone (117) at the phone number (123) has an account (122) with the interchange (101). The account (122) is associated with the phone number (123) stored in the data storage facility (107). The user may provide funds to the account (122) via the mobile phone (117). The interchange (101) transfers funds from the account (122) to the server (113).

In one embodiment, when the balance of the account (122) is not sufficient to provide the funds to satisfy the charge request (179), the interchange (101) may communicate with the mobile phone (117) for a confirmation to send one or more premium messages (225) to the mobile phone (117) to collect funds into the account (122).

In some embodiments, the mobile phone (117) may pre-authorize the interchange (101) to collect the funds into the account (122) via the premium messages (225). Thus, the user does not have to wait for the confirmation (173) and the one or more premium messages (225) when using the ATM (221).

In some embodiments, the user may deposit funds into the ATM (221) and request the ATM (221) to transfer the deposited funds to the account (122) hosted on the data storage facility (107) of the interchange (101).

In some embodiments, the user may have an account with the bank of the ATM (221) and the server (113). The ATM (221) is configured to receive the requests from the user to transfer funds between the account (122) hosted on the data storage facility (107) of the interchange (101) and the account with the bank of the ATM (221) and the server (113).

In some embodiments, the user does not have an account with the bank of the ATM (221) and the server (113). The ATM (221) is configured to access the account (122) hosted on the data storage facility (107) of the interchange (101), via funds transfer (227) between the server (113) and the interchange (101). For example, the ATM (221) may provide cash based on funds transferred out of the account (122), or receive a deposit via funds transferred to the account (122).

Figure 33:
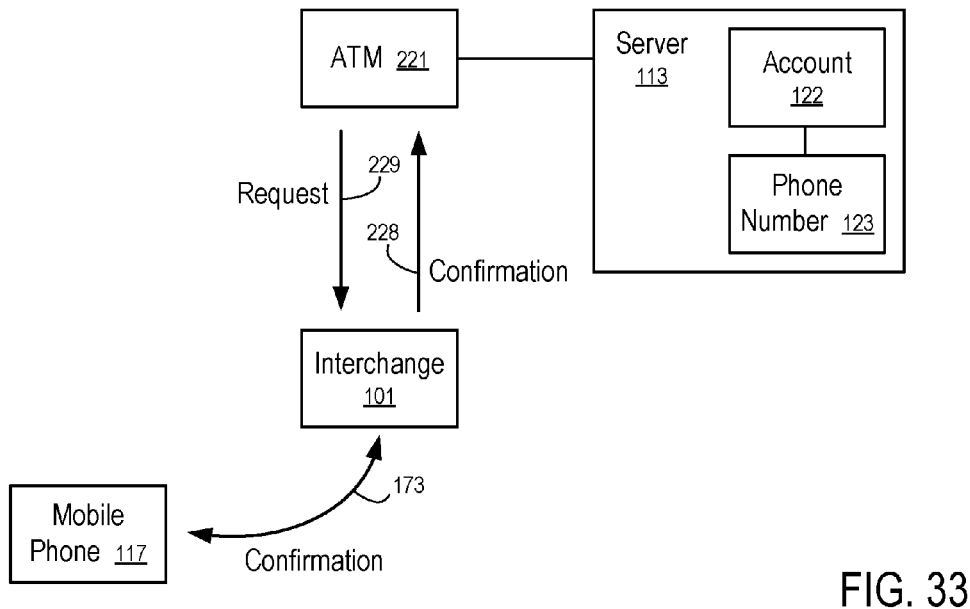

FIG. 33 shows another example in which the ATM (221) uses the interchange (101) to confirm a transaction performed at the ATM (221). In FIG. 33, the ATM (221) may receive a phone number (123) to identify an account (122) stored on the server (113) associated with the ATM (221). Before operating on the account (122) (e.g., for cash withdrawal, for deposit, for funds transfer), the ATM (221) sends a request (229) to the interchange (101) to request a confirmation (228). In response to the request (229), the interchange (101) communicates with the mobile phone (117) to obtain a confirmation (173) for the transaction that is being processed at the ATM (221). After the interchange (101) obtains the confirmation (173) from the mobile phone (117), the interchange (101) sends a confirmation (228) as a response to the request (229). The confirmation (228) allows the ATM (221) to operate on the account (122).

In some embodiments, the ATM (221) may receive a different identifier (e.g., a banking card number) to identify the account (122). The server (113) identifies the phone number (123) to request a confirmation (228).

In some embodiments, the ATM (221) of a bank sends the request (229) and receives the confirmation (228) via the server (113) of the bank.

Figure 34:
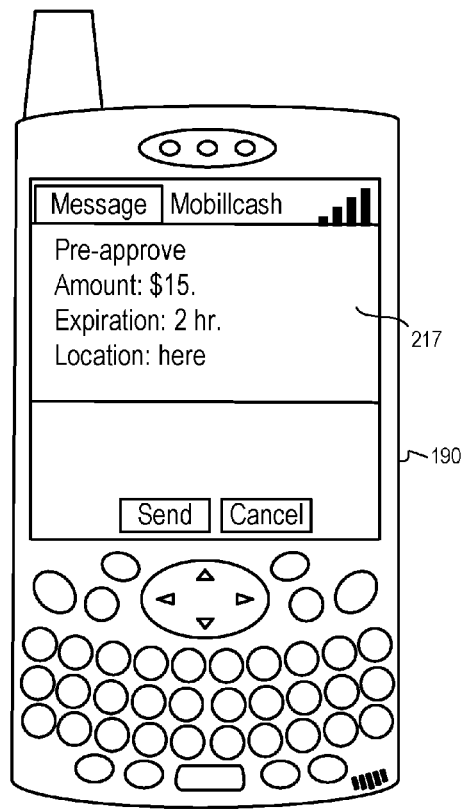
FIG. 34 shows a user interface to pre-approve a transaction according to one embodiment.

FIG. 34 shows a user interface to pre-approve a transaction according to one embodiment. The user interface (190) as illustrated in FIG. 34 can be used to generate a message (217) to provide the pre-approval (223) to collect funds for a subsequent transaction. The message (217) may identify an estimated amount for the next transaction, the estimated time for the transaction, and an indication of the location of the transaction.

In one embodiment, the user interface (190) is implemented on a mobile phone (117) at the phone number (123). The mobile phone (117) is configured to determine its location (e.g., via a Global Positioning System (GPS), or a positioning system based on a cellular telecommunication network). The user may indicate the authorized retail terminals by providing the current location of the mobile phone (117) while the mobile phone (117) is located near the authorized retail terminals. In one embodiment, the interchange (101) can compare the location of the retail terminal (221) and the location provided in the authorization message (217) to determine whether the charge request (179) should be rejected or accepted. For example, the user may provide the pre-approval (223) before beginning to shop in a retail store, or before a meal is served in a restaurant, so that the time required for processing the payment can be reduced.

Alternatively, the mobile phone (117) may use other identification information, such as the phone number of the retailer, the name of the retailer, etc., to provide pre-authorization for anticipated transactions at the retail terminal (221), in addition to, or in combination with, the location information illustrated in FIG. 34.

Figure 35:
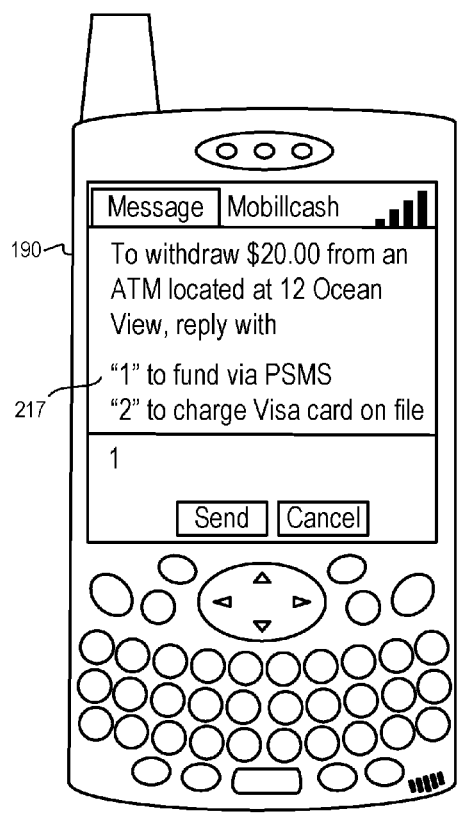
FIG. 35 shows a user interface to confirm an automatic teller machine (ATM) transaction according to one embodiment.

FIG. 35 shows a user interface to confirm an automatic teller machine (ATM) transaction according to one embodiment. In FIG. 35, the user interface (190) is used to present a message (217) from the interchange (101) to confirm a transaction at an ATM (221). The message identifies the ATM (e.g., via the location, bank affiliation, etc.).

In FIG. 35, the message (217) presents a number of options to allow the user to select a source of funds for the request to withdraw cash. For example, the interchange (101) may collect the funds via premium SMS messages (e.g., option "1" in FIG. 35), or charge a credit card on file with the interchange (101) (e.g., option "2" in FIG. 35) to provide the funds for the cash request at the ATM (221) identified in the message (217).

In some embodiments, the message (217) may further request a password or a PIN to authenticate the user of the mobile phone (117) on which the user interface (190) is presented.

Figure 36:
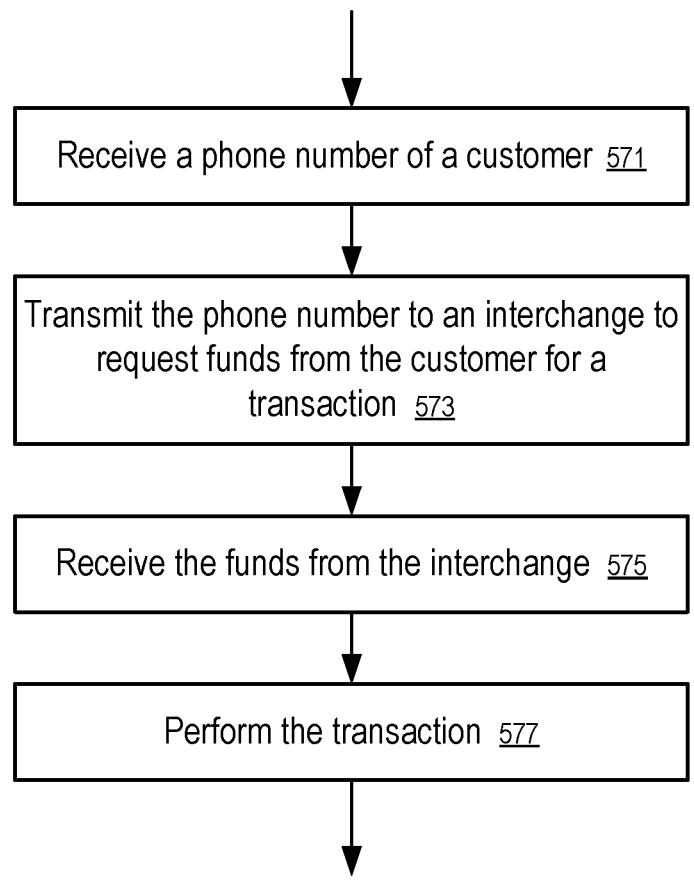
FIG. 36 shows a method performed on a retail terminal according to one embodiment.

FIG. 36 shows a method performed on a retail terminal according to one embodiment. In FIG. 36, a retail terminal (221) is configured to receive (571) a phone number (123) of a customer. The retail terminal (221) transmits (573) the phone number (123) to an interchange (101) to request funds from the customer for a transaction requested by the customer. After the funds are received (575) from the interchange (101), the retail terminal (221) performs (577) the transaction requested by the customer.

Figure 37:
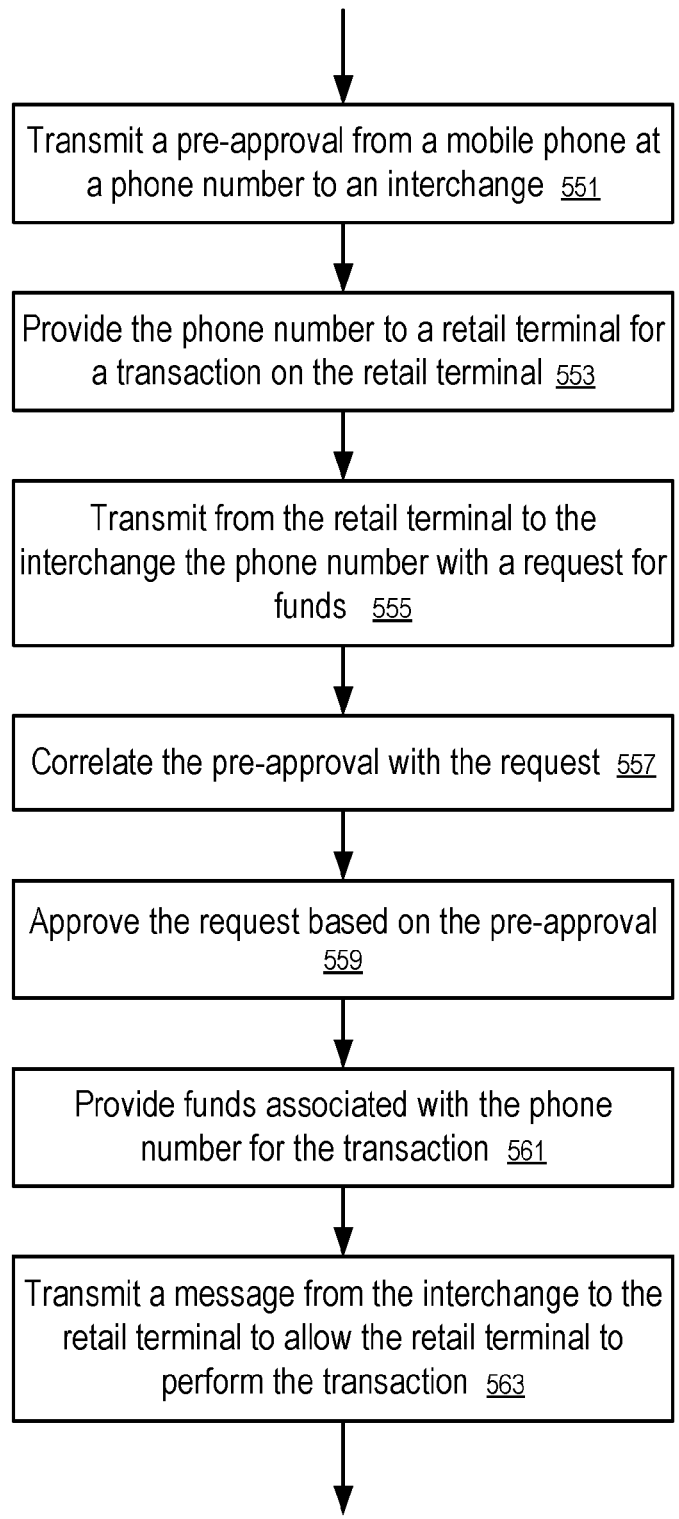
FIG. 37 shows a method to facilitate a retail transaction according to one embodiment.

FIG. 37 shows a method to facilitate a retail transaction according to one embodiment. In FIG. 37, a mobile phone (117) at a phone number (123) transmits (551) a pre-approval to an interchange (101). Based on the pre-approval, the interchange (101) may prepare funds for an anticipated transaction. For example, the interchange (101) may transmit one or more premium messages to the mobile phone (117) to collect the funds for the anticipated transaction into the account (122) hosted on the data storage facility (107) of the interchange (101).

In FIG. 37, after the phone number (123) is provided (553) to a retail terminal (221) for a transaction on the retail terminal (221), the retail terminal transmits (555) to the interchange (101) the phone number (123) with a request (179) for funds. The interchange (101) correlates (557) the pre-approval (223) with the request (179), and approves (559) the request based on the pre-approval (223), and provides (561) funds associated with the phone number (123) for the transaction. The interchange (101) transmits a message to the retail terminal to allow the retail terminal (563) to perform the transaction.

In one embodiment, the retail terminal (221) is a point of sale (POS) terminal. In one embodiment, the retail terminal (221) is implemented via a personal digital assistant (PDA).

In one embodiment, the retail terminal (221) is positioned in a retail store for checkouts; and the mobile phone (117) is used to communicate with a server computer (e.g., interchange (101)) to confirm the transaction, prior to the retail terminal (221) receiving the phone number (123) of the customer.

In one embodiment, the retail terminal (221) is a mobile device adapted to perform transactions at different locations.

In one embodiment, the transaction is confirmed via a message sent from the mobile phone (117) as a response to a message sent from the server computer (e.g., interchange (101)) to the mobile phone (117).

In one embodiment, the retail terminal (221) is an automatic teller machine (ATM) (221); and the transaction at the ATM (221) includes providing the funds to the customer in cash.

In one embodiment, the server computer (e.g., the interchange (101)) is to transmit a first message to the mobile phone (117) at the phone number (123) to request a confirmation of withdrawing the funds from the ATM (221); and the server computer (e.g., the interchange (101)) provides the funds to a bank of the ATM (221) after the server computer receives a confirmation reply to the first message. In one embodiment, the customer has no bank account with the bank.

In one embodiment, the mobile phone (117) is used to communicate with the server computer (e.g., interchange (101)) to confirm the transaction via pre-approving the transaction prior to the providing of phone number (123) to the retail terminal. The server computer is to transmit the message indicating that the funds are available for the transaction, in response to a determination that a pre-approved amount matches an amount of the transaction. In one embodiment, the server computer (e.g., interchange (101)) is to transmit the one or more premium messages (225) to collect the funds for the anticipated transaction, prior to the retail terminal (221) receiving the phone number (123) of the customer.

In one embodiment, the server computer is to transmit the message further in response to a determination that a location of the retail terminal (221) matches a location of the mobile phone (117) where the mobile phone (117) pre-approves the transaction.

In one embodiment, the mobile phone (117) pre-approves the transaction by transmitting to the server computer (e.g., interchange (101)) a message indicating an allowable amount for the transaction and an identity of the retail terminal (221). The identity of the retail terminal (221) may include a phone number of a merchant operating the retail terminal (221).

In one embodiment, the retail terminal (221) is configured to provide an electronic receipt to the mobile phone (117) via the server computer (e.g., interchange (101)).

In one embodiment, the server computer (e.g., interchange (101)) is to communicate with the mobile phone (117) to confirm the transaction via short message service (SMS), email, instant messaging, multimedia messaging service (MMS), etc. The confirmation may include the electronic receipt received from the retail terminal (221).

In one embodiment, the interchange (101) is configured to allow a user to provide a cell phone number (123) to pay for goods or services, using a user account tied to the cell phone number (123) of the user.

For example, the user can enter the cell phone number (123) into a POS terminal, an online checkout system, a mobile application, or a payment or purchase process system, device, service, or application to pay for goods or services.

In one embodiment, the account is hosted on the interchange (101), which can provide Internet-based services via at least communicating over Internet. The user account may store the identity of the user and login/authentication information. The interchange (101) may charge to the mobile phone bill to fund the account and/or make payments. The user account may further store financial card information, such as a credit card, a pre-paid card, a debit card, etc. The user account may be linked to one or more bank accounts of the user, such as a checking account or a savings account. The user account may be linked to other financial accounts, such as an investment account, a payment intermediary account, etc. The user account hosted on the interchange (101) is configured to store values or credits for the user, such as credits from refunds from merchant, credits/funds added by the user to the account via charging linked accounts, such as bank accounts, credit accounts, or via user deposit.

In one embodiment, the interchange (101) is configured to perform multiple-factor authentication when making payments using the user account. For example, the user may be requested to reply by text message from the mobile phone (117) having the phone number (123) for the confirmation of the payment request, and/or provide a PIN, a one-time random PIN, a password, or answers to security questions (e.g., using a mobile application running on the mobile phone (117)) to pass the authentication operation. In some embodiments, the user is requested to provide the PIN or password at the time of entering the phone number (123) to make the payment request.

In one embodiment, the mobile phone (117) is configured to receive input, such as PIN, password, one-time code, reply message, etc., via voice recognition, keyboard input, and/or touch screen input (e.g., through handwriting recognition, or on-screen keyboard).

Figure 38:
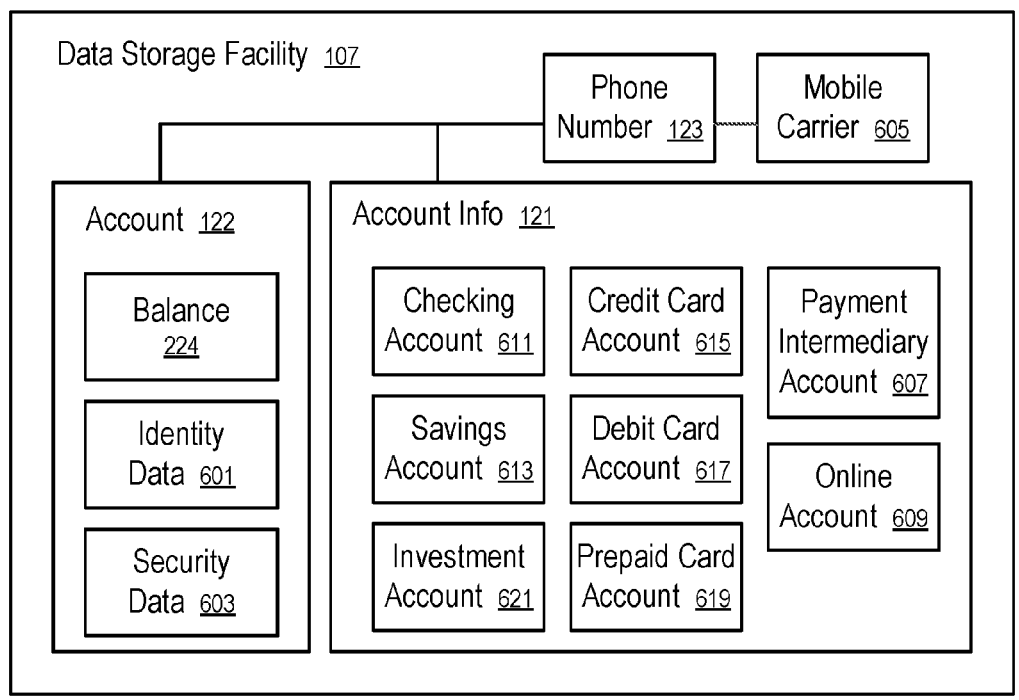
FIG. 38 shows an account according to one embodiment.

FIG. 38 shows an account according to one embodiment. In FIG. 38, the phone number (123) is used to identify the account (122) hosted on the data storage facility (107) of the interchange (101). The user can use the phone number (123) to access the services associated with the account (122).

In one embodiment, the phone number (123) is associated with the identification of the mobile carrier (605) to allow the user to fund the account (122) via the mobile phone bill from the mobile carrier (605).

For example, a premium message can be sent from the interchange (101) to the phone number (123) to obtain an amount of funds from the mobile carrier (605), via the mobile phone bill, according to a predetermined price associated with the premium message.

For example, the user may be instructed to send a premium message from the phone number (123) to the interchange (101) to provide an amount of funds according to a predetermined price associated with the premium message.

For example, the interchange (101) may send a message to the mobile carrier (605) to request the mobile carrier to bill an amount to the mobile phone bill of the phone number (123) and obtain funds for depositing in the account (122) or paying a merchant (or other types of payees, such as a family member, a friend, a relative, a charity, etc.)

In one embodiment, the data storage facility (107) is further configured to store account information (121), such as data that identifies various financial accounts of the user, such as checking account (611), savings account (613), investment account (621), credit card account (615), debit card account (617), prepaid card account (619), and/or payment intermediary account (607) (e.g., third party payment services that identify users via their email addresses, or other identifiers).

In one embodiment, the account information (121) also includes data identifying online accounts (609) hosted on servers (113) that provide various services and/or products to the user. The servers (113) may charge the user for accessing premium services and/or products and/or for subscription. In some embodiments, the servers (113) may maintain account balances for the respective online accounts (609) for the credits/values that the user has purchased (e.g., purchased using the account (122) as a payment instrument).

In one embodiment, the interchange (101) allows the user to make transfers between various accounts, such as the account (122) hosted on the interchange (101), the online account (609) hosted on a third party server (113) and/or other types of financial accounts, such as checking account (611), savings account (613), investment account (621), credit card account (615), debit card account (617), prepaid card account (619), and/or payment intermediary account (607).

In one embodiment, the interchange (101) performs authentication for the servers (113) and thus allows the user to sign in the servers using the phone number (123) and the mobile phone (117) having the phone number (123), as discussed in connection with FIGS. 20-25.

In one embodiment, the data storage facility stores a balance (224), identity data (601) and security data (603) for the account (122). The balance (224) represents the funds/credits stored in the account (122). The identity data (601) identifies the user. The security data (603) is used for the authentication of the user.

For example, the security data (603) may include a password or PIN for accessing the account (122), a one-time code assigned to a particular payment request, a seed for one-time passwords to authenticate the mobile phone (117) at the phone number (123), etc.

In one embodiment, the interchange (101) is configured to authenticate the user using the security data (603), in ways discussed in connection with FIGS. 15-19. For example, the interchange (101) may authenticate the user to allow the user to access the linked online account (609) hosted on the server (113), or to process a payment request (or to perform a fund transfer between two of the accounts (122, 611, 613, 615, 617, 619, 607, 609, 621).

For example, the interchange (101) may authenticate a request associated with the phone number (123) via communicating with the mobile phone (117) at phone number (123) to verify that the requester is in possession of the mobile phone (117) and via a further security measure, such as a password, a PIN, a one-time code, a one-time password, etc.

For example, the user may select a password or a PIN that is stored in the account (122) as part of the security data (603). When the user makes a request at a user terminal (111) by identifying the phone number (123), the interchange (101) may authenticate the user via requesting the password or PIN from the user terminal (111), or from the mobile phone (117) at the phone number (123).

For example, to authenticate a request made at a user terminal (111), the interchange (101) may assign a one-time code to the request, transmit the one-time code to the user via the mobile phone (117) and request the one-time code at the user terminal (111) for verification. Alternatively, the interchange (101) may assign a one-time code to the request, transmit the one-time code to the user via the user terminal (111) and request the one-time code from the mobile phone (117) for verification.

For example, to authenticate the mobile phone (117), the interchange (101) may request a one-time password generated on the mobile phone (117) (or generated on a separate device assigned to the user). In one embodiment, access to the one-time password generator (361) is password protected for enhanced security.

In one embodiment, multiple security measures are used together for certain requests. For example, when the amount of a request is above a threshold, or an accumulated transaction amount within a predetermined period of time is above a threshold. For example, access to certain accounts (e.g., online account (609)) may require less security measures, and access to some accounts (e.g., bank accounts (e.g., 611, 613, or 621)) may require more security measures.

In one embodiment, the user can use the phone number (123) at various payment terminals to pay for goods or services, as illustrated in and discussed in connection with FIGS. 30-37.

For example, in one embodiment, the user may enter the phone number (123) in a point of sale (POS) terminal in a retail store to pay for goods and services. The POS terminal may be configured to process financial cards, such as credit cards, prepaid cards, debit cards, etc. In one embodiment, the POS terminal is further configured to process phone numbers. For example, the user may select a payment option associated with the interchange (101) and key in the phone number (123) on the POS terminal. Alternatively, the POS terminal can be configured to communicate with the mobile phone (117) in an automated way to obtain the phone number (123), via radio frequency identification (RFID), near field communication (NFC), Bluetooth discovery, etc.

After the use confirms the user of the phone number (123) to make a payment on the POS terminal, the POS terminal is configured to communicate with the interchange (101) to request a payment using the account (122) associated with the phone number (123). To authenticate the request from the POS terminal, the interchange (101) communicates with the mobile phone (117) at the phone number (123) to request a confirmation. One or more additional security measures, such as PIN, password, one-time code, and one-time password, can be used to further authenticate the request. In some embodiments, the user may pre-authorize the payment request (e.g., while waiting in the line to checkout, as discussed in connection with FIGS. 26-29).

In one embodiment, the phone number (123) can be entered into an ATM machine to request cash backed by funds from the account (122), or to make a deposit to the account (122). For example, the user may key in the phone number (123) to request a transaction in the account (122). Alternatively, the mobile phone (117) may be configured to provide the phone number (123) automatically to the ATM, via RFID, NFC, or Bluetooth. The interchange (101) is configured to transfer money to or from the bank or the owner of the ATM to facilitate the cash withdrawal, or to accept a deposit.

In one embodiment, the phone number (123) can be used on a mobile application (e.g., running on the mobile phone (117) having the phone number (123)) to pay for premium accesses and/or subscription and/or to purchase credits/points for consumption within the mobile application.

In one embodiment, the phone number (123) supported by the interchange (101) can be used as a payment option in an online checkout system, such as an online shopping cart checkout system. The checkout system is configured to communicate with the interchange (101) to obtain the payment from the account (122) identified by the phone number (123) on behalf of the merchant.

In some embodiments, the interchange (101) may also use the account information (121) to make payments on behalf of the user, without pulling the funds through the account (122). For example, after a payment request is authenticated, the interchange (101) may provide some of the account information (121) to the merchant (e.g., via POS terminal, ATM, retail terminal, online checkout system, etc.) to charge the corresponding account for the payment. Alternatively, to avoid giving out the account information (121) to merchants, the interchange (101) may instruct the financial institutions of the corresponding accounts to make the payment to the merchant.

In some embodiments, the interchange (101) may also use the accounts (e.g., 122, 611-621 and 607) to pay the phone bill for the phone number from the mobile carrier (605).

In one embodiment, the phone number (123) as supported by the interchange (101) is used by the user as a central hub to access various financial accounts linked to the phone number (123). The details of handling the different types of accounts can be shielded from the user via a unified user interface provided by the interchange (101).

Figure 39:
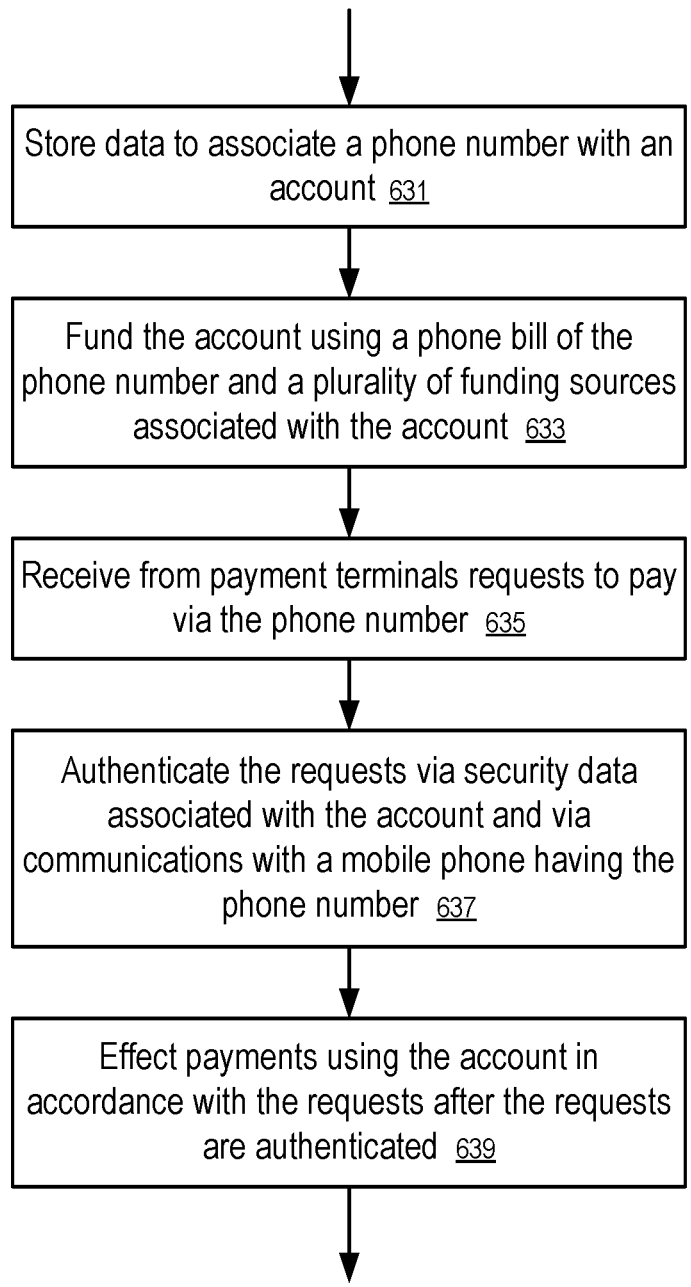
FIG. 39 shows a method to make payments to one embodiment.

FIG. 39 shows a method to make payments to one embodiment. In FIG. 39, the data storage facility (107) of the interchange (101) is configured to store (631) data to associate a phone number (123) with an account (122). The interchange (101) is configured to fund (633) the account using a phone bill of the phone number (123) and a plurality of funding sources (e.g., accounts 607 and 611-621) associated with the account (122). The interchange (101) is configured to receive (635) from payment terminals (e.g., 111, 221) requests to pay via the phone number (123). The interchange (101) is configured to authenticate (637) the requests via security data (603) associated with the account (122) and via communications with a mobile phone (117) having the phone number (123). The interchange (101) is configured to effect (639) payments using the account (122) in accordance with the requests after the requests are authenticated.

In one embodiment, the security data (603) includes a password, a personal identification number (PIN), a one-time code, a seed for the generation of one-time passwords, answers to security questions, etc.

In one embodiment, the interchange (101) is configured to request the password or the PIN from the payment terminals respectively to authenticate (637) the requests (e.g., prior to the communication with the mobile phone (117)). Alternatively, the interchange (101) can be configured to request the password or the PIN from the mobile phone (117) having the phone number (123) to authenticate (637) the requests, or to receive one-time passwords from an application running on the mobile phone (117) to authenticate (637) the requests.

In one embodiment, the security data (603) includes answers to security questions; and the account (122) further stores identity data (601) of the user, such as social security numbers, date of birth, voice characteristics, finger print data, etc., which can be used to authenticate the user via the mobile phone (117). For example, the mobile phone (117) may include a mobile application to extract voice characteristics from a voice input to construct a text message for the confirmation of a request related to the account (122); and the interchange (101) is configured to compare the received voice characteristics and the corresponding stored voice characteristics to authenticate the user. For example, the mobile phone (117) may be used to scan a finger print of the user to allow the interchange (101) to authenticate the user.

In one embodiment, the security data (603) includes voice characteristics of the user; and to authenticate requests the interchange (101) is to receive a voice input from the mobile phone (117) and match the voice input with the voice characteristics of the user. In some embodiments, the interchange (101) performs voice recognition from the voice input. In another embodiment, a mobile application running on the mobile phone (117) is used to perform the voice recognition operation to allow the user to compose a text message; and the interchange (101) is configured to receive the text message from the mobile phone (117) for the confirmation of the corresponding request. In some embodiments, the mobile application may communicate with a third party server in performing the voice recognition operation.

In one embodiment, the security data (603) includes one-time codes; and to authenticate the request, the interchange (101) is configured to generate the one-time codes in response to the requests, to provide the one-time codes to the payment terminals respectively for the requests, and to communicate with the mobile phone (117) having the phone number (123) to obtain the one-time codes back for authentication.

In another embodiment, the security data (603) includes one-time codes; and to authenticate the request, the interchange (101) is configured to generate the one-time codes in response to the requests, to communicate the one-time codes to the mobile phone (117) having the phone number (123), and to request the one-time codes back from the payment terminals respectively to authenticate the requests.

In one embodiment, to authenticate (637) the requests the interchange (101) is configured to receive confirmation messages from the mobile phone (117) having the phone number (123); and confirmation messages include references to the requests respectively. In one embodiment, the confirmation messages are composed on the mobile phone (117) as a reply to messages from the interchange (101); and the user may provide input to the confirmation message via voice input to the mobile phone (117), or via keyboard or touch screen input.

In one embodiment, the interchange (101) is configured to add funds to the account (122) in response to credits to the phone number (123) from merchants. For example, when the user requests refunds, or a rebate from a merchant, the user may provide the phone number (123) to allow the merchant to fund the account (122) hosted on the interchange (101).

In one embodiment, at least one payment of the payments is performed via instructing a respective merchant to charge one of the funding sources for the payment.

In one embodiment, at least one payment of the payments is performed via instructing one of the funding sources to make the payment to a respective merchant.

In one embodiment, the payment terminals include a point of sale terminal, an online checkout system, a purchase processing system of an online merchant, an online application to charge a premium for services of the application, and/or a payment intermediary service.

In one embodiment, the interchange (101) stores identification information of the plurality of funding sources (e.g., accounts 611-621 and 607). For example, one payment intermediary account may be identified via an email address of the user. In one embodiment, the plurality of funding sources may include one or more of: a checking account (611), a savings account (613), an investment account (621), a credit card account (615), a debit card account (617), a prepaid card account (619), and a payment intermediary account (607).

In one embodiment, the interchange (101) is configured to provide a user interface to show (e.g., via a web server) a list of charities when a user is directed to the website of the interchange (101) to make a payment. The user interface of the interchange (101) allows the user to not only enter the phone number (123) to identify a fund source for the payment, but also optionally select a charity from the list and specify an amount to be donated to the charity. The funds needed for the entire transaction, including the payment to the merchant and the donation to the charity, are obtained from a fund source pre-associated with the phone number (123), such as funds collected via a telecommunication carrier using a premium text message, credit cards, bank accounts, payment intermediary accounts, etc.

In one embodiment, the interchange (101) is configured to use the phone number (123) of the user to communicate with the user for a confirmation of the transaction request, including the payment request and the donation instruction.

In one embodiment, if a charity is selected in the user interface, the interchange (101) transmits a premium text message to a short code designated to collect donations for the charity to provide the donation on behalf of the user. In one embodiment, the short code is a telephone number that is significantly shorter than full telephone numbers and that can be used to address SMS and/or MMS messages from certain mobile phones. The short code designated to collect donations for the charity allows mobile phone users to provide donations to the charity by transmitting premium text messages to the short code.

In one embodiment, after the interchange (101) transmits the premium message to the short code designated to collect donations for the charity, a telecommunication carrier charges the interchange (101), via a telephone bill, to collect the funds for a donation corresponding to the premium message.

In some embodiments, the interchange (101) configures the premium text message, which is transmitted to the short code designated to collect donations for the charity, to indicate the phone number (123) of the user.

In one embodiment, the interchange (101) accumulates the donated amount, received from a particular user or a set of users, in an account, and provides the accumulated funds from the account to the charity periodically, or when the balance of the accumulated funds reaches a threshold. The funds can be provided to the charity via premium messages transmitted to the short code designated to collect donations for the charity, via automated clearing house transfer, via a check, or via other methods for transferring funds.

In one embodiment, the interchange (101) is configured to use the charity donation as a way to dispose of the change resulting from predetermined price points and payments requested by the merchants. For example, in some embodiments, the smallest unit of funds that the interchange (101) can bill a user (e.g., via premium messages) is larger than the smallest unit of a currency. Thus, after computing the smallest amount that the interchange (101) can bill the user to fulfill the payment requested by the merchant, the difference between the amount obtained via the billing and the amount used to fulfill the payment represents the change resulting from the payment transaction. In one embodiment, the user is provided with an option to donate the change to a charity of the choice of the user.

When the change is donated, the user does not have to explicitly specify the amount to be donated. The interchange (101) is to compute the donation amount based on the discrete price points that the interchange (101) can charge the user and the payment amount.

In one embodiment, the user is provided with a user interface to explicitly specify an amount for the donation. In one embodiment, the user is provided with a user interface to specify a suggested amount for the donation; and the interchange (101) is configured to compute the actual amount for the donation based on the discrete price points.

In one embodiment, the user is provided with a user interface to specify a budget for the charity for donations in a period of time (e.g., a week, a month, a year); and the interchange (101) is configured to make donations to the charity using the change from payment transactions in accordance with the budget.

In one embodiment, the user is provide with a user interface to specify preferences for donations to a plurality of charities, such as a ratio of amounts donated to the charities; and the interchange (101) is configured to use the change from payment transactions of the user to make donations to the plurality of charities in accordance with the preferences of the user.

In one embodiment, the merchant and/or the interchange (101) can also contribute to the donations to the charity selected by the user. For example, the merchant may donate a percentage of the payment to the charity, if the user specifies the charity in the user interface. For example, the interchange (101) may donate a percentage of the fees for processing the payment transaction to the charity, if the user specifies the charity in the user interface. For example, in one embodiment, the merchant and/or the interchange (101) may provide a donation matching the amount donated by the user. In one embodiment, the matching funds are limited by the amount of the payment and/or fees the merchant and/or the interchange (101) might collect from the user via the payment transaction.

In one embodiment, the interchange (101) stores the charity preferences of the user, such as a list of charity organizations of interest to the user. In one embodiment, the user interface for processing a payment is configured to allow the user to select a favorite charity from a list. In one embodiment, a favorite charity selected by the user is used to process donations in subsequent payment transactions of the user, until the user selects a different charity (e.g., via a confirmation message for confirming a payment). In some embodiments, the user may select a preference for the donation amount (e.g., as a percentage of the payment, a fixed amount, or a suggested amount); and the interchange (101) is configured to process subsequent payment transactions of the user based on the donation amount preference.

Figure 40:
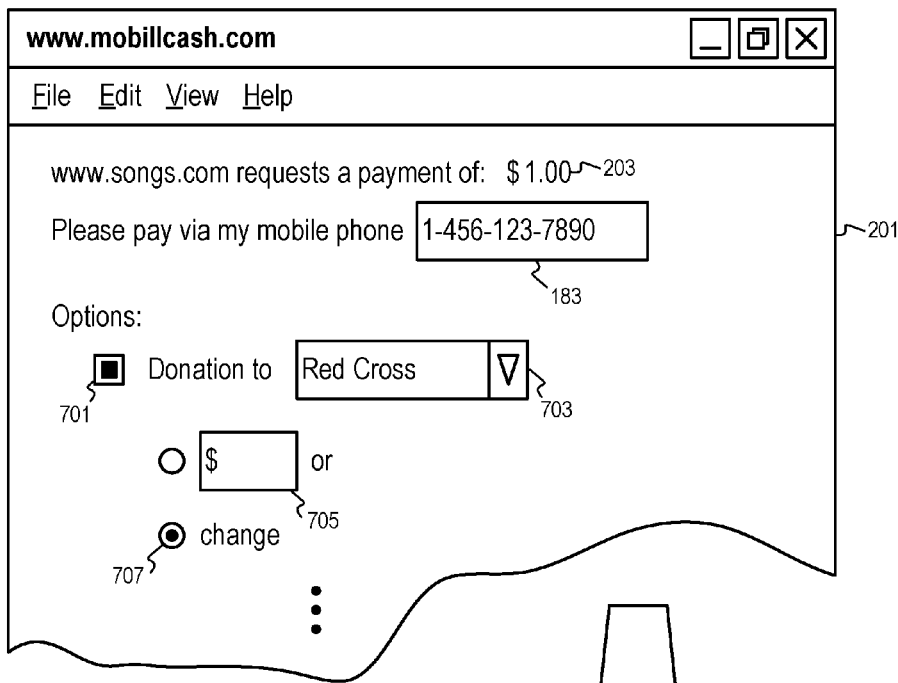
FIG. 40 shows a user interface to receive charity donation options according to one embodiment.

FIG. 40 shows a user interface to receive charity donation options according to one embodiment. In FIG. 40, the user interface (201) includes an entry box (183) to receive the phone number (123) used to identify a source of funds for the payment, and an option (701) to make a donation to a charity identified by the selection box (703).

In one embodiment, when the selection box (703) is selected, a listed of available charities are displayed (e.g., via a pull-down menu, or a pop-up window). The user is allowed to select one charity from the list to make a donation in connection with the payment of the amount (203) to a merchant (e.g., in response to the user making a purchase on the server (113) of the merchant).

In one embodiment, the list is sorted according to preferences of the user. For example, in one embodiment, the list is sorted according to the number of donations that the user has made to the respective charities. For example, in one embodiment, the list is sorted according to the aggregated amount of donations that the user provided to the respective charities within a predetermined period of time (e.g., the past calendar year, the last 12 months, the previous month, etc.)

In one embodiment, the top ranking charity is presented as the default choice. In another embodiment, a suggestion by the interchange (101) is presented as the default choice; and the user can use the selection box (703) to select from a list ranked according to a preference indicator of the user. In one embodiment, the preference indicator is computed based on past donations provided by the user via the interchange (101).

In FIG. 40, the user interface (201) allows the user to explicitly specify an amount in the entry box (705). In one embodiment, the amount specified by the user in the entry box (705) is the exact amount of donation to the charity identified by the selection box (703). In another embodiment, the amount specified by the user in the entry box (705) is the minimum amount; and the actual amount is the minimum amount plus the change resulting from the payment transaction.

In FIG. 40, the user interface (201) allows the user to implicitly specify an amount in the entry box (705) based on the change resulting from the payment transaction.

For example, in one embodiment, the fees and the payment for a transaction are summed to generate a required total amount, which is rounded up to the next highest dollar amount for billing purposes. The difference between the required total amount and the amount billed represents the change for the transaction.

In one embodiment, the amounts the interchange (101) can bill a user (e.g., via premium messages) are based on predetermined price points. When none of the predetermined price points matches a required payment amount, the closest price point that is higher than the requirement payment amount is billed. The different between the amount billed and the required total amount contributes to the change resulting from the payment transaction.

In one embodiment, when the user suggested donation amount is specified in the input entry box (705), or when the option (707) of donating the change is selected, the user interface (201) is configured to calculate the exact amount of the donation and present the exact amount to the user. In one embodiment, the exact amount of the donation is presented to the user during the confirmation (173) of the payment requested via the user interface (201).

In one embodiment, the user interface (201) further presents the matching donation the merchant and/or the interchange (101) will make, if the user specifies a donation to the charity identified via the selection box (703).

In one embodiment, the user interface (201) may further present statistics of past donations made by the user via the interchange (101). For example, the statistics may include an aggregated amount of donations the user has made to the charity identified in the selection box (703). For example, the statistics may include an aggregated amount of donations that have been made by various users via interchange (101) to the charity identified in the selection box (703), during a predetermined period of time.

Figure 41:
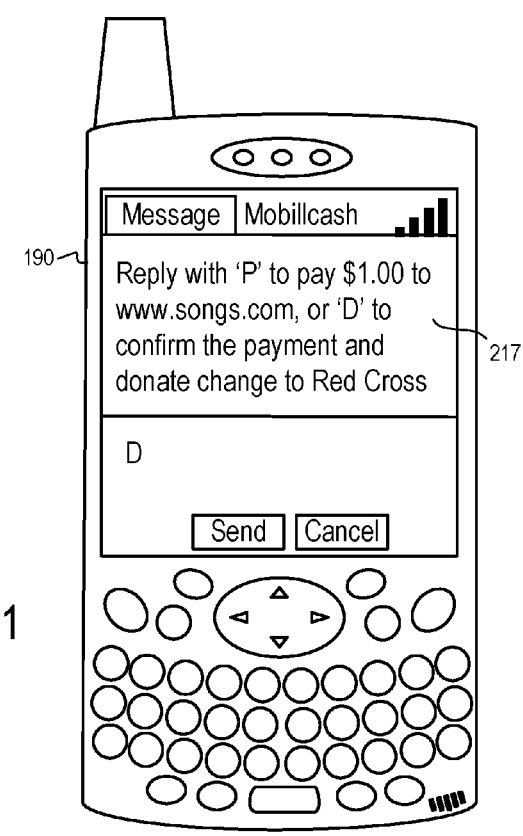
FIG. 41 illustrates a method to confirm a charity donation according to one embodiment.

FIG. 41 illustrates a method to confirm a charity donation according to one embodiment. In FIG. 41, the interchange (101) transmits a confirmation message (217) to the mobile phone (117) at the phone number (123), after the user submits the payment request via the user interface (201) illustrated in FIG. 40.

In FIG. 41, the confirmation message (217) provides instructions to the user on how to confirm the payment request that may be sent to the interchange (101) via a separate user terminal (111), such as a computer, a notebook computer, a tablet computer, a game console, etc.

In FIG. 41, if the user replies from the mobile phone (117) at the phone number (123) with a message including a first keyword (e.g., "P"), the interchange (101) makes the payment according to the amount (203) of the payment, without making a donation. If the user replies from the mobile phone (117) at the phone number (123) with a message including a second keyword (e.g., "D"), the interchange (101) makes the payment according to the amount (203) of the payment and the donation according to the charity options specified in the user interface (201) illustrated in FIG. 40.

In one embodiment, the confirmation message (217) shows the exact amount of the proposed donation and the identity of the charity organization.

In one embodiment, the user may specify a different amount of charity donation via the message provided as a reply to the confirmation message (217). In one embodiment, the user may specify a different charity via the message provided as a reply to the confirmation message (217). For example, in one embodiment, when no charity option is selected via the user interface (201) illustrated in FIG. 40, the user may use the message provided as a reply to the confirmation message (217) to specify the charity options.

FIG. 41 illustrates an example of confirming the payment and charity donation using a text message communication system of the mobile phone (117) at the phone number (123). In some embodiments, a mobile application provided on the mobile phone (117) is used for the confirmation of the payment and/or the charity donation. In some embodiments, the message includes a code that can be provided in the user interface (e.g., 201) to confirm the payment and/or the donation. In other embodiments, the user interface (201) provides a code; and the user is instructed to send a message including the code from the mobile phone (117) at the phone number (123) to confirm the payment and/or the donation.

Figure 42:
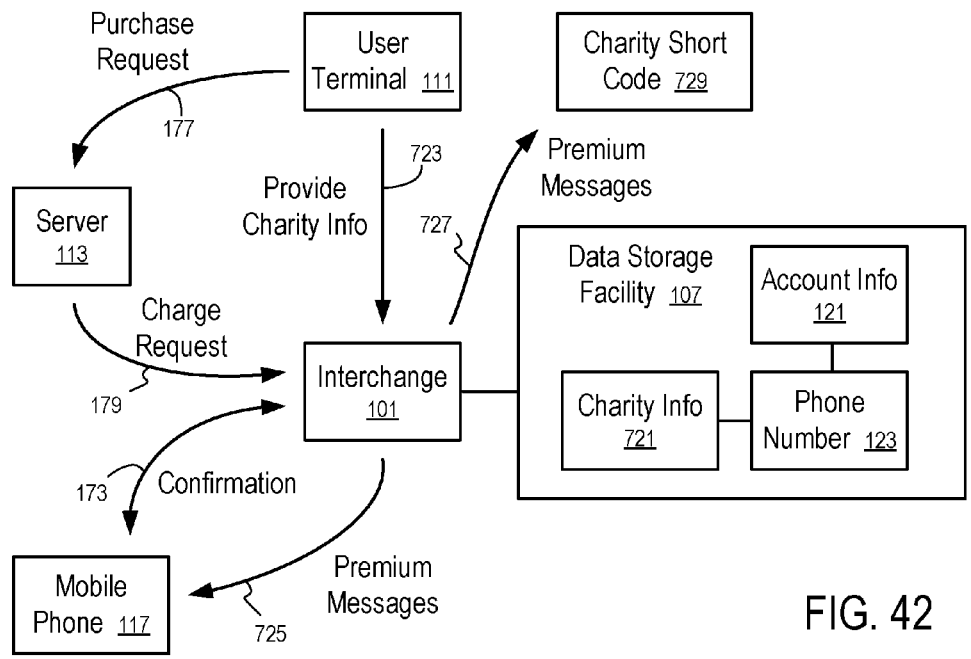
FIG. 42 shows a system configured to process charity donations according to one embodiment.

FIG. 42 shows a system configured to process charity donations according to one embodiment. In FIG. 42, the data storage facility (107) is configured to store charity information (721) with the phone number (123).

In one embodiment, the charity information (721) includes records of donations made using funds associated with the phone number (123).

In one embodiment, the charity information (721) includes a list of favorite charities of the user of the phone number (123); and the list presented via the user interface (201) for the selection of a charity for a donation associated with a payment is based on the list of favorite charities identified in the charity information (721).

In one embodiment, the charity information (721) includes preference settings, such as the explicit amount of donation suggested for each payment transaction, a default charity, whether or not change resulting from payment transactions is donated, budget for charity donations, a preferred donation ratio for a plurality of charities, a preferred donation frequency (e.g., identified based on a predetermined time interval, a predetermined spending threshold, a predetermined number of payment transactions), etc.

In one embodiment, the charity information (721) is provided (723) from the user terminal (111) in connection with charge requests (179). In one embodiment, the confirmation (173) is used not only to confirm the charge request (179) made in response to the purchase request (177), but also to confirm the charity information (721).

In FIG. 42, the interchange (101) is configured to transmit premium messages to the short code (729) designated by a telecommunication carrier to collect donations for a charity organization. In one embodiment, the interchange (101) is configured to store donations resulting from various payment transactions in an account; and when the balance is above a threshold (e.g., a minimum unit that can be delivered via a premium message), the interchange (101) is configured to transmit at least one premium message to the short code (729) to deliver the donation.

Figure 43:
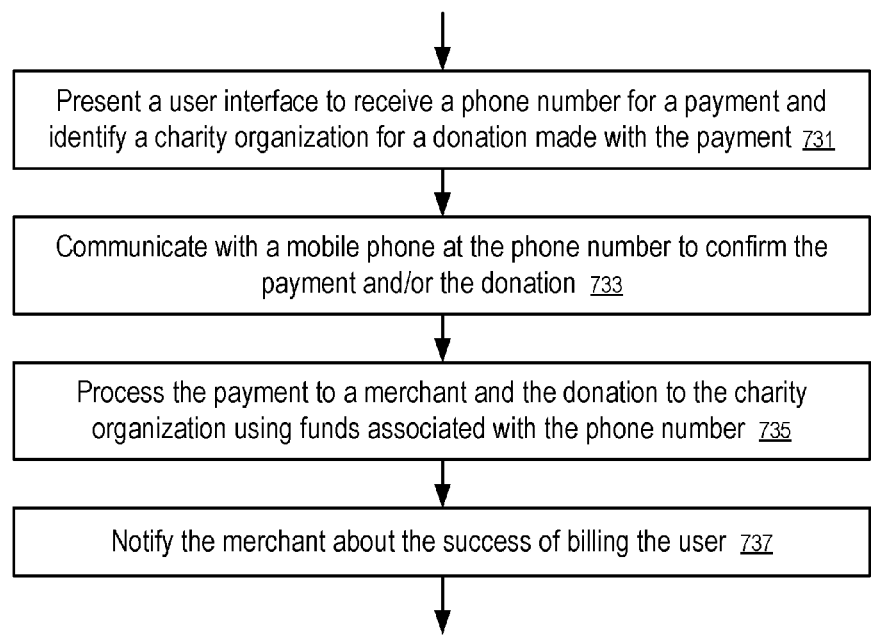
FIG. 43 shows a method to process charity donations according to one embodiment.

FIG. 43 shows a method to process charity donations according to one embodiment. In FIG. 43, a computing device (e.g., the interchange (101)) is configured to: present (731) a user interface (201) (e.g., via a web server) to receive a phone number (123) for a payment and identify a charity organization for a donation made with the payment; communicate (733) with a mobile phone (117) at the phone number (123) to confirm the payment and/or the donation; process (735) the payment to a merchant and the donation to the charity organization using funds associated with the phone number (123); and notify (737) the merchant about the success of billing the user.

In one embodiment, the user interface (201) is provided in response to the user visiting a website of the merchant (e.g., hosted on server (113)) to make a purchase. To process (735) the payment and/or the donation, the interchange (101) is configured to bill a fund source associated with the phone number (123) to collect funds for the payment to the merchant and the donation to the charity organization. The fund source may be a telephone bill of the mobile phone (117) billed via premium messages, a bank account, a credit account, a debit account, a prepaid account, a checking account or a savings account.

In one embodiment, the interchange (101) is configured to determine an amount of the donation based on a difference between a price point selected from a set of predetermined discrete price points and an amount of the payment, such as discrete price points determined by a set of premium message codes, where each respective premium message code in the set of premium message codes corresponds to a predetermined price charged by a telecommunication carrier to a recipient of the respective premium message code that is transmitted to a mobile phone of the recipient via a premium message. The predetermined price is pre-specified by the telecommunication carrier of the mobile phone of the recipient according to a published price scheme. In one embodiment, the user interface (201) is configured to present the amount of the donation.

In one embodiment, the computing device is configured to determine a price point based on an amount of the payment and a set of discrete prices, such as rounded up dollar amounts, or prices associated with a combination of codes selected from a predetermined set of premium message codes published by a telecommunication carrier.

In one embodiment, the computing device is configured to identify a set of premium messages corresponding to the price point, where each of the set of premium messages contains one code from the predetermined set of premium message codes. The amount of the donation is calculated based on a difference between the price point and the amount of the payment; and the interchange (101) is configured to transmit the set of premium messages to the mobile phone (117) at the phone number (123) to bill the user.

In one embodiment, if no charity organization is identified in the user interface (201), a payment of a first amount is paid to the merchant for the purchase; and if the charity organization is identified in the user interface (201), a portion of the first amount is provided to the charity organization for the donation. For example, the merchant may agree to donate a portion of the expected payment to the charity identified by the user.

In one embodiment, in response to the identification of the charity organization in the user interface (201), a portion of fees charged by the interchange (101) for processing of the payment is donated to the charity organization.

In one embodiment, the interchange (101) is configured to provide the donation to the charity organization via transmitting at least one premium message to a phone number or short code (729) designated to collect charity contributions for the charity organization.

In one embodiment, the premium messages transmitted from the computing device to the phone number or short code (729) designated to collect charity contributions for the charity organization is configured to indicate the phone number (123) of the user to provide credit to the user.

In one embodiment, the data storage facility (107) of the interchange (101) is configured to store data (e.g., charity information (721)) to track charity donation contributions from the user and/or the merchant.

Figure 44:
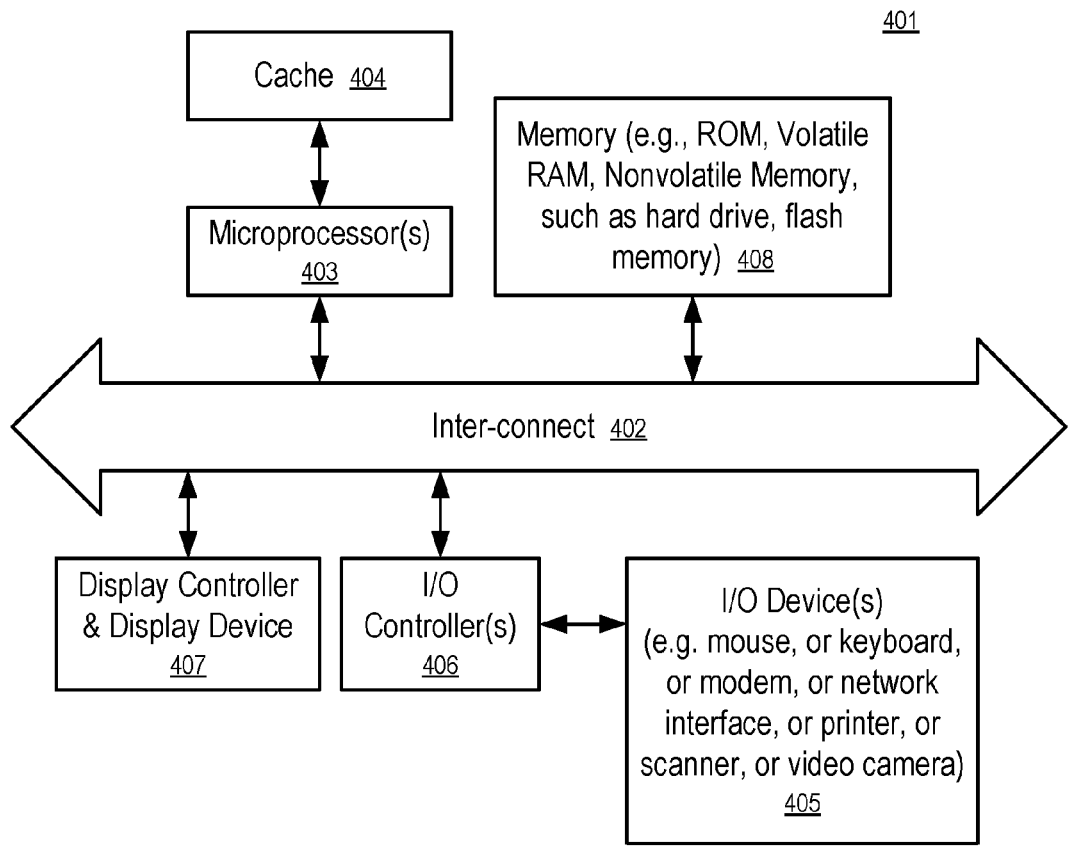
FIG. 44 shows a data processing system, which can be used in various embodiments.

FIG. 44 shows a data processing system, which can be used in various embodiments. While FIG. 44 illustrates various components of a computer system, it is not intended to represent any particular architecture or manner of inter- connecting the components. Some embodiments may use other systems that have fewer or more components than those shown in FIG. 44.

In one embodiment, each of the interchange (101), the data storage facility (107), the controllers (115), the mobile phones (117), the user terminals (111), the account server (125) and the servers (113) can be implemented as a data processing system, with fewer or more components, as illustrated in FIG. 44.

In FIG. 44, the data processing system (401) includes an inter-connect (402) (e.g., bus and system core logic), which interconnects a microprocessor(s) (403) and memory (408). The microprocessor (403) is coupled to cache memory (404) in the example of FIG. 44.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
providing, via a computing device, a user interface to a user for a payment to a merchant, in response to the user visiting a website of the merchant to make a purchase, wherein the user interface is configured to receive a phone number of a mobile phone of the user for the payment of an amount to the merchant and configured to receive a selection for a donation to an organization;
determining an amount of the donation based on a difference between a price point selected from a set of predetermined discrete price points and an amount of the payment wherein the user interface is configured to present the amount of the donation, wherein the user interface is configured to present a list of organizations to allow the user to select the organization from the list of organizations;
receiving, by the computing device, a request via the user interface, the request including the phone number, the amount of the payment to the merchant, and the amount specified for the donation;
transmitting, by the computing device, a message to the phone number of the mobile phone, the message including first and second selections that are selectable by the user of the mobile phone, the first selection to make a payment for the amount specified for payment to the merchant without making a payment for the amount specified for the donation and the second selection to make a payment for the amount specified for payment to the merchant and make a donation to the organization for the amount specified for the donation;
receiving, by the computing device, in response to the message, a confirmation from the mobile phone, the confirmation indicating whether to make the payment according to the first selection made by the user or according to the second selection made by the user;
in response to the confirmation, billing, by the computing device, a phone number at a telecommunication carrier for the mobile phone to collect funds from the telecommunication carrier according to the amount according to the selection made by the user;
if the confirmation indicates to make the payment according to the first selection then paying, by the computing device, the merchant in accordance with the amount according to the first selection; and
if the confirmation indicates to make the payment according to the second selection then paying, by the computing device, the merchant in accordance with the amount to be paid to the merchant according to the second selection making a donation to the organization then making, by the computing device, a donation to the organization in accordance with the amount specified for the donation according to the second selection.

2. The method of claim 1, wherein the user interface is configured to receive a user specified amount for the donation.

3. The method of claim 1, wherein the set of predetermined discrete price points is determined by a set of premium message codes, each respective premium message code in the set of premium message codes corresponding to a predetermined price charged to a recipient of the respective premium message code transmitted via a premium message to a mobile phone of the recipient; and the predetermined price is specified by the telecommunication carrier of the mobile phone of the recipient.

4. The method of claim 1, the message to the phone number and response to the message are text messages.

5. The method of claim 1, further comprising:
determining a price point based on an amount of the payment and a set of discrete prices associated with a predetermined set of premium message codes, each respective premium message code in the predetermined set of premium message codes corresponding to a predetermined price charged to a recipient of the respective premium message code transmitted via a premium message to a mobile phone of the recipient;
identifying a set of premium messages corresponding to the price point, each of the set of premium messages containing one of the predetermined set of premium message codes; and calculating an amount of the donation based on a difference between the price point and the amount of the payment;
wherein the billing of the funding source comprises transmitting the set of premium messages to the mobile phone at the phone number.

6. The method of claim 1, wherein if no organization is identified in the user interface, a payment of a first amount is paid to the merchant for the purchase; and if the organization is identified in the user interface, a portion of the first amount is provided to the organization for the donation.

7. The method of claim 1, wherein in response to the identification of the organization, a portion of the payment is redirected as the donation to the organization.

8. The method of claim 1, wherein in response to the identification of the organization, a portion of fees charged by the computing device for processing of the payment is donated to the organization.

9. The method of claim 1, further comprising:
providing, by the computing device, the donation to the organization via transmitting at least one premium message to a phone number designated to collect charity contributions for the organization.

10. The method of claim 9, wherein the at least one premium message transmitted from the computing device to the phone number designated to collect contributions for the organization is configured to indicate the phone number of the user included in the request received via the user interface.

11. The method of claim 9, wherein the phone number designated to collect contributions for the organization is a short code.

12. The method of claim 1, further comprising:
storing data tracking donation contributions from at least one of: the user and the merchant.

13. The method of claim 1, wherein the fund source is one selected from the group consisting of: a bank account, a credit account, a debit account, a prepaid account, a checking account and a savings account.

14. The method of claim 1, wherein the communicating with the mobile phone at the phone number for the confirmation of the request includes transmitting a text message to the mobile phone at the phone number to request a response for the confirmation; and the text message identifies an amount of the donation.

15. The method of claim 14, wherein the response for the confirmation is a message transmitted from the mobile phone at the phone number via a short message service.

16. A non-transitory computer-readable storage media storing instructions which, when executed on a computer, cause the computer to perform a method, the method comprising:
providing, via a computing device, a user interface to a user for a payment to a merchant, in response to the user visiting a website of the merchant to make a purchase, wherein the user interface is configured to receive a phone number of a mobile phone of the user for the payment of an amount to the merchant and configured to receive a selection for a donation to an organization;
determining an amount of the donation based on a difference between a price point selected from a set of predetermined discrete price points and an amount of the payment wherein the user interface is configured to present the amount of the donation, wherein the user interface is configured to present a list of organizations to allow the user to select the organization from the list of organizations;
wherein the user interface receiving, by the computing device, a request via the user interface, the request including the phone number, the amount of the payment to the merchant, and the amount specified for the donation;
transmitting, by the computing device, a message to the phone number of the mobile phone, the message including first and second selections that are selectable by the user of the mobile phone, the first selection to make a payment for the amount specified for payment to the merchant without making a payment for the amount specified for the donation and the second selection to make a payment for the amount specified for payment to the merchant and make a donation to the organization for the amount specified for the donation;
receiving, by the computing device, in response to the message, a confirmation from the mobile phone, the confirmation indicating whether to make the payment according to the first selection made by the user or according to the second selection made by the user;
in response to the confirmation, billing, by the computing device, a phone number at a telecommunication carrier for the mobile phone to collect funds from the telecommunication carrier according to the amount according to the selection made by the user;
if the confirmation indicates to make the payment according to the first selection then paying, by the computing device, the merchant in accordance with the amount according to the first selection; and
if the confirmation indicates to make the payment according to the second selection then paying, by the computing device, the merchant in accordance with the amount to be paid to the merchant according to the second selection making a donation to the organization then making, by the computing device, a donation to the organization in accordance with the amount specified for the donation according to the second selection.

\* \* \* \* \*